(12) United States Patent
Matula et al.

(10) Patent No.: US 7,543,008 B1
(45) Date of Patent: *Jun. 2, 2009

(54) APPARATUS AND METHOD FOR PROVIDING HIGHER RADIX REDUNDANT DIGIT LOOKUP TABLES FOR RECODING AND COMPRESSING FUNCTION VALUES

(75) Inventors: David W. Matula, Dallas, TX (US); Willard S. Briggs, Boulder, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 771 days.

This patent is subject to a terminal disclaimer.

(21) Appl. No.: 11/115,616

(22) Filed: Apr. 27, 2005

Related U.S. Application Data

(63) Continuation of application No. 10/107,598, filed on Mar. 26, 2002, now Pat. No. 6,938,062.

(51) Int. Cl.
*G06F 1/02* (2006.01)
*G06F 7/38* (2006.01)

(52) U.S. Cl. ............... 708/272; 708/493; 708/628

(58) Field of Classification Search ............ 708/235, 708/272, 276, 277, 502, 493, 628
See application file for complete search history.

(56) References Cited

U.S. PATENT DOCUMENTS

| | | | | |
|---|---|---|---|---|
| 5,862,059 | A * | 1/1999 | Matula et al. | 708/270 |
| 6,240,433 | B1 * | 5/2001 | Schmookler et al. | 708/270 |
| 6,938,062 | B1 * | 8/2005 | Matula et al. | 708/235 |
| 7,038,696 | B2 * | 5/2006 | Emerson et al. | 345/600 |

* cited by examiner

*Primary Examiner*—Chuong D Ngo

(57) ABSTRACT

An apparatus and method are disclosed for providing higher radix redundant digit lookup tables for digital lookup table circuits. A compressed direct lookup table unit accesses a redundant digits lookup table that is capable of providing a high order part and a low order part that can be directly concatenated to form an output numeric value. The redundant digits lookup table of the invention is structured so that no output overflow exceptions are created. A redundant digits lookup table recoder capable of providing recoded output values directly to partial product generators of a multiplier unit is also disclosed.

16 Claims, 8 Drawing Sheets

| 1. 000 000 000 000 (1) – 1. 000 000 111 111 (1) | | | | | | | | | |
|---|---|---|---|---|---|---|---|---|---|
| | | 000 | 001 | 010 | 011 | 100 | 101 | 110 | 111 |
| 1. 000 000 000: | 2. 000 | 00$\bar{1}$ | 0$\bar{1}$1 | 0$\bar{1}\bar{1}$ | 0$\bar{2}$1 | 0$\bar{2}\bar{1}$ | $\bar{1}$11 | $\bar{1}$1$\bar{1}$ | $\bar{1}$01 |
| 1. 000 000 001: | 2. 000 | $\bar{1}$0$\bar{1}$ | $\bar{1}\bar{1}$1 | $\bar{1}\bar{1}\bar{1}$ | $\bar{1}\bar{2}$1 | $\bar{1}\bar{2}\bar{1}$ | $\bar{2}$11 | $\bar{2}$1$\bar{1}$ | $\bar{2}$01 |
| 1. 000 000 010: | 2. 00$\bar{1}$ | $\bar{2}$0$\bar{1}$ | $\bar{2}\bar{1}$1 | $\bar{2}\bar{1}\bar{1}$ | $\bar{2}\bar{2}$1 | $\bar{2}\bar{2}\bar{1}$ | 111 | 11$\bar{1}$ | 101 |
| 1. 000 000 011: | 2. 00$\bar{1}$ | $\bar{1}$0$\bar{1}$ | 1$\bar{1}$1 | 1$\bar{1}\bar{1}$ | 1$\bar{2}$1 | 1$\bar{2}\bar{1}$ | 011 | 01$\bar{1}$ | 001 |
| 1. 000 000 100: | 2. 00$\bar{1}$ | 000 | 00$\bar{2}$ | 0$\bar{1}$0 | 0$\bar{1}\bar{2}$ | 0$\bar{2}$0 | 0$\bar{2}\bar{2}$ | $\bar{1}$10 | $\bar{1}$1$\bar{2}$ |
| 1. 000 000 101: | 2. 00$\bar{1}$ | $\bar{1}$00 | $\bar{1}$0$\bar{2}$ | $\bar{1}$10 | $\bar{1}$1$\bar{2}$ | $\bar{1}$20 | $\bar{1}$2$\bar{2}$ | $\bar{2}$10 | $\bar{2}$1$\bar{2}$ |
| 1. 000 000 110: | 2. 00$\bar{2}$ | $\bar{2}$00 | $\bar{2}$0$\bar{2}$ | $\bar{2}$10 | $\bar{2}$1$\bar{2}$ | $\bar{2}$20 | $\bar{2}$2$\bar{2}$ | 110 | 11$\bar{2}$ |
| 1. 000 000 111: | 2. 00$\bar{2}$ | $\bar{1}$01 | $\bar{1}$0$\bar{1}$ | 1$\bar{1}$1 | 1$\bar{1}\bar{1}$ | 1$\bar{2}$1 | 1$\bar{2}\bar{1}$ | 011 | 01$\bar{1}$ |

| 1. 011 111 000 000 (1) – 1. 100 000 111 111 (1) | | | | | | | | | |
|---|---|---|---|---|---|---|---|---|---|
| | | 000 | 001 | 010 | 011 | 100 | 101 | 110 | 111 |
| 1. 011 111 000: | 2. $\bar{2}\bar{2}\bar{2}$ | 10$\bar{2}$ | 1$\bar{1}$1 | 1$\bar{1}$1 | 1$\bar{1}$0 | 1$\bar{1}\bar{1}$ | 1$\bar{1}\bar{2}$ | 1$\bar{2}$1 | 1$\bar{2}$0 |
| 1. 011 111 001: | 2. $\bar{2}\bar{2}\bar{2}$ | 1$\bar{2}\bar{1}$ | 1$\bar{2}\bar{2}$ | 011 | 010 | 01$\bar{1}$ | 01$\bar{1}$ | 01$\bar{2}$ | 001 |
| 1. 011 111 010: | 2. $\bar{2}\bar{2}\bar{2}$ | 000 | 00$\bar{1}$ | 00$\bar{2}$ | 0$\bar{1}$1 | 0$\bar{1}$0 | 0$\bar{1}\bar{1}$ | 0$\bar{1}\bar{2}$ | 0$\bar{1}\bar{2}$ |
| 1. 011 111 011: | 2. $\bar{2}\bar{2}\bar{2}$ | 0$\bar{2}$1 | 0$\bar{2}$0 | 0$\bar{2}\bar{1}$ | 0$\bar{2}\bar{2}$ | $\bar{1}$11 | $\bar{1}$10 | $\bar{1}$1$\bar{1}$ | $\bar{1}$1$\bar{2}$ |
| 1. 011 111 100: | 2. $\bar{2}\bar{2}\bar{2}$ | $\bar{1}$01 | $\bar{1}$01 | $\bar{1}$00 | $\bar{1}$0$\bar{1}$ | $\bar{1}$0$\bar{2}$ | $\bar{1}$11 | $\bar{1}$10 | $\bar{1}$1$\bar{1}$ |
| 1. 011 111 101: | 2. $\bar{2}\bar{2}\bar{2}$ | $\bar{1}$1$\bar{2}$ | $\bar{1}$2$\bar{1}$ | $\bar{1}$2$\bar{1}$ | $\bar{1}$20 | $\bar{1}$2$\bar{1}$ | $\bar{1}$2$\bar{2}$ | $\bar{2}$11 | $\bar{2}$10 |
| 1. 011 111 110: | 2. $\bar{2}\bar{2}\bar{2}$ | $\bar{2}$11 | $\bar{2}$1$\bar{2}$ | $\bar{2}$01 | $\bar{2}$00 | $\bar{2}$00 | $\bar{2}$0$\bar{1}$ | $\bar{2}$0$\bar{2}$ | $\bar{2}$11 |
| 1. 011 111 111: | 2. $\bar{2}\bar{2}\bar{2}$ | $\bar{2}$10 | $\bar{2}$1$\bar{1}$ | $\bar{2}$1$\bar{2}$ | $\bar{2}$21 | $\bar{2}$20 | $\bar{2}$20 | $\bar{2}$2$\bar{1}$ | $\bar{2}$2$\bar{2}$ |
| 1. 100 000 000: | 1. 111 | 111 | 110 | 11$\bar{1}$ | 11$\bar{2}$ | 101 | 100 | 100 | 10$\bar{1}$ |
| 1. 100 000 001: | 1. 111 | 10$\bar{2}$ | 1$\bar{1}$1 | 1$\bar{1}$0 | 1$\bar{1}\bar{1}$ | 1$\bar{1}\bar{2}$ | 1$\bar{2}$1 | 1$\bar{2}$0 | 1$\bar{2}$0 |
| 1. 100 000 010: | 1. 111 | 1$\bar{2}\bar{1}$ | 1$\bar{2}\bar{2}$ | 011 | 010 | 01$\bar{1}$ | 01$\bar{2}$ | 001 | 001 |
| 1. 100 000 011: | 1. 111 | 000 | 00$\bar{1}$ | 00$\bar{2}$ | 0$\bar{1}$1 | 0$\bar{1}$0 | 0$\bar{1}\bar{1}$ | 0$\bar{1}\bar{2}$ | 0$\bar{2}$1 |
| 1. 100 000 100: | 1. 111 | 0$\bar{2}$1 | 0$\bar{2}$0 | 0$\bar{2}\bar{1}$ | 0$\bar{2}\bar{2}$ | $\bar{1}$11 | $\bar{1}$10 | $\bar{1}$1$\bar{1}$ | $\bar{1}$1$\bar{2}$ |
| 1. 100 000 101: | 1. 111 | $\bar{1}$1$\bar{2}$ | $\bar{1}$01 | $\bar{1}$00 | $\bar{1}$0$\bar{1}$ | $\bar{1}$0$\bar{2}$ | $\bar{1}$11 | $\bar{1}$10 | $\bar{1}$1$\bar{1}$ |
| 1. 100 000 110: | 1. 111 | $\bar{1}$1$\bar{1}$ | $\bar{1}$1$\bar{2}$ | $\bar{1}$2$\bar{1}$ | $\bar{1}$20 | $\bar{1}$2$\bar{1}$ | $\bar{1}$2$\bar{2}$ | $\bar{2}$11 | $\bar{2}$10 |
| 1. 100 000 111: | 1. 111 | $\bar{2}$10 | $\bar{2}$1$\bar{1}$ | $\bar{2}$1$\bar{2}$ | $\bar{2}$01 | $\bar{2}$00 | $\bar{2}$0$\bar{1}$ | $\bar{2}$0$\bar{2}$ | $\bar{2}$11 |

| 1. 111 111 000 000 (1) – 1. 111111 111 111 (1) | | | | | | | | | |
|---|---|---|---|---|---|---|---|---|---|
| | | 000 | 001 | 010 | 011 | 100 | 101 | 110 | 111 |
| 1. 111 111 000: | 1. 001 | $\bar{2}$00 | $\bar{2}$0$\bar{1}$ | $\bar{2}$0$\bar{1}$ | $\bar{2}$0$\bar{2}$ | $\bar{2}$0$\bar{2}$ | $\bar{2}$11 | $\bar{2}$11 | $\bar{2}$10 |
| 1. 111 111 001: | 1. 001 | $\bar{2}$10 | $\bar{2}$1$\bar{1}$ | $\bar{2}$1$\bar{1}$ | $\bar{2}$1$\bar{2}$ | $\bar{2}$1$\bar{2}$ | $\bar{2}$21 | $\bar{2}$21 | $\bar{2}$20 |
| 1. 111 111 010: | 1. 000 | $\bar{2}$20 | $\bar{2}$2$\bar{1}$ | $\bar{2}$2$\bar{1}$ | $\bar{2}$2$\bar{2}$ | $\bar{2}$2$\bar{2}$ | 111 | 111 | 110 |
| 1. 111 111 011: | 1. 000 | 110 | 11$\bar{1}$ | 11$\bar{1}$ | 11$\bar{2}$ | 11$\bar{2}$ | 101 | 101 | 100 |
| 1. 111 111 100: | 1. 000 | 100 | 10$\bar{1}$ | 10$\bar{1}$ | 10$\bar{2}$ | 10$\bar{2}$ | 1$\bar{1}$1 | 1$\bar{1}$1 | 1$\bar{1}$0 |
| 1. 111 111 101: | 1. 000 | 1$\bar{1}$0 | 1$\bar{1}\bar{1}$ | 1$\bar{1}\bar{1}$ | 1$\bar{1}\bar{2}$ | 1$\bar{1}\bar{2}$ | 1$\bar{2}$1 | 1$\bar{2}$1 | 1$\bar{2}$0 |
| 1. 111 111 110 | 1. 000 | 1$\bar{2}$0 | 1$\bar{2}\bar{1}$ | 1$\bar{2}\bar{1}$ | 1$\bar{2}\bar{2}$ | 1$\bar{2}\bar{2}$ | 011 | 011 | 010 |
| 1. 111 111 111 | 1. 000 | 010 | 01$\bar{1}$ | 01$\bar{1}$ | 01$\bar{2}$ | 01$\bar{2}$ | 001 | 001 | 000 |

FIGURE 3

APPARATUS AND METHOD FOR PROVIDING HIGHER RADIX REDUNDANT DIGIT LOOKUP TABLES FOR RECODING AND COMPRESSING FUNCTION VALUES

CROSS REFERENCE TO RELATED APPLICATION

The present application is a continuation of U.S. patent application Ser. No. 10/107,598 (now U.S. Pat. No. 6,938,062), filed Mar. 26, 2002, the entirety of which is incorporated by reference herein.

The present invention is related to that disclosed in the following United States Non-Provisional patent application:

U.S. patent application Ser. No. 10/108,251, filed Mar. 26, 2002 (now U.S. Pat. No. 6,978,289), entitled "APPARATUS AND METHOD FOR MINIMIZING ACCUMULATED ROUNDING ERRORS IN COEFFICIENT VALUES IN A LOOKUP TABLE FOR INTERPOLATING POLYNOMIALS."

The above patent application is commonly assigned to the assignee of the present invention. The disclosures in this related patent application are hereby incorporated by reference for all purposes as if fully set forth herein.

FIELD OF THE INVENTION

The present invention relates generally to the field of computer technology, and more particularly to an arithmetic unit of a computer. The present invention provides an improved apparatus and method for providing lookup tables for function values.

BACKGROUND OF THE INVENTION

In binary computing devices hardware direct lookup tables are typically employed for function evaluation and for reciprocal and root reciprocal seed values for division and square root procedures. For direct table lookup of a function of a normalized "p-bit" argument $1 \leq x = 1.b_1 b_2 \ldots b_i b_{i+1} \ldots b_{p-1} < 2$, the "i" leading bits $b_1 b_2 \ldots b_i$ provide an index to a table yielding "j" output bits that determine the approximate function value.

Two major disadvantages of prior art hardware direct lookup tables are:

(1) A prior art hardware direct lookup table generally contains considerable repetition of common leading portions of output values. This results in the table being considered prohibitively large for certain applications, particularly when the application requires the number of input bits "i" to be equal or greater than the number of output bits "j".

(2) For direct lookup of functions that change slowly in some portions of the argument domain and then change very rapidly in other portions of the argument domain, the effective accuracy and amount of output digit repetition that is generated varies considerably over the range of output values.

To provide greater function accuracy and to avoid an excessive size of a comparable direct lookup table, certain types of prior art table lookup systems employing multiple table lookups and arithmetic combining operations have been devised. These table lookup systems include bipartite tables such as those described in U.S. Pat. No. 5,862,059. Another type of table lookup system uses exponential/logarithm tables such as those described in U.S. Pat. No. 5,197,024. Other types of table lookup systems are based on well known multiplicative interpolation systems.

Some of the disadvantages of these prior art types of hardware table lookup systems for function approximation include:

(1) The table lookups and related computations can require several cycles of latency on the critical path of the overall function evaluation procedure.

(2) The table lookup system can require supplemental dedicated hardware to effect the implicit table size reduction, and (3) A table lookup assisted computation generally provides alternative approximate function values differing from those of a comparably accurate direct table lookup. Therefore the table lookup assisted computation procedure is a "lossy compression" procedure.

It should be recognized that even though a lookup table provides approximate values, there are many reasons why table compression should still be a lossless compression rather than just a methodology to provide values of roughly the same accuracy as the initial direct lookup table values. These reasons include the issues of adherence to standards, the maintenance of legacy systems behavior, and the facility for reproducible behavior for verification and testing.

A prior art direct table lookup procedure that incorporates lossless compression techniques to avoid excessive repetition of common leading digits of successive output values enumerated in the table is a low order digit accuracy refinement method used in published decimal lookup tables for function approximation. For example, consider a decimal logarithm table of the type printed in the book "Mathematical Tables from the Handbook of Chemistry and Physics" published for many years by the Chemical Rubber Publishing Company of Cleveland, Ohio.

A published lookup table such as a five (5) digit index decimal logarithm table is an example of a decimal based direct lookup table. Each decimal input value indexes an output with a corresponding number of output decimal digits (plus perhaps a fixed number of extra guard digits to provide more output accuracy). Thus the five (5) digit input value N=11502 can index an eight (8) digit output value 4.0607734. The output value 4.0607734 is the rounded decimal logarithm of the input value N=11502. Similarly, the five (5) digit input value N=11509 can index the output value 4.0610376. The output value 4.0610376 is the rounded decimal logarithm of the input value N=11509. Table compression in the printed table may be obtained by employing the low order decimal input index digit as a refined value selector.

For purposes of explaining the concept of table compression the input index can be partitioned into high and low order indices. Let the expression 4|1 denote an "input partition" with one low order refinement digit. The digit "4" in the expression 4|1 denotes four (4) high order digits that index a line of the table where the outputs are given in a partitioned form. The digit "1" in the expression 4|1 denotes one (1) low order digit that indexes one column in the table.

Let the expression 4|4 denote an "output partition" having a high order output part of four (4) digits and a low order output part of four (4) digits. Line compression is obtained by having a common high order part followed by a sequence of ten (10) low order parts each indexed by the value of the one (1) low order refinement digit.

For example, consider the following two lines from a five (5) digit index decimal logarithm direct lookup table published by Chemical Rubber Publishing Company.

TABLE ONE

| N | | 0 | 1 | 2 | | 8 | 9 |
|---|---|---|---|---|---|---|---|
| 1150 | 060 | 6978 | 7356 | 7734 | ... | 9999 | *0376 |
| 1151 | 061 | 0753 | 1131 | 1508 | ... | 3771 | 4148 |

The output of this logarithm table provides a rounded eight (8) digit decimal logarithm partitioned in a 4 1 4 output partition. The leading four (4) digits of the logarithm value (i.e., $d_0 . d_1 d_2 d_3$) are given by the value $d_0$ and the common three leading fraction digits $d_1 d_2 d_3$. The digit $d_0=4$ is assumed to be known to the user of the table from the fact that N is a five (5) digit number. In the two lines of the logarithm table shown in TABLE ONE the common three leading fraction digits $d_1 d_2 d_3$ are either "060" or "061." The remaining four (4) low order digits $d_4 d_5 d_6 d_7$ refining the output value are obtained from the entries in the columns of the table with the low order refinement digit of the input selecting the particular column.

The table lookup process for looking up the logarithm of the input value N=11501 involves (a) accessing the table values in line "1150" and (b) concatenating the three digits "060" to the four (4) digit low order part "7356" from column "1" and (c) concatenating the fraction to the $d_0=4$ value. The result is the output logarithm value of 4.0607356.

The table lookup process for looking up the logarithm of the input value N=11509 involves (a) accessing the low order table values in line "1150" and (b) recognizing the low order selection "overflow" indicator (i.e., the asterisk) and (c) concatenating the three digits "061" in line "1151" to the four (4) digit low order part "0376" from column "9" and (d) concatenating the fraction to the $d_0=4$ value. The result is the output logarithm value of 4.0610376. The asterisk placed on the value "0376" in column "9" indicates that the three digits "061" from line "1151" are to be used instead of the three digits "060" from the line "1150."

The input value N=11509 creates an "overflow" exception condition in the low order output part that requires the low order output part "0376" to be concatenated to the high order output part incremented by a carry. In this case the high order output part on line "1150" is "060." When it is incremented by a carry the value becomes "061" which is the high order part of the next line "1151." The output "overflow" exception condition is denoted in the lookup table by a leading asterisk included in the low order output part.

The output "overflow" exception condition described above for a published decimal lookup table may also be employed in an analogous binary lookup table (i.e., a table in which the output numbers are printed in binary form). The mathematical principles that are involved are the same. Binary lookup tables are not usually provided in a printed table. This is because the user of a binary lookup table is almost always an "arithmetic logic unit" (ALU) of a computer. Binary lookup tables are usually provided in a computer "read only memory" (ROM). An ALU directly accesses the ROM binary lookup table to obtain desired output values from the table.

Some disadvantages of these prior art low order digit refinement methods are as follows:

(1) Selective concatenation of high and low order digits has a delay due to the dependency of the high order digit selection on the output of the low order digit selection. That is, it must first be determined whether the asterisk symbol that may be output with the low order digits is present or absent.

(2). Neither the high order digits nor the low order digits are available from the initial lookup of the line.

(3) A variety of formatting options for adapting the range of output values are seamlessly employed to achieve greater compression and to reduce the visual clutter on the printed page. An example of a printed page is Page 45 of the book Standard Mathematical Tables, Fourteenth Edition, published by The Chemical Rubber Company of Cleveland, Ohio, shown in Appendix 1. While the reader seamlessly reads the published table, an equivalent hardware implementation can require excessive branching logic and delay in a similar hardware table system that comprises a plurality of ROM tables with a complex selection mechanism.

Accordingly, a need has arisen for a method of compression in a direct lookup table where the output is available with a minimum of conditional post-lookup table logic. A further need has arisen to obtain a direct lookup table compression that is lossless, in order to preserve the integrity of the table lookup values. A further need has arisen for a method for designing the partition of a direct lookup table into a plurality of lookup tables, together with a simple selection mechanism, to enable a desired lookup table of a plurality of lookup tables in order to obtain a desired lookup table value while minimizing power usage and achieving a higher level of lossless compression.

A further need has arisen for an improved apparatus and method for providing a direct lookup table in which the digit values in the direct lookup table are encoded in bits with the bits allocated to parts of the output so as to minimize the total number of bits required to express the values in the direct lookup table thereby achieving greater compression.

SUMMARY OF THE INVENTION

The present invention is directed to an apparatus and method for providing a direct table lookup system for function evaluation in which parts comprising consecutive digit sub-sequences of the table lookup function value in a redundant digit format are obtained from a plurality of direct lookup tables. The table lookup function value in the redundant digit format is obtained from the concatenation of the parts thereby providing a lookup table system in which output "overflow" exception conditions do not occur.

A technical advantage of the present invention inheres in the fact that a redundant digit format of the parts allows the parts to be provided by tables that are substantially compressed compared to an equivalent single direct lookup table. The redundant digit format table lookup value is the same value as that from the single direct lookup table resulting in a "lossless" compression.

An additional technical advantage of the present invention inheres in the fact that the table lookup function value redundant digit format may contain nonredundant as well as redundant digits where the binary encoding of the redundant digits may be split so that some bits of the encoding occur in each of two successive parts of the table lookup function value redundant digit format. The ability of the format to include nonredundant as well as redundant digits allows further reduction in a table size obtaining greater lossless compression.

Another technical advantage inheres in the present method of the invention for partitioning a large direct lookup table into a plurality of smaller direct lookup tables. The method of the present invention provides partitions that allow for convenient selection of the smaller tables that are to be enabled so as to both reduce power and obtain greater lossless compression.

It is an object of the present invention to provide an apparatus and method for providing a lookup table system in which output "overflow" exception conditions do not occur.

It is another object of the present invention to provide an apparatus and method for providing a lookup table in which the values in the lookup table are encoded to minimize the number of bits required to express the values in the lookup table.

It is also an object of the present invention to provide a direct table lookup system for function evaluation in which parts comprising consecutive digit sub-sequences of the table lookup function value in a redundant digit format are obtained from a plurality of direct lookup tables and concatenated to obtain a table lookup function value.

It is another object of the present invention to provide a direct table lookup system for function evaluation in which the redundant digit format of the parts are substantially compressed compared to a single direct lookup table.

It is also an object of the present invention to provide a direct table lookup system for function evaluation in which a table lookup function value in a redundant digit format may contain nonredundant as well as redundant digits where the binary encoding of the redundant digits may be split so that some bits of the encoding occur in each of two successive parts of the table lookup function value redundant digit format.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which:

FIG. 3 illustrates three portions of a reciprocal binary lookup table according to one advantageous embodiment of the present invention;

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged look up table unit in a central processing unit of a computer system.

Figure 1:
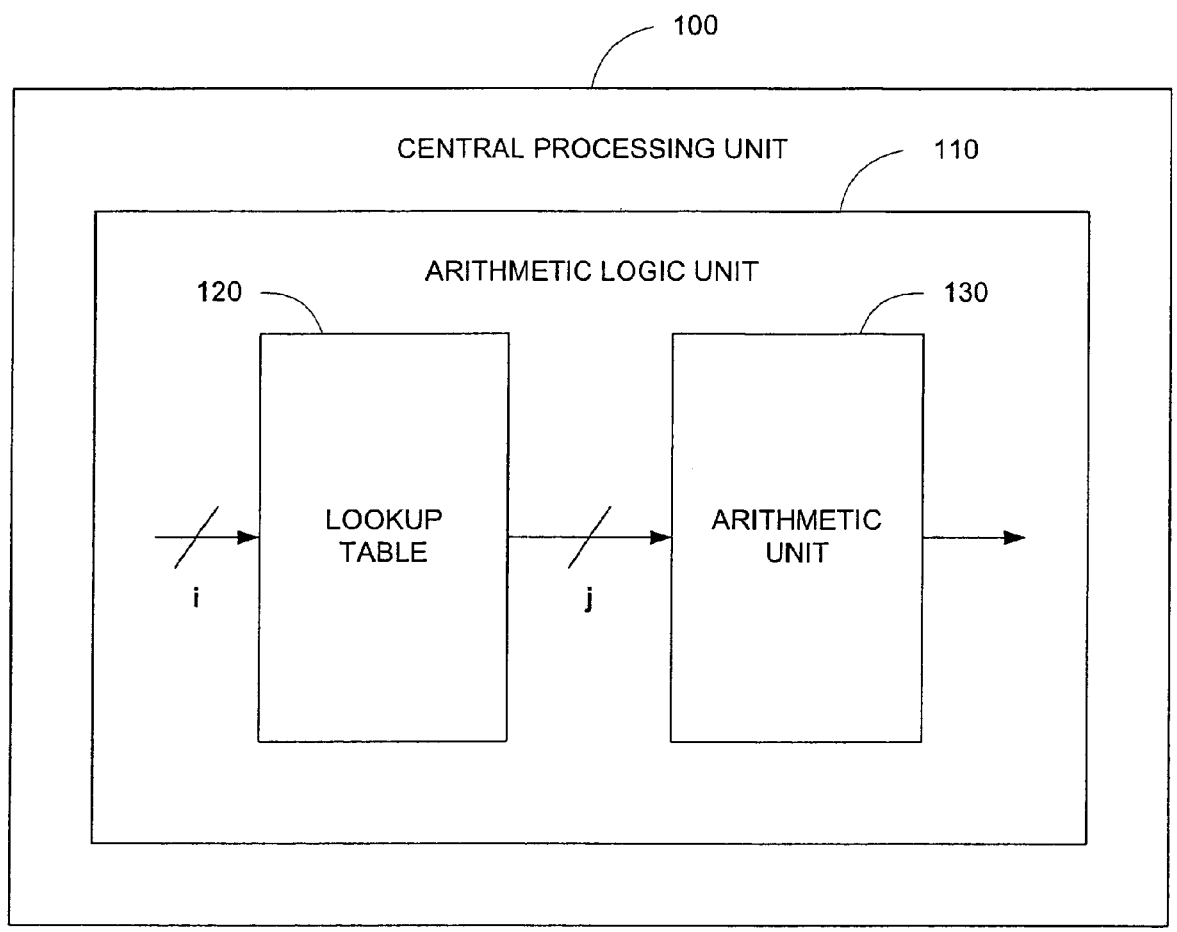
FIG. 1 illustrates a block diagram of a portion of a central processing unit showing a prior art arithmetic logic unit comprising a lookup table and an arithmetic unit.

FIG. 1 illustrates a block diagram of a portion of a central processing unit 100 showing a prior art arithmetic logic unit (ALU) 110. Arithmetic logic unit 110 comprises a lookup table (LUT) 120 and an arithmetic unit 130. Lookup table 120 receives data in the form of "i" input bits. Lookup table 120 outputs data to arithmetic unit 130 in the form of "j" output bits in accordance with principles that are well known in the prior art. Arithmetic unit 130 may comprise a multiplier unit, an adder unit, a microprogram storage unit, or other type of computational unit.

Figure 2:
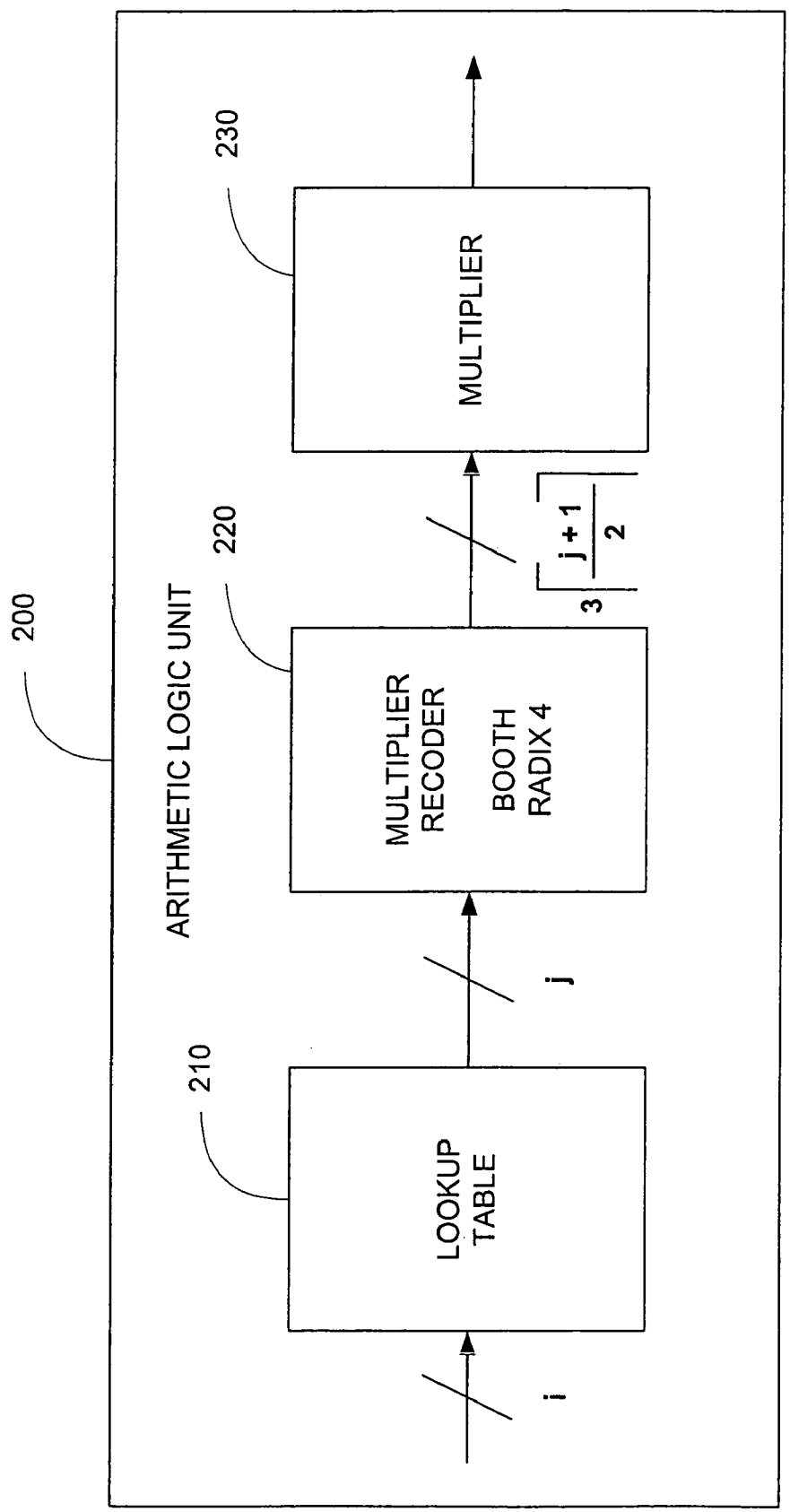
FIG. 2 illustrates a block diagram of a prior art arithmetic logic unit comprising a lookup table, a multiplier recoder, and a multiplier unit.

FIG. 2 illustrates a block diagram of a prior art arithmetic logic unit (ALU) 200 comprising lookup table 210, multiplier recoder 220, and multiplier unit 230. Lookup table 210 receives data in the form of "i" input bits. Lookup table 210 outputs data to multiplier recoder 220 in the form of "j" output bits in accordance with principles that are well known in the prior art. Multiplier recoder 220 comprises a Booth "radix 4" multiplier recoder. Also in accordance with principles that are well known in the prior art multiplier recoder 220 outputs to multiplier unit 230 a number of bits equal to $$3\left\lceil \frac{(j+1)}{2} \right\rceil$$

bits where the bottomless brackets denote taking the smallest integer greater than or equal to the expression within the bottomless brackets.

FIG. 3 illustrates three portions of a reciprocal binary lookup table 300 according to one advantageous embodiment of the invention. The input to binary lookup table 300 is provided in the form of thirteen (13) binary bits that represent an input number "x". As will be more fully described, the output of binary lookup table 300 is in the form of seven (7) "radix 4" digits that represent an approximate reciprocal of the input number "x" (i.e., the value of "(1/x)")

The inputs are normalized to the standard binary interval [1, 2) with twelve (12) fraction bits (i.e., $1.b_1 b_2 b_3 \ldots b_{11} b_{12}$). The standard binary interval [1, 2) comprises binary values that are less than two (2) and that are greater than or equal to one (1). Parentheses ( ) indicate exclusive bounds and brackets [ ] indicate inclusive bounds.

If all of the lines in reciprocal binary lookup table 300 were shown in FIG. 3 there would be a total of five hundred twelve (512) lines. A complete version of reciprocal binary lookup table 300 with all five hundred twelve (512) lines is set forth in Appendix "A" for reference purposes. The leading nine (9) fraction bits (i.e., $b_1 b_2 b_3 \ldots b_8 b_9$) select one of the five hundred twelve (512) lines of the complete table. FIG. 3 shows the first eight (8) lines, the middle sixteen (16) lines, and the final eight (8) lines of reciprocal binary lookup table 300. The low order three bits of the index (i.e., $b_{10} b_{11} b_{12}$) select one of eight (8) columns providing the low order digit part to be concatenated to the high order digit part at the beginning of that line.

The output values in reciprocal binary lookup table 300 are determined as follows. Consider an input $1.b_1b_2b_3b_4b_5b_6b_7b_8b_9b_{10}b_{11}b_{12}=i2^{-12}$ that denotes the interval $[i2^{-12}, (i+1)2^{-12})$ where the value of "i" is in the range $1024 \geq i \geq 2047$. The reciprocal of the midpoint falls in the interval (½, 1), and is computed and first "rounded-to-nearest" to twelve (12) binary places beyond the leading unit. The result is R $(2^{12}/(i+½))=0.1 b'_1b'_2b'_3b'_4b'_5b'_6b'_7b'_8b'_9b'_{10}b'_{11}b'_{12}$. For displaying the output entry value in the table of FIG. 3 the result is multiplied by two (2) to normalize the value into the standard binary interval [1, 2). The value is then converted to a "radix 4" representation with all of the digits selected from the redundant digit set {-2, -1, 0, 1, 2}. This yields a seven (7) digit "radix 4" number $d_0 d_1 d_2 d_3 d_4 d_5 d_6$ that is identical in value to the thirteen (13) bit normalized binary value $1.b'_1b'_2b'_3b'_4b'_5b'_6b'_7b'_8b'_9b'_{10}b'_{11}b'_{12}$.

In many applications a set of "radix 4" digits is made up of the "standard" set of digits {0.1, 2, 3}. In binary computer applications, such as multiplication by a digit, the number three (3) is not a convenient digit to use. This is because in order to multiply a number by three (3) the number must be shifted once (to multiply the number by two in the base two) and the result added to the number (to obtain a result that equals three times the number). In contrast, to multiply a number by two (2) only requires one shift operation. To multiply a number by negative one (-1) only requires one complement operation, and to multiple a number by negative two (-2) requires only both a complement operation and a shift operation. Thus multiplication by any of the digits {-2, -1, 0, 1, 2} is simpler and involves less delay than multiplication by 3.

It is therefore more convenient to use a range of "radix 4" digits that does not include the digit three. In lookup table 300 the range of "radix 4" digits used is the redundant digit set {-2, -1, 0, 1, 2}, which is often termed the Booth "radix 4" digit set.

Each line of reciprocal binary lookup table 300 provides a common four (4) digit high order part $d_0.d_1d_2d_3$ with a selected low order part $d_4d_5d_6$ concatenated to generate the output entry value of the lookup table. Bars placed over the numbers one (1) and two (2) in the table are used to denote negative values. That is, "bar 1" (shown as $\bar{1}$) is equal to "minus 1" (-1) and "bar 2" (shown as $\bar{2}$) is equal to "minus 2" (-2) in the printed digit strings.

For example, the table input index 1.000 000 110 010 employs the numerals 1.000 000 110 to determine the line with high order output $2.00\bar{2}$ and the low order input bits 010 determine the column giving the low order output $2\bar{1}0$. Concatenating the two parts yields the output value $2.00\bar{2}\ 2\bar{1}0$.

A reciprocal table with normalized inputs $1 \leq 1.b_1b_2b_3\ldots b_i < 2$ and normalized outputs $1 \leq 1. b'_1b'_2b'_3 \ldots b'_j < 2$ is referred to as an "i-bits-in, j-bits-out" reciprocal table. The leading unit bit is assumed in the normalization. Reciprocal binary lookup table 300 then represents a "twelve (12) bits in, twelve (12) bits out" reciprocal table with the output converted (exactly) to the normalized seven (7) digit "radix 4" output $d_0.d_1d_2d_3d_4d_5d_6$. Note that the leading output digit can be restricted to have the value two ($d_0=2$) for inputs in the interval (1, 1½), and restricted to have the value one ($d_0=1$) for inputs in the interval [1½, 2). This output digit value is available from the input bit $b_1$ and therefore does not need to be stored. The "radix 4" reciprocal binary lookup table 300 in FIG. 3 may be referred to as a "2k bits in, k "radix 4" digits out" table (where the value of k is equal to six (6)).

To achieve greater compression it is desirable to have the common high order digit string large and the low order digit string small. To avoid the output "overflow" exception condition encountered in traditional lookup tables it is sufficient that the leading low order digit in all entries across a line has at most two successive values. Note that the first line of reciprocal binary lookup table 300 has leading low order digit values "zero" ("0") and "minus one" ("-1"), the second line has values "minus one" ("-1") and "minus two" ("-2"), the third line has values "two" ("2") and "one" ("1"), and the fourth line has values "one" ("1") and "zero" ("0").

With a change of at most one unit in the leading low order digit value across a line, the redundancy in the digit set, specifically, the facility to choose either "2" or "-2" as the low order leading digit, provides that a common high order part may always be provided applicable to the whole line. This allows a high order part to be selected and any of a corresponding set of low order parts to be selected that may always be concatenated without any overflow exception. The hardware design of a compressed table is greatly simplified if hardware does not need to be provided to handle overflow exceptions.

The recoded output obtained from the tables at the digit level has been described using the five "radix 4" values {-2, -1, 0, 1, 2}. It is necessary further to consider the encoding of these five values in bits. Typical multiplier encodings employ a sign bit and two magnitude bits to provide the digit value as input to a partial product generator ("PPG") (not shown). The encoding may be stored directly in a table. However, this will increase the table size and thereby reduce the net compression. In exemplary look up table 300 each line of the table has entries that total twenty seven (27) "radix 4" digits. With a three (3) bit encoding per digit the line width is eight one (81) bits. The line width for standard binary output would have eight (8) words of twelve (12) bits each for a total of ninety six (96) bits. In this case some compression is achieved together with the convenience of an output digit encoding that is suitable for direct input to a PPG of a multiplier unit.

Another advantage of the present invention is that the output digit encoding may be refined to improve the compression while representing the same redundant digit values.

For example, note that all the output digits except the assumed leading digit do and except the leading digit of the low order part ($d_4$ in table 300) have values in the limited range {−2, −1, 0, 1}. This feature is always possible when redundancy is only employed in selecting the leading digit of the low order part to insure against overflow from low to high order part across a line. This means that all but one of the "radix 4" digits can be encoded with only two (2) bits. For example, the digits "00" denote the value "0", the digits "01" denote the value "+1", the digits "10" denote the value "−2", and the digits "11" denote the value "−1", as in a two (2) bit "2's complement" encoding of the values −2, −1, 0, 1. This allows that the twenty seven (27) "radix 4" digits on each line of table 300 to be stored with eighteen (18) digits having two (2) bit encodings and only eight (8) digits having three (3) bit encodings, for a line width of only sixty two (62) bits.

A digit that represents a digit value in the full redundant range of {−2, 1, 0, 1, 2} can be encoded with three (3) bits as shown in TABLE TWO below. A sign bit and a two (2) bit "carry-save" value is employed to encode the digit magnitude.

TABLE TWO

Two encodings of the digit range [−2, 2]

| Digit | A Booth "Radix 4" Encoding | Compression Maximum Encoding |
|---|---|---|
| −2 | 110 | 111 |
| −1 | 101 | 101 or 110 |
| 0 | 100 or 000 | 000 or 100 |
| 1 | 001 | 001 or 010 |
| 2 | 010 | 011 |

If the compression maximum encoding of TABLE TWO comprising bits b1, b2, and b3 is used for the leading digit of the low order part, note that the first two (2) bits, b1 and b2, of that digit may be chosen to remain constant across any line of output, and may therefore be attached to the high order digit encoded part. Only a single bit b3 of this digit need be replicated with each of the low order parts. This results in an output line width comprising six (6) bits for the three (3) high order "radix 4" digit encodings, and two (2) bits for the non-changing part of the leading low order digit encoding, and eight (8) sets of five (5) bits each for completing the low order part encodings. This yields forty eight (48) bits per line, a fifty percent (50%) reduction over the ninety six (96) bits of the standard eight (8) bit by twelve (12) bit output line.

This advantageous encoding of the present invention provides a greater compression with the output still available by concatenation of the parts. One more step could then be applied to convert the encoding from the alternate three (3) bit form of TABLE TWO or of the two (2) bit "2's complement" form into the desired Booth "Radix 4" encoding of TABLE TWO of the digits {−2, −1, 0, 1, 2} for input to a partial product generator (PPG) of a multiplier unit. Note that for a multiplier recoding unit that encodes with a sign bit, a magnitude two ("2") select bit, and a magnitude one ("1") select bit, as in the Booth "Radix 4" encoding of TABLE TWO, the converted encoding of table 300 in a single logic level is achieved by having the sign bit equal to $b_1$, by having the select one ("1") bit equal to $b_2$ XOR $b_3$, and by having the select two ("2") bit determined by the value of $b_2$ AND $b_3$.

Figure 4:
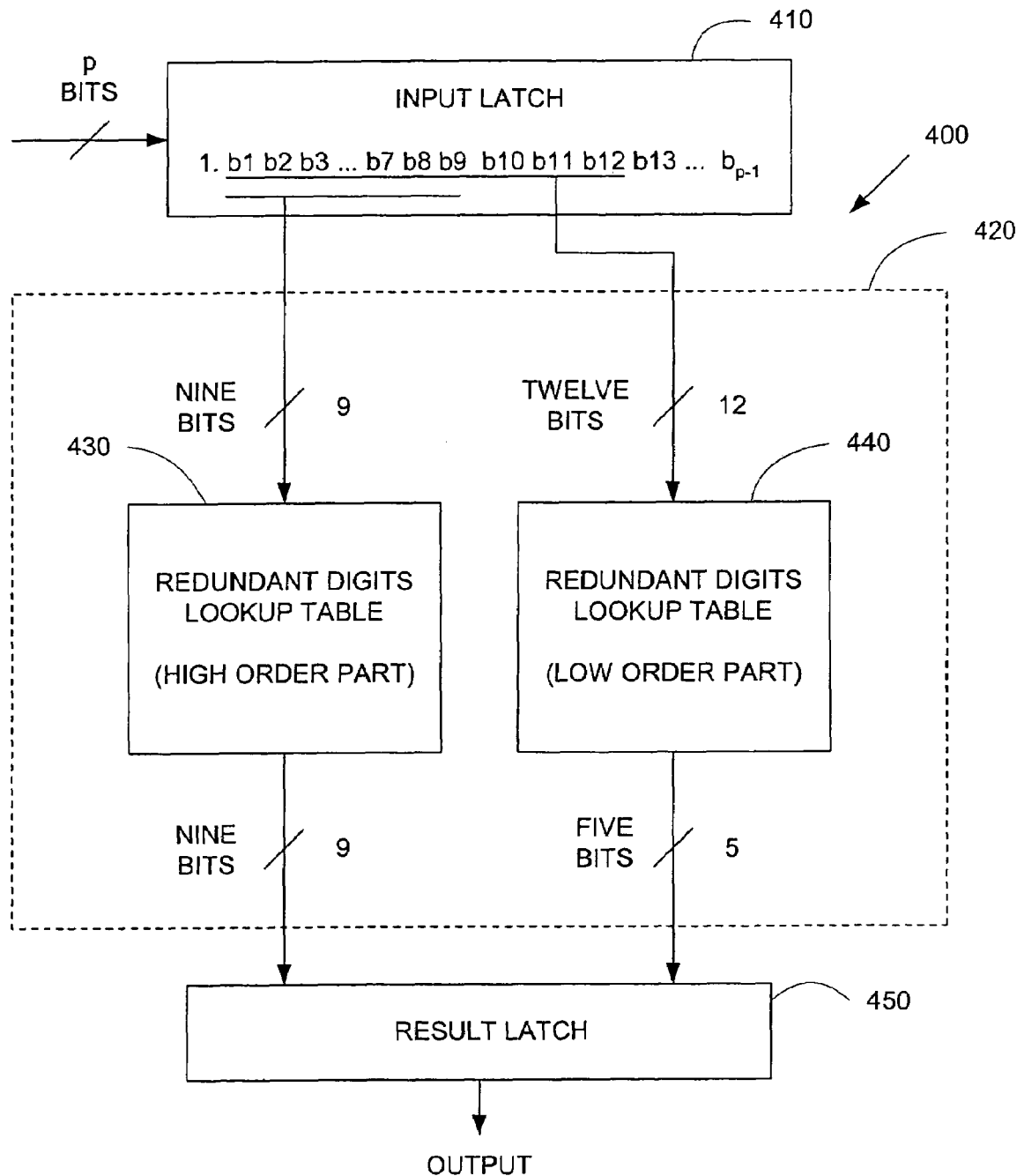
FIG. 4 illustrates a block diagram of an advantageous embodiment of a compressed direct lookup table of the present invention.

FIG. 4 illustrates a block diagram of an advantageous embodiment of a compressed direct lookup table unit 400 of the present invention. Compressed direct lookup table unit 400 receives into input latch 410 "p" input bits in the form of "1.$b_1b_2b_3b_4b_5b_6b_7b_8b_9b_{10}b_{11}b_{12}b_{13}\ldots b_{p-1}$." Input latch 410 provides twelve (12) "leading" input bits $b_1b_2b_3b_4b_5b_6b_7b_8b_9b_{10}b_{11}b_{12}$ to lookup table unit 420.

In particular, input latch 410 provides the leading nine (9) input bits $b_1b_2b_3b_4b_5b_6b_7b_8b_9$ to a redundant digits lookup table unit 430 of lookup table unit 420. Redundant digits lookup table unit 430 comprises the high order output parts of reciprocal binary lookup table 300 along with the two (2) common bits of the encoding of the eight (8) low order terms. Redundant digits lookup table unit 430 obtains the high order part of the output value. Input latch 410 also provides the twelve (12) leading input bits $b_1b_2b_3b_4b_5b_6b_7b_8b_9b_{10}b_{11}b_{12}$ to a redundant digits lookup table unit 440 of lookup table unit 420. Redundant digits lookup table unit 440 obtains the low order part of the output value.

Redundant digits lookup table unit 430 sends to result latch 450 nine (9) output bits that encode the "radix 4" digits of the high order part of the output, where two (2) of these nine (9) bits encode a common part of the leading redundant digit encoding of the low order part. Six (6) bits encode the three (3) "radix 4" digits $d_1$ $d_2$ $d_3$ in nonredundant form using two (2) bits for each digit, and the first input bit $b_1$ is also output as the encoding of $d_0$. Thus redundant digits lookup table unit 430 may be viewed as a "nine (9) bits in, nine (9) bits out" table providing the high order part of the output in a compressed encoding.

Redundant digits lookup table unit 440 uses the leading twelve (12) input bits $b_1b_2b_3b_4b_5b_6b_7b_8b_9b_{10}b_{11}b_{12}$ to obtain the appropriate low order digits part which can be found on a selected line of the five hundred twelve (512) lines of reciprocal binary lookup table 300. In particular, the leading nine (9) input bits $b_1b_2b_3b_4b_5b_6b_7b_8b_9$ determine the appropriate line of the five hundred twelve (512) lines of reciprocal binary lookup table 300 and the three (3) input bits $b_{10}b_{11}b_{12}$ designate the appropriate low order digits part in the selected line. Redundant digits lookup table unit 440 is constructed to have an encoding of these three (3) digits and sends to result latch 450 five (5) output bits that encode these three (3) "radix 4" digits of the low order part of the output. The encoding comprises two (2) bits each for the nonredundant digits $d_5$ and $d_6$ and the lowest bit of the three (3) bit compression maximum encoding of digit $d_4$. Thus Redundant digits lookup table unit 440 may be viewed as a "twelve (12) bits in, five (5) bits out" table providing the low order part of the output in the compressed encoding.

The concatenation of the high and low order parts provides the fourteen (14) bit encoding of the seven (7) digit "radix 4" output in the compressed encoding.

Figure 5:
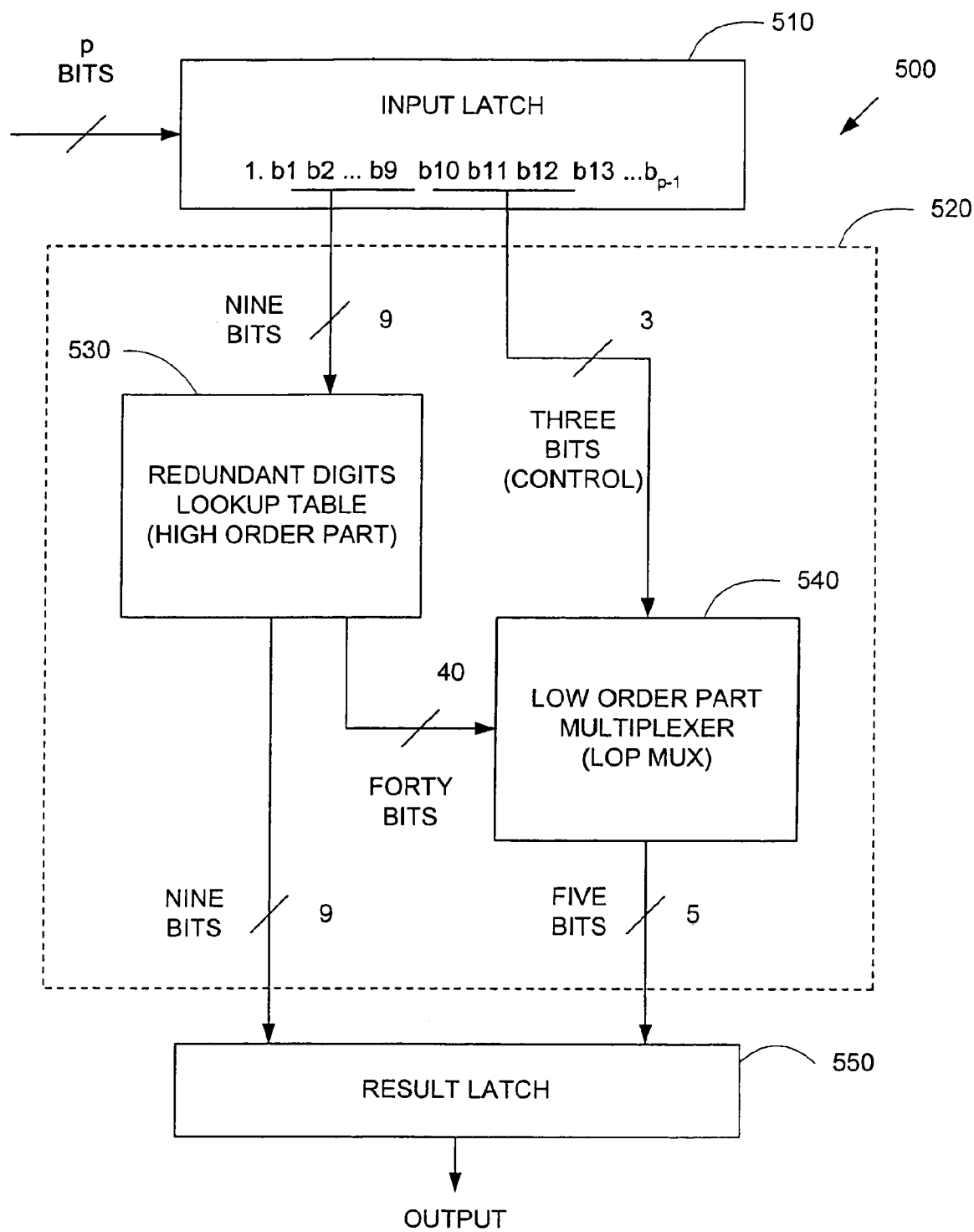
FIG. 5 illustrates a block diagram of an alternate advantageous embodiment of a compressed direct lookup table of the present invention.

FIG. 5 illustrates a block diagram of an alternate advantageous embodiment of a compressed direct lookup table unit 500 of the present invention. Compressed direct lookup table unit 500 receives into input latch 510 "p" input bits in the form of "1.$b_1b_2b_3b_4b_5b_6b_7b_8b_9$ $b_{10}b_{11}b_{12}b_{13}\ldots b_{p-1}$." Input latch 510 provides twelve (12) "leading" input bits $b_1b_2b_3b_4b_5b_6b_7b_8b_9b_{10}b_{11}b_{12}$ to lookup table unit 520.

In particular, input latch 510 provides the leading nine (9) input bits $b_1b_2b_3b_4b_5b_6b_7b_8b_9$ to a redundant digits lookup table unit 530 of lookup table unit 520. Redundant digits lookup table unit 530 comprises reciprocal binary lookup table 300. Redundant digits lookup table unit 530 obtains the high order part of the output value. Input latch 510 also provides three (3) low order input bits $b_{10}b_{11}b_{12}$ as control bits to a low order part multiplexer 540 of lookup table unit 520. Low order part multiplexer 540 identifies the correct low order part of the output value. The input bits $b_{10}b_{11}b_{12}$ are available to establish the path through the low order part multiplexer 540 while lookup occurs in redundant digits lookup table unit 530 so that there is little delay in selecting the desired low order part to be passed to result latch 550.

Redundant digits lookup table unit 530 uses the leading nine (9) input bits $b_1b_2b_3b_4b_5b_6b_7b_8b_9$ to find the appropriate line of the five hundred twelve (512) lines of reciprocal binary lookup table 300. Redundant digits lookup table unit 530 sends to result latch 550 nine (9) output bits that represent the "radix 4" digits of the high order part of the output along with the two (2) bits of the common part of the encoding of the leading digit of the low order part.

Redundant digits lookup table unit 530 also sends forty (40) bits to low order part multiplexer 540. The first five (5) bits of these forty (40) bits encode a first set of three (3) "radix 4" digits. This first set of three (3) "radix 4" digits encode a first one of the eight (8) low order output values in the selected line of table 300.

The second five (5) bits of these forty (40) bits encode a second set of three (3) "radix 4" digits. This second set of three (3) "radix 4" digits represent a second one of the eight (8) low order output values in the selected line of table 300.

Similarly, the remaining six (6) sets of five (5) bits encode respectively the remaining six (6) sets of three (3) "radix 4" digits that represent low order output values in the selected line of table 300.

Low order part multiplexer 540 uses the three (3) low order input bits $b_{10}b_{11}b_{12}$ from input latch 510 as control bits to select the appropriate set of three (3) "radix 4" digits from the eight (8) sets in the selected line of table 300. After the appropriate set of three (3) "radix 4" digits has been selected, low order part multiplexer 540 sends to result latch 550 five (5) output bits that encode the "radix 4" digits of the low order part of the output.

Because reciprocal binary lookup table 300 uses a redundant digit representation (here, a "radix 4" digit representation) there is no output "overflow" condition in the lines of table 300. Therefore, the output of redundant digits lookup table unit 530 and the output of low order part multiplexer 540 may be directly concatenated in result latch 550 to provide the desired output.

As an example, consider an input value of "1.011 111 010 101." The nine (9) high order bits "011 111 010" indicate the third line in the second portion of table 300 shown in FIG. 3. Redundant digits lookup table unit 530 sends to result latch 550 nine (9) output bits that represent the "radix 4" digits of the high order part of the output (i.e., the "radix 4" digits 2.$\overline{222}$).

Redundant digits lookup table unit 530 also sends forty (40) bits to low order part multiplexer 540 that represent the eight (8) sets of three (3) "radix 4" digits in the selected line. The eight (8) sets are [000] [00$\overline{1}$] [00$\overline{2}$] [0$\overline{1}$1] [0$\overline{1}$0] [0$\overline{1}\overline{1}$] [0$\overline{12}$] [0$\overline{12}$]. The brackets are employed for clarity to indicate the grouping of the "radix 4" digits. Low order part multiplexer 540 uses the three (3) low order input bits "101" from input latch 510 as control bits to select the group [0$\overline{1}\overline{1}$] from the group of eight (8) sets.

The output encoding of the digits 2.$\overline{222}$ of redundant digits lookup table unit 530 and the output encoding of the digits 0 $\overline{1}\overline{1}$ of low order part multiplexer 540 are directly concatenated in result latch 550 to provide the desired encoding of the output of 2.$\overline{222}$0$\overline{1}\overline{1}$.

The compressed direct lookup table unit 500 of the embodiment of the invention shown in FIG. 5 comprises reciprocal binary lookup table 300. Reciprocal binary lookup table 300 is an illustrative example of a redundant digits lookup table for performing a function evaluation (here, obtaining a reciprocal of a number). It is understood that the present invention is not limited to a redundant digits lookup table for obtaining a reciprocal of a number. The invention is directed to any redundant digits lookup table that is capable of performing a function evaluation.

Figure 6:
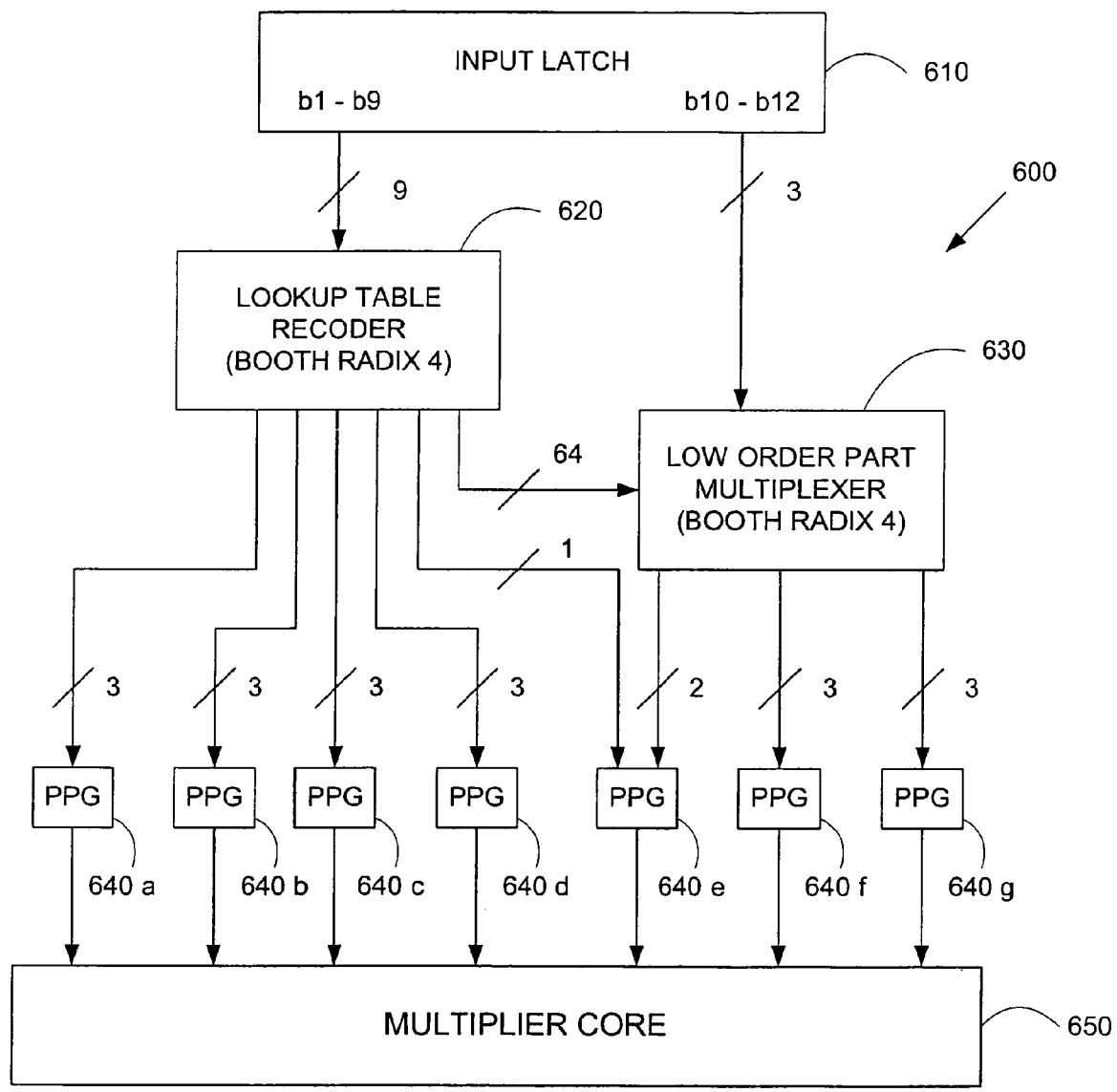
FIG. 6 illustrates a block diagram of an alternate advantageous embodiment of a compressed direct lookup table of the present invention that incorporates a Booth "radix 4" encoding format for the compressed direct lookup table.

FIG. 6 illustrates a block diagram of an alternate advantageous embodiment of a compressed direct lookup table unit 600 of the present invention. In this alternate embodiment the redundant digits lookup table unit 530 functions as a lookup table recoder unit 620. Lookup table recoder unit 620 also comprises reciprocal binary lookup table 300. Lookup table recoder unit 620 uses reciprocal binary lookup table 300 to perform the lookup function performed by redundant digits lookup table unit 530. In addition, lookup table recoder unit 620 recodes the output numeric values obtained from reciprocal binary lookup table 300.

In the embodiment shown in FIG. 6, lookup table recoder unit 620 performs Booth "radix 4" recoding. The high order part of the recoded output of lookup table recoder unit 620 goes directly to partial product generators (PPG) 640a through 640e. Lookup table recoder unit 620 provides three (3) bits of a recoded output value to each of PPG 640a, PPG 640b, PPG 640c, and PPG 640d. Lookup table recoder unit 620 provides one (1) bit of a recoded output value to PPG 640e.

Lookup table recoder unit 620 also provides sixty four (64) bits to low order part multiplexer 630 that represent recoded versions of the eight (8) sets of three (3) "radix 4" digits. In the same manner as low order part multiplexer 540, low order part multiplexer 630 uses the three (3) low order input bits $b_{10}b_{11}b_{12}$ from input latch 610 to select the appropriate recoded set of three (3) "radix 4" digits from the recoded versions of the eight (8) sets in the selected line of table 300. Low order part multiplexer 630 identifies the correct low order part of the recoded output value.

Because reciprocal binary lookup table 300 uses a redundant digit representation (here, a "radix 4" digit representation) there is no output "overflow" condition in the lines of table 300. Therefore, the output of lookup table recoder unit 620 and the output of low order part multiplexer 630 may be directly concatenated in partial product generators, 640a through 640g.

Low order part multiplexer 630 provides three (3) bits of a recoded output value to PPG 640f and three (3) bits of a recoded output value to PPG 640g. Low order part multiplexer 630 provides two (2) bits of a recoded output value to PPG 640e.

The outputs of partial product generators, 640a through 640g, are then provided to multiplier core 650 in accordance with well known principles.

The compressed direct lookup table unit 600 of the embodiment of the invention shown in FIG. 6 comprises reciprocal binary lookup table 300. Reciprocal binary lookup table 300 is an illustrative example of a redundant digits lookup table for performing a mathematical operation (here, obtaining a reciprocal of a number). It is understood that the present invention is not limited to a redundant digits lookup table for obtaining a reciprocal of a number. The invention is directed to any redundant digits lookup table that is capable of providing a function value.

Figure 7:
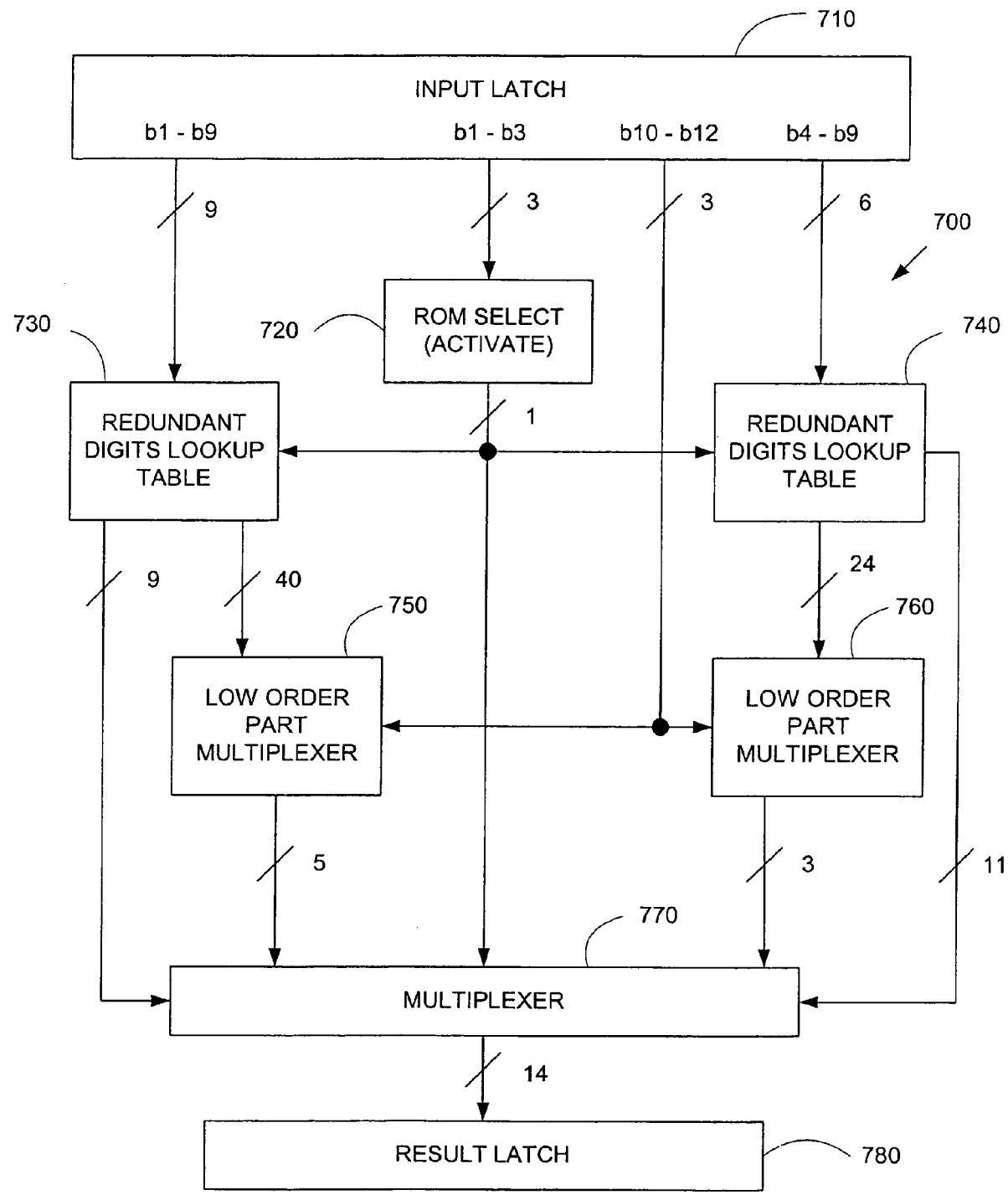
FIG. 7 illustrates a block diagram of another alternate advantageous embodiment that is capable of obtaining a lower power implementation of a compressed direct lookup table of the present invention.

FIG. 7 illustrates a block diagram of another alternate advantageous embodiment of a compressed direct lookup table unit 700 of the present invention. The embodiment of the invention shown in FIG. 7 comprises a first redundant digits lookup table 730 and a second redundant digits lookup table 740. As will be more fully discussed, the use of two redundant digit lookup tables allows greater compression and reduces overall power consumption.

Compressed direct lookup table unit 700 comprises a read only memory (ROM) select unit 720 that is capable of receiving three (3) bits of the input numeric value that is located in input latch 710. These three (3) bits represent the first three (3) leading bits of the input numeric value (i.e., bits "b1" and "b2" and "b3").

When read only memory (ROM) select unit 720 reads any bit combination other than three (3) ones ("111") then read only memory (ROM) select unit 720 activates power in that portion of compressed direct lookup table unit 700 that comprises first redundant digits lookup table unit 730 and low order part multiplexer 750. Power is not activated in the portion of compressed direct lookup table unit 700 that comprises second redundant digits lookup table unit 740 and low order part multiplexer 760.

Redundant digits lookup table unit 730 and low order part multiplexer 750 operate in the manner previously described for redundant digits lookup table unit 530 and low order part multiplexer 540. That is, first redundant digits lookup table 730 receives the first nine (9) leading bits (bit "b1" through bit "b9") from input latch 710 and low order part multiplexer 750 receives the tenth through twelfth bits (bit "b10" through "bit12") from input latch 710. First redundant digits lookup table 730 provides forty (40) bits to low order part multiplexer 750 as previously described. However, for reasons that will be explained, redundant digits lookup table 300 in redundant digits lookup table unit 730 does not contain table entries having the leading three (3) bits set to a value of one ("1"). The output numeric value from first redundant digits lookup table 730 and low order part multiplexer 750 is provided to multiplexer 770.

When read only memory (ROM) select unit 720 reads a bit combination of three (3) ones ("111") then read only memory (ROM) select unit 720 activates power in that portion of compressed direct lookup table unit 700 that comprises second redundant digits lookup table unit 740 and low order part multiplexer 760. Power is not activated in the portion of compressed direct lookup table unit 700 that comprises first redundant digits lookup table unit 730 and low order part multiplexer 750.

Redundant digits lookup table unit 740 and low order part multiplexer 760 operate in the manner previously described for redundant digits lookup table unit 530 and low order part multiplexer 540 except that (1) second redundant digits lookup table unit 740 receives the fourth through ninth bits (bit "b4" through "bit9") from input latch 710 and (2) redundant digits lookup table 300 in redundant digits lookup table unit 740 contains only those table entries that have the leading three (3) bits set to a value of one ("1").

Second redundant digits lookup table unit 740 is activated only for input numeric values that have bits "b1" through "b3" set to a value of one ("1"). This means that redundant digits lookup table unit 740 only passes twenty four (24) bits to low order part multiplexer 760 (representing eight (8) sets of three (3) bits of the low order digits parts). Redundant digits lookup table unit 740 passes eleven (11) bits directly to multiplexer 770. Low order part multiplexer 760 passes to multiplexer 770 three (3) output bits that represent the low order part of the output.

Read only memory (ROM) select unit 720 sends an enable signal to multiplexer 770 to select (1) a first output numeric value from first redundant digits lookup table unit 730 and low order part multiplexer 750, or (2) a second output numeric value from second redundant digits lookup table unit 740 and low order part multiplexer 760. Multiplexer 770 provides the selected output numeric value to result latch 780.

The alternate advantageous embodiment of the invention shown in FIG. 7 is an example of a compressed direct lookup table unit that comprises more than one redundant digits table lookup unit. The present invention is not limited to using only two redundant digits lookup table units. Three or more such units may be used. The alternate advantageous embodiment shown in FIG. 7 is but one example of a compressed direct lookup table unit that uses a plurality of redundant digits lookup table units.

The use of two or more redundant digits lookup table units provides more compression. In addition, because only one portion of the compressed direct lookup table unit is powered up at any particular time, power is conserved in the operation of the unit.

If the size of reciprocal binary lookup table 300 is increased to a "fourteen (14) bits in, fourteen (14) bits out" table, then the output would partition 4|3 into seven "radix 4" digits. If the size of reciprocal binary lookup table 300 is increased to a "sixteen (16) bits in, sixteen (16) bits out" table, then the output would partition 5|3 into eight "radix 4" digits. In other words, as the size of "k" grows, the high order output partition size also grows. However, the low order partition remains the same size on each line improving the compression.

Compression measured at the digit level is about fifty percent (50%) in reciprocal binary lookup table 300 because the high order fraction digit triple $d_1d_2d_3$ is stored only once per eight (8) low order digit triple $d_4d_5d_6$ (recall that the leading normalized digit $d_0$ does not need to be stored). For an "eighteen (18) bits in, eighteen (18) bits out" table the compression has improved down to almost thirty three percent (33%). The lookup procedure for a much larger table could be iterated to yield a somewhat greater compression.

For example, an "eighteen (18) bits in, eighteen (18) bits out" table could have the input partitioned into three parts of size 11|4|3. In such a case the eleven (11) leading fraction bits would index a block of sixteen (16) lines. The next four (4) bits would index a line of the block. The leading four (4) output "radix 4" fraction digits could be listed just once for the block with the next two (2) "radix 4" digits found on the line. The final three (3) "radix 4" digits are selected from a column entry on the line. Here the first of the two middle digits for the sixteen (16) output lines of the block will have at most two (2) successive values, so that the redundant digit set ensures that no overflow situation occurs. Concatenation of the leading four (4) output fraction digits of the block, the next two (2) output digits from the indexed line of the block, and the final three (3) output digits selected from a column entry on that line provides the nine (9) fraction digit output.

It should be clear to one skilled in the art that many hierarchical choices to achieve greater compression can be achieved with the redundancy in the digit values allowing straightforward concatenation of parts to compute the result. It should also be clear that redundant output in a higher radix is achievable in the same manner. A "twelve (12) bits in, twelve (12) bits out" table could have the input bits partition 10|2 with the output recoded to four (4) "radix 8" fraction digits in the range [−4, 4] partitioned 2|2. Each of the $2^{10}$ output lines would contain a leading fraction part of two (2) "radix 8" digits followed by four (4) low order parts of two (2) "radix 8" digits each. The line corresponding to the first half of line seven from reciprocal binary lookup table 300 would become:

TABLE THREE

|  |  | 00 | 01 | 10 | 11 |
|---|---|---|---|---|---|
| 1.000 000 110 0: | 2.0$\bar{2}$ | 40 | 4$\bar{2}$ | 4$\bar{4}$ | 42 |

Figure 8:
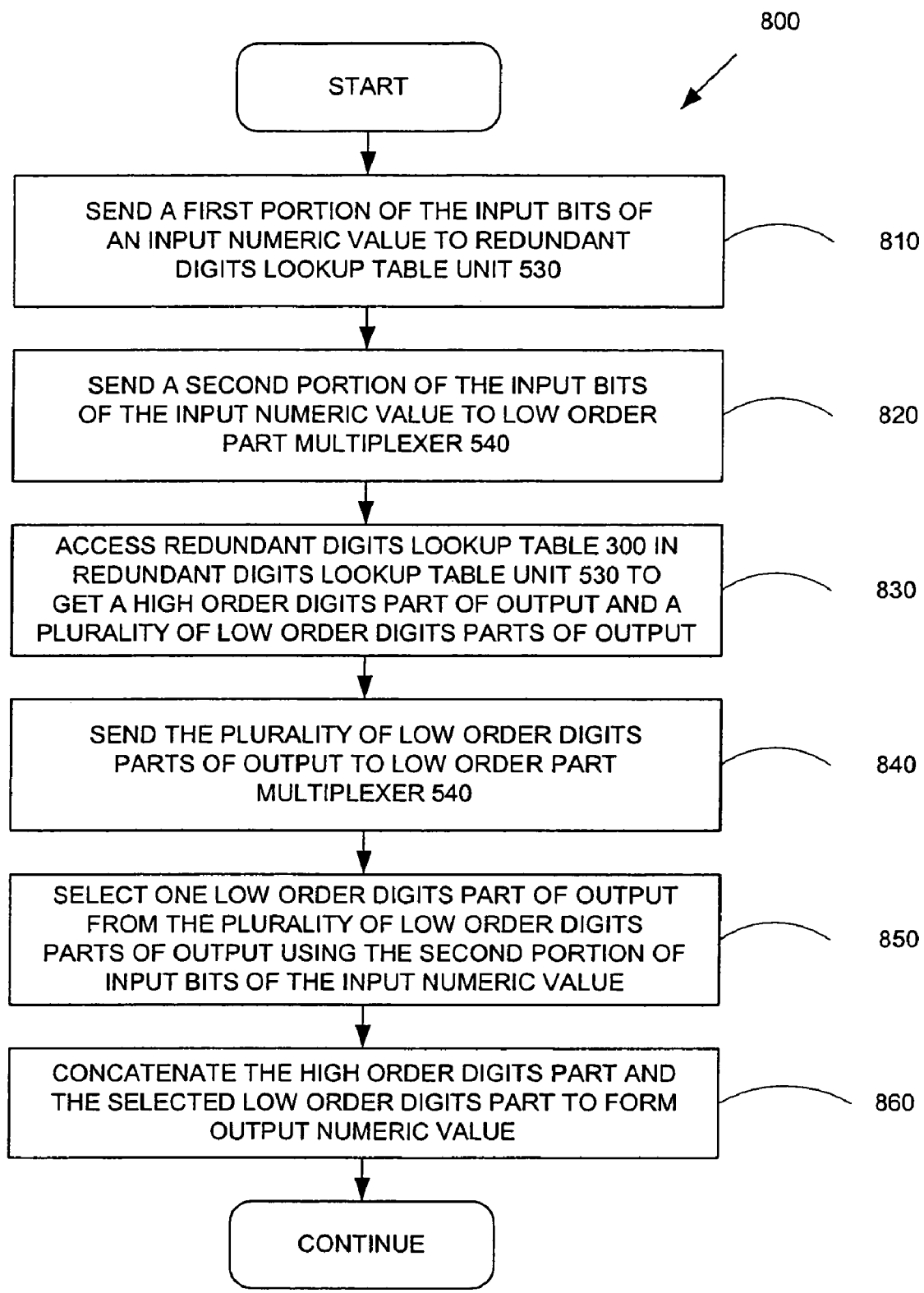
FIG. 8 illustrates a flow chart showing the steps of one advantageous embodiment of a method of the present invention.

FIG. 8 illustrates a flow chart of an advantageous embodiment of a method of the present invention for providing a compressed direct lookup table unit. The steps of the method shown in FIG. 8 are generally denoted with reference numeral 800.

An input numeric value is represented by a plurality of input bits. In one embodiment of the method of the invention a first portion of the input bits are sent to redundant digits lookup table unit 530 (step 810). A second portion of the input bits are sent to low order part multiplexer 540 (step 820).

Redundant digits lookup table unit 530 accesses redundant digits lookup table 300 to obtain a high order digits part of an output numeric value and to obtain a plurality of low order digits part of the output numeric value (step 830). Redundant digits lookup table unit 530 sends the plurality of low order digits parts to low order part multiplexer 540 (step 840).

Low order part multiplexer 540 selects one of the low order digits parts for the low order output numeric value from the plurality of low order digits parts (step 850). The high order digit part from redundant digits lookup table unit 530 and the selected low order digits part from the low order part multiplexer 540 are concatenated to form the output numeric value (step 860).

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

APPENDIX ONE

LOGARITHMS (Continued)

| N. |  | 0 | 1 | 2 | 3 | 4 | 5 | 6 | 7 | 8 | 9 | d. |
|---|---|---|---|---|---|---|---|---|---|---|---|---|
| 1150 | 060 | 8978 | 7356 | 7734 | 8111 | 8489 | 8866 | 9244 | 9621 | 9999 | *0376 | 378 |
| 1151 | 061 | 0753 | 1131 | 1508 | 1885 | 2262 | 2639 | 3017 | 3394 | 3771 | 4148 | 377 |
| 1152 |  | 4525 | 4902 | 5279 | 5656 | 6032 | 6409 | 6786 | 7163 | 7540 | 7916 | 377 |
| 1153 |  | 8293 | 8670 | 9046 | 9423 | 9799 | *0176 | *0552 | *0929 | *1305 | *1682 | 377 |
| 1154 | 062 | 2058 | 2434 | 2811 | 3187 | 3563 | 3939 | 4316 | 4692 | 5068 | 5444 | 376 |
| 1155 |  | 5820 | 6196 | 6572 | 6948 | 7324 | 7699 | 8075 | 8451 | 8827 | 9203 | 376 |
| 1156 |  | 9578 | 9954 | *0330 | *0705 | *1081 | *1456 | *1832 | *2207 | *2583 | *2958 | 376 |
| 1157 | 063 | 3334 | 3709 | 4064 | 4460 | 4835 | 5210 | 5585 | 5960 | 6335 | 6711 | 375 |
| 1158 |  | 7086 | 7461 | 7836 | 8211 | 8585 | 8960 | 9335 | 9710 | *0085 | *0460 | 375 |
| 1159 | 064 | 0834 | 1209 | 1584 | 1958 | 2333 | 2708 | 3082 | 3457 | 3831 | 4205 | 375 |
| 1160 |  | 4580 | 4954 | 5329 | 5703 | 6077 | 6451 | 6826 | 7200 | 7574 | 7948 | 374 |
| 1161 |  | 8322 | 8696 | 9070 | 9444 | 9818 | *0192 | *0566 | *0940 | *1314 | *1668 | 374 |
| 1162 | 065 | 2061 | 2435 | 2809 | 3182 | 3556 | 3930 | 4303 | 4677 | 5050 | 5424 | 374 |
| 1163 |  | 5797 | 6171 | 6544 | 6917 | 7291 | 7664 | 8037 | 8410 | 8784 | 9157 | 373 |
| 1164 |  | 9530 | 9903 | *0276 | *0649 | *1022 | *1395 | *1768 | *2141 | *2514 | *2886 | 373 |
| 1165 | 066 | 3259 | 3832 | 4005 | 4377 | 4750 | 5123 | 5495 | 5868 | 6241 | 6613 | 373 |
| 1166 |  | 6986 | 7358 | 7730 | 8103 | 8475 | 8847 | 9220 | 9592 | 9964 | *0336 | 372 |
| 1167 | 067 | 0709 | 1081 | 1453 | 1825 | 2197 | 2589 | 2941 | 3313 | 3685 | 4057 | 372 |
| 1168 |  | 4428 | 4800 | 5172 | 5544 | 5915 | 6287 | 6659 | 7030 | 7402 | 7774 | 372 |
| 1169 |  | 8145 | 8517 | 8888 | 9259 | 9631 | *0002 | *0374 | *0745 | *1116 | *1487 | 371 |
| 1170 | 068 | 1859 | 2230 | 2601 | 2972 | 3343 | 3714 | 4085 | 4456 | 4827 | 5198 | 371 |
| 1171 |  | 5569 | 5940 | 6311 | 6681 | 7052 | 7423 | 7794 | 8164 | 8536 | 8906 | 371 |
| 1172 |  | 9278 | 9647 | *0017 | *0388 | *0758 | *1129 | *1499 | *1869 | *2240 | *2610 | 370 |
| 1173 | 069 | 2980 | 3350 | 3721 | 4091 | 4461 | 4831 | 5201 | 5571 | 5941 | 6311 | 370 |
| 1174 |  | 6681 | 7051 | 7421 | 7791 | 8160 | 8530 | 8900 | 9270 | 9639 | *0009 | 370 |
| 1175 | 070 | 0379 | 0748 | 1118 | 1487 | 1857 | 2226 | 2596 | 2965 | 3335 | 3704 | 369 |
| 1176 |  | 4073 | 4442 | 4812 | 5181 | 5550 | 5919 | 6288 | 6658 | 7027 | 7396 | 369 |
| 1177 |  | 7765 | 8134 | 8603 | 8871 | 9240 | 9609 | 9978 | *0347 | *0715 | *1084 | 369 |
| 1178 | 071 | 1453 | 1822 | 2190 | 2559 | 2927 | 3296 | 3664 | 4033 | 4401 | 4770 | 369 |
| 1179 |  | 5138 | 5506 | 5875 | 6243 | 6611 | 6979 | 7348 | 7716 | 8084 | 8452 | 368 |
| 1180 |  | 8820 | 9188 | 9556 | 9924 | *0292 | *0660 | *1028 | *1396 | *1763 | *2131 | 368 |
| 1181 | 072 | 2499 | 2867 | 3234 | 3602 | 3970 | 4337 | 4705 | 5072 | 5440 | 5807 | 368 |
| 1182 |  | 6175 | 6542 | 6910 | 7277 | 7644 | 8011 | 8379 | 8746 | 9113 | 9480 | 367 |
| 1183 |  | 9847 | *0215 | *0582 | *0949 | *1316 | *1683 | *2050 | *2416 | *2783 | *3150 | 367 |
| 1184 | 073 | 3517 | 3884 | 4251 | 4617 | 4984 | 5351 | 5717 | 6084 | 6450 | 6817 | 367 |
| 1185 |  | 7184 | 7550 | 7916 | 8283 | 8649 | 9016 | 9382 | 9748 | *0114 | *0481 | 366 |
| 1186 | 074 | 0847 | 1213 | 1579 | 1945 | 2311 | 2677 | 3043 | 3409 | 3775 | 4141 | 366 |
| 1187 |  | 4507 | 4873 | 5239 | 5605 | 5970 | 6336 | 6702 | 7088 | 7433 | 7799 | 366 |
| 1188 |  | 8164 | 8530 | 3896 | 9261 | 9626 | 9992 | *0357 | *0723 | *1088 | *1453 | 365 |
| 1189 | 075 | 1819 | 2184 | 2549 | 2914 | 3279 | 3644 | 4010 | 4375 | 4740 | 5105 | 365 |
| 1190 |  | 5470 | 5835 | 6199 | 6564 | 6929 | 7294 | 7659 | 8024 | 8388 | 8753 | 365 |
| 1191 |  | 9118 | 9482 | 9847 | *0211 | *0576 | *0940 | *1305 | *1669 | *2034 | *2398 | 364 |
| 1192 | 076 | 2763 | 3127 | 3491 | 3855 | 4220 | 4584 | 4948 | 5312 | 5676 | 6040 | 364 |
| 1193 |  | 6404 | 6768 | 7132 | 7496 | 7860 | 8224 | 8588 | 8952 | 9316 | 9680 | 364 |
| 1194 | 077 | 0043 | 0407 | 0771 | 1134 | 1498 | 1862 | 2225 | 2589 | 2952 | 3316 | 364 |
| 1195 |  | 3679 | 4042 | 4406 | 4769 | 5133 | 5496 | 5859 | 6222 | 6586 | 6949 | 363 |
| 1196 |  | 7312 | 7675 | 8038 | 8401 | 8764 | 9127 | 9490 | 9853 | *0216 | *0579 | 363 |
| 1197 | 078 | 0942 | 1304 | 1667 | 2030 | 2393 | 2755 | 3118 | 3480 | 3843 | 4206 | 363 |
| 1198 |  | 4568 | 4931 | 5293 | 5656 | 6018 | 6380 | 6743 | 7105 | 7467 | 7830 | 362 |

APPENDIX ONE-continued

LOGARITHMS (Continued)

| 1199 |   | 8192 | 8554 | 8916 | 9278 | 9640 | *0003 | *0365 | *0727 | *1089 | *1451 | 362 |
|------|---|------|------|------|------|------|-------|-------|-------|-------|-------|-----|
| 1200 | 079 | 1812 | 2174 | 2536 | 2898 | 3260 | 3622 | 3983 | 4345 | 4707 | 5068 | 362 |
| N. | 0 | 1 | 2 | 3 | 4 | 5 | 6 | 7 | 8 | 9 | d. |

APPENDIX TWO

|  | 000 | 001 | 010 | 011 | 100 | 101 | 110 | 111 |
|---|---|---|---|---|---|---|---|---|

Part 1
1.000000000000(1)-1.000011111111(1)

| | 000 | 001 | 010 | 011 | 100 | 101 | 110 | 111 |
|---|---|---|---|---|---|---|---|---|
| 1.000000000: | +2.+0+0+0 | +0+0-1 | +0-1+1 | +0-1-1 | +0-2+1 | +0-2-1 | -1+1+1 | -1+1-1 | -1+0+1 |
| 1.000000001: | +2.+0+0+0 | -1+0-1 | -1-1+1 | -1-1-1 | -1-2+1 | -1-2-1 | -2+1+1 | -2+1-1 | -2+0+1 |
| 1.000000010: | +2.+0+0-1 | +2+0-1 | +2-1+1 | +2-1-1 | +2-2+1 | +2-2-1 | +1+1+1 | +1+1-1 | +1+0+1 |
| 1.000000011: | +2.+0+0-1 | +1+0-1 | +1-1+1 | +1-1-1 | +1-2+1 | +1-2-1 | +0+1+1 | +0+1-1 | +0+0+1 |
| 1.000000100: | +2.+0+0-1 | +0+0+0 | +0+0-2 | +0-1+0 | +0-1-2 | +0-2+0 | +0-2-2 | -1+1+0 | -1+1-2 |
| 1.000000101: | +2.+0+0-1 | -1+0+0 | -1+0-2 | -1-1+0 | -1-1-2 | -1-2+0 | -1-2-2 | -2+1+0 | -2+1-2 |
| 1.000000110: | +2.+0+0-2 | +2+0+0 | +2+0-2 | +2-1+0 | +2-1-2 | +2-2+0 | +2-2-2 | +1+1+0 | +1+1-2 |
| 1.000000111: | +2.+0+0-2 | +1+0+1 | +1+0-1 | +1-1+1 | +1-1-1 | +1-2+1 | +1-2-1 | +0+1+1 | +0+1-1 |
| 1.000001000: | +2.+0+0-2 | +0+0+1 | +0+0-1 | +0-1+1 | +0-1-1 | +0-2+1 | +0-2-1 | -1+1+1 | -1+1-1 |
| 1.000001001: | +2.+0+0-2 | -1+1-2 | -1+0+0 | -1+0-2 | -1-1+0 | -1-1-2 | -1-2+0 | -1-2-2 | -2+1+0 |
| 1.000001010: | +2.+0-1+1 | +2-1-2 | +2+0+0 | +2+0-2 | +2-1+0 | +2-1-2 | +2-2+0 | +2-2-1 | +1+1+1 |
| 1.000001011: | +2.+0-1+1 | +1+1-1 | +1+0+1 | +1+0-1 | +1-1+1 | +1-1-1 | +1-2+1 | +1-2-1 | +0+1+1 |
| 1.000001100: | +2.+0-1+1 | +0+1-1 | +0+1-2 | +0+0+0 | +0+0-2 | +0-1+0 | +0-1-2 | +0-2+0 | +0-2-2 |
| 1.000001101: | +2.+0-1+1 | -1+1+0 | -1+1-2 | -1+0+0 | -1+0-2 | -1-1+1 | -1-1-1 | -1-2+1 | -1-2-1 |
| 1.000001110: | +2.+0-1+1 | -2+1+1 | -2+1-1 | -2+0+1 | -2+0-1 | -2-1+1 | -2-1+0 | -2-1-2 | -2-2+0 |
| 1.000001111: | +2.+0-1+0 | +2-2+2 | +1+1+0 | +1+1-2 | +1+0+2 | +1+0-2 | +1-1+0 | +1-1-2 | +0+1+2 |
| 1.000010000: | +2.+0-1+0 | +1-2-1 | +0+1+1 | +0+1-1 | +0+0+1 | +0+0-1 | +0-1+1 | +0-1+0 | +0-1-2 |
| 1.000010001: | +2.+0-1+0 | +0-2+0 | +0-2-2 | -1+1+0 | -1+1-2 | -1+0+0 | -1+0-2 | -1-1+1 | -1-1-1 |
| 1.000010010: | +2.+0-1+0 | -1-2+1 | -1-2-1 | -2+1+1 | -2+1-1 | -2+0+1 | -2+0+0 | -2+0-2 | -2-1+0 |
| 1.000010011: | +2.+0-1-1 | +2-1-2 | +2+0+0 | +2-2-2 | +1+1+0 | +1+1-1 | +1+0+1 | +1+0-1 | +1-1+1 |
| 1.000010100: | +2.+0-1-1 | +1-1-1 | +1-2+1 | +1-2-1 | +1-2-2 | +0+1+0 | +0+1-2 | +0+0+0 | +0+0-2 |
| 1.000010101: | +2.+0-1-1 | +0-1+0 | +0-1-2 | +0-2+1 | +0-2-1 | -1+1+1 | -1+1-1 | -1+0+1 | -1+0-1 |
| 1.000010110: | +2.+0-1-1 | -1+0-2 | -1-1+0 | -1-1-2 | -1-2+0 | -1-2-2 | -2+1+0 | -2+1-1 | -2+0+1 |
| 1.000010111: | +2.+0-1-2 | +2+0-1 | +2-1+1 | +2-1-1 | +2-2+1 | +2-2-1 | +1+1+0 | +1+1-2 | +0+1+2 |
| 1.000011000: | +2.+0-1-2 | +1+0+0 | +1+0-2 | +1-1+1 | +1-1-1 | +1-2+1 | +1-2-1 | +0+1+1 | +0+1-1 |
| 1.000011001: | +2.+0-1-2 | +0+1-2 | +0+0+0 | +0+0-2 | +0-1+0 | +0-1-2 | +0-2+1 | +0-2-1 | -1+1+1 |
| 1.000011010: | +2.+0-1-2 | -1+1-1 | -1+0+1 | -1+0+0 | -1+0-2 | -1-1+0 | -1-1-2 | -1-2+0 | -1-2-1 |
| 1.000011011: | +2.+0-1-2 | -2+1+1 | -2+1-1 | -2+0+1 | -2+0-1 | -2+0-2 | -2-1+0 | -2-1-2 | -2-2+0 |
| 1.000011100: | +2.+0-2+1 | +2-2-2 | +1+1+1 | +1+1-1 | +1+0+1 | +1+0-1 | +1-1+1 | +1-1+0 | +1-1-2 |
| 1.000011101: | +2.+0-2+1 | +1-2+0 | +1-2-2 | +0+1+0 | +0+1-1 | +0+0+1 | +0+0-1 | +0-1+1 | +0-1-1 |
| 1.000011110: | +2.+0-2+1 | +0-1-2 | +0-2+0 | +0-2-2 | -1+1+0 | -1+1-1 | -1+0+1 | -1+0-1 | -1-1+1 |
| 1.000011111: | +2.+0-2+1 | -1-1-1 | -1-1-2 | -1-2+0 | -1-2-2 | -2+1+0 | -2+1-1 | -2+0+1 | -2+0-1 |

Part 2
1.000100000000(1)-1.000111111111(1)

| | 000 | 001 | 010 | 011 | 100 | 101 | 110 | 111 |
|---|---|---|---|---|---|---|---|---|
| 1.000100000: | +2.+0-2+0 | +2-1+1 | +2-1-1 | +2-1-2 | +2-2+0 | +2-2-2 | +1+1+1 | +1+1-1 | +1+0+1 |
| 1.000100001: | +2.+0-2+0 | +1+0-1 | +1-1+1 | +1-1+0 | +1-1-2 | +1-2+0 | +1-2-2 | +0+1+1 | +0+1-1 |
| 1.000100010: | +2.+0-2+0 | +0+0+1 | +0+1-1 | +0-1+1 | +0-1+0 | +0-1-2 | +0-2+0 | +0-2-2 | -1+1+1 |
| 1.000100011: | +2.+0-2+0 | -1+1-1 | -1+0+1 | -1+0-1 | -1+0-2 | -1-1+0 | -1-1-2 | -1-2+0 | -1-2-1 |
| 1.000100100: | +2.+0-2+0 | -2+1+1 | -2+1-1 | -2+0+1 | -2+0+0 | -2+0-2 | -2-1+0 | -2-1-1 | -2-2+1 |
| 1.000100101: | +2.+0-2-1 | +2-2-1 | +1+1+1 | +1+1+0 | +1+1-2 | +1+0+2 | +1+0-2 | +1-1+0 | +1-1-2 |
| 1.000100110: | +2.+0-2-1 | +1-2+1 | +1-2-1 | +1-2-2 | +0+1+0 | +0+1-2 | +0+0+0 | +0+0-1 | +0-1+1 |
| 1.000100111: | +2.+0-2-1 | +0-1-1 | +0-1-2 | +0-2+0 | +0-2-2 | -1+1+0 | -1+1-1 | -1+0+1 | -1+0-1 |
| 1.000101000: | +2.+0-2-1 | -1+0-2 | -1-1+0 | -1-1-2 | -1-2+0 | -1-2-1 | -2+1+1 | -2+1-1 | -2+0+1 |
| 1.000101001: | +2.+0-2-2 | +2+0+0 | +2+0-2 | +2-1+0 | +2-1-1 | +2-2+1 | +2-2-1 | +1+1+0 | +1+1-2 |
| 1.000101010: | +2.+0-2-2 | +1+1-2 | +1+1+0 | +1+0-1 | +1+0-1 | +1-1-1 | +1-1-2 | +1-2+0 | +1-2-2 |
| 1.000101011: | +2.+0-2-2 | +0+1+0 | +0+1-1 | +0+0+1 | +0+0-1 | +0+0-2 | +0-1+0 | +0-1-2 | +0-2+1 |
| 1.000101100: | +2.+0-2-2 | +0-2-1 | -1+1+1 | -1+0-1 | -1+1-2 | -1+0+0 | -1+0-2 | -1-1+1 | -1-1-1 |
| 1.000101101: | +2.+0-2-2 | -1-2+1 | -1-2+0 | -1-2-2 | -2+1+1 | -2+1-1 | -2+0+1 | -2+0-1 | -2-1+1 |
| 1.000101110: | +2.-1+1+1 | +2-1+0 | +2-1-2 | +2-2+0 | +2-2-1 | +1+1+1 | +1+1-1 | +1+1-2 | +1+0+0 |
| 1.000101111: | +2.-1+1+1 | +1+0-2 | +1-1+1 | +1-1-1 | +1-2+1 | +1-2+0 | +1-2-2 | +0+1+0 | +0+1-1 |
| 1.000110000: | +2.-1+1+1 | +0+0+1 | +0+0-1 | +0+0-2 | +0-1+0 | +0-1-2 | +0-2+1 | +0-2-1 | -1+1+1 |
| 1.000110001: | +2.-1+1+1 | -1+1+1 | -1+1-1 | -1+0+1 | -1+0+0 | -1-1+1 | -1-1-1 | -1-2+1 | -1-2+0 |
| 1.000110010: | +2.-1+1+1 | -1-2-2 | -2+1+1 | -2+1-1 | -2+0+1 | -2+0+0 | -2+0-2 | -2-1+0 | -2-1-1 |
| 1.000110011: | +2.-1+1+0 | +2-2+1 | +2-2-1 | +2-2-2 | +1+1+0 | +1+1-2 | +1+0+1 | +1+0-1 | +1+0-2 |
| 1.000110100: | +2.-1+1+0 | +1-1+0 | +1-1-2 | +1-2+1 | +1-2-1 | +0+1+1 | +0+1+0 | +0+1-2 | +0+0+0 |
| 1.000110101: | +2.-1+1+0 | +0+0-1 | +0+0-1 | +0-1+1 | +0-1-2 | +0-2+1 | +0-2-1 | -1+1+1 | -1+1-1 |
| 1.000110110: | +2.-1+1+0 | -1+1-2 | -1+0+0 | -1+0-2 | -1-1+0 | -1-1-1 | -1-2+1 | -1-2+0 | -1-2-2 |
| 1.000110111: | +2.-1+1+0 | -2+1+1 | -2+1-1 | -2+0+1 | -2+0+0 | -2+0-2 | -2-1+0 | -2-1-1 | -2-2+1 |
| 1.000111000: | +2.-1+1-1 | +2-2+0 | +2-2-2 | +1+1+0 | +1+1-1 | +1+0+1 | +1+0-1 | +1+0-2 | +1-1+0 |
| 1.000111001: | +2.-1+1-1 | +1-1-1 | +1-1+1 | +1-2-1 | +1-2-2 | +0+1+0 | +0+1-2 | +0+0+1 | +0+0-1 |
| 1.000111010: | +2.-1+1-1 | +0+0-2 | +0-1+0 | +0-1-2 | +0-2+1 | +0-2-1 | +0-2-2 | -1+1+0 | -1+1-2 |

APPENDIX TWO-continued

|  | 000 | 001 | 010 | 011 | 100 | 101 | 110 | 111 |
|---|---|---|---|---|---|---|---|---|
| 1.000111011: | +2.-1+1-1 | -1+0+1 | -1+0-1 | -1+0-2 | -1-1+0 | -1-1-2 | -1-2+1 | -1-2-1 | -1-2-2 |
| 1.000111100: | +2.-1+1-1 | -2+1+0 | -2+1-2 | -2+0-1 | -2+0-1 | -2-1+1 | -2-1+0 | -2-1-1 | -2-2+1 |
| 1.000111101: | +2.-1+1-2 | +2-2-1 | +2-2-2 | +1+1+0 | +1+1+1 | +1+1-2 | +1+0+1 | +1+0-2 | +1-1+0 |
| 1.000111110: | +2.-1+1-2 | +1-1-2 | +1-2+1 | +1-2-1 | +1-2-2 | +0+1+0 | +0+1-2 | +0+0+1 | +0+0-1 |
| 1.000111111: | +2.-1+1-2 | +0+0-2 | +0-1+0 | +0-1-2 | +0-2+1 | +0-2-1 | +0-2-2 | -1+1+0 | -1+1-1 |

Part 3
1.001000000000(1)-1.001011111111(1)

| 1.001000000: | +2.-1+1-2 | -1+0+1 | -1+0-1 | -1+0-2 | -1-1+0 | -1-1-1 | -1-2+1 | -1-2+0 | -1-2-2 |
| 1.001000001: | +2.-1+1-2 | -2+1+0 | -2+1-1 | -2+0+1 | -2+0+0 | -2+0-2 | -2-1+1 | -2-1-1 | -2-2+1 |
| 1.001000010: | +2.-1+0+1 | +2-2+0 | +2-2-2 | +1+1+1 | +1+1-1 | +1+1-2 | +1+0+0 | +1+0-2 | +1-1+1 |
| 1.001000011: | +2.-1+0+1 | +1-1-1 | +1-1-2 | +1-2+0 | +1-2-1 | +0+1+1 | +0+1-1 | +0+1-2 | +0+0+0 |
| 1.001000100: | +2.-1+0+1 | +0+0-1 | +0-1+1 | +0-1+0 | +0-1-2 | +0-2+1 | +0-2-1 | -1+1+1 | -1+1+0 |
| 1.001000101: | +2.-1+0+1 | -1+1-1 | -1+0+1 | -1+0-1 | -1+0-2 | -1-1+0 | -1-1-1 | -1-2+1 | -1-2-1 |
| 1.001000110: | +2.-1+0+1 | -1-2-2 | -2+1+0 | -2+1-1 | -2+0+1 | -2+0+0 | -2+0-2 | -2-1+1 | -2-1-1 |
| 1.001000111: | +2.-1+0+0 | +2-1-2 | +2+2+0 | +2-2-2 | +1+1+1 | +1+1-1 | +1+1-2 | +1+0+0 | +1+0-1 |
| 1.001001000: | +2.-1+0+0 | +1-1+1 | +1-1+0 | +1-1-2 | +1-2+1 | +1-2-1 | +1-2-2 | +0+1+0 | +0+1-1 |
| 1.001001001: | +2.-1+0+0 | +0+0+1 | +0+0-1 | +0+0-2 | +0-1+0 | +0-1-1 | +0-2+1 | +0-2+1 | +0-2-2 |
| 1.001001010: | +2.-1+0+0 | -1+1+1 | -1+1-1 | -1+1-2 | -1+0+0 | -1+0-1 | -1-1+1 | -1-1+0 | -1-1-2 |
| 1.001001011: | +2.-1+0+0 | -1-2+1 | -1-2-1 | -1-2-2 | -2+1+0 | -2+1-2 | -2+0+1 | -2+0-1 | -2+0-2 |
| 1.001001100: | +2.-1+0-1 | +2-1+0 | +2-1-1 | +2-2+1 | +2-2+0 | +2-2-2 | +1+1+1 | +1+1-1 | +1+1-2 |
| 1.001001101: | +2.-1+0-1 | +1+0+0 | +1+0-1 | +1+1+1 | +1-1+0 | +1-2+1 | +1-2-1 | +1-2-2 | |
| 1.001001110: | +2.-1+0-1 | +0+1+0 | +0+1-1 | +0+0+0 | +0+0+1 | +0+0-2 | +0-1+1 | +0-1-1 | +0-1-2 |
| 1.001001111: | +2.-1+0-1 | +0-2+0 | +0-2-1 | -1+1+1 | -1+1+0 | -1+1-2 | -1+0+1 | -1+0-1 | -1+0-2 |
| 1.001010000: | +2.-1+0-1 | -1-1+0 | -1-1-1 | -1-2+1 | -1-2+0 | -1-2-2 | -2+1+1 | -2+1-1 | -2+1-2 |
| 1.001010001: | +2.-1+0-1 | -2+0-1 | -2+0-1 | -2-1+1 | -2-1+0 | -2-1-2 | -2-2+1 | -2-2-1 | -2-2-2 |
| 1.001010010: | +2.-1+0-2 | +1+1+0 | +1+1-1 | +1+0+1 | +1+0-2 | +1-1+1 | +1-1-1 | +1-1-2 | |
| 1.001010011: | +2.-1+0-2 | +1-2+1 | +1-2-1 | +1-2-2 | +0+1+0 | +0+1-1 | +0+0+1 | +0+0+0 | +0+0-2 |
| 1.001010100: | +2.-1+0-2 | +0-1+1 | +0-1-1 | +0-1-2 | +0-2+0 | +0-2-1 | -1+1+1 | -1+1+0 | -1+1-2 |
| 1.001010101: | +2.-1+0-2 | -1+0+1 | -1+0-1 | -1+0-2 | -1-1+0 | -1-1-1 | -1-1-2 | -1-2+0 | -1-2-1 |
| 1.001010110: | +2.-1+0-2 | -2+1+0 | -2+1-1 | -2+1-2 | -2+0+1 | -2+0-1 | -2+0-2 | -2-1+1 | -2-1-2 |
| 1.001010111: | +2.-1-1+1 | +2-2+1 | +2-2+0 | +2-2-1 | +1+1+1 | +1+1+0 | +1+1+2 | +1+0+1 | +1+0-1 |
| 1.001011000: | +2.-1-1+1 | +1+0-2 | +1-1+0 | +1-1-1 | +1-2+1 | +1-2+0 | +1-2-1 | +0+1+1 | +0+1+0 |
| 1.001011001: | +2.-1-1+1 | +0+1-2 | +0+0+1 | +0+0-1 | +0+0-2 | +0-1+0 | +0-1-1 | +0-2+1 | +0-2+0 |
| 1.001011010: | +2.-1-1+1 | +0-2-1 | -1+1+1 | -1+1+0 | -1+1-2 | -1+0+1 | -1+0-1 | -1+0-2 | -1-1+0 |
| 1.001011011: | +2.-1-1+1 | -1-1-1 | -1-1-2 | -1-2+0 | -1-2-1 | -2+1+0 | -2+1-2 | -2+1-2 | -2+0+1 |
| 1.001011100: | +2.-1-1+0 | +2+0-1 | +2+0-2 | +2-1+1 | +2-1-1 | +2-1-2 | +2-2+0 | +2-2-1 | +1+1+1 |
| 1.001011101: | +2.-1-1+0 | +1+1+0 | +1+1-1 | +1+0+1 | +1+0+0 | +1+0-2 | +1-1+1 | +1-1-1 | +1-1-2 |
| 1.001011110: | +2.-1-1+0 | +1-2+1 | +1-2-1 | +1-2-2 | +0+1+0 | +0+1-1 | +0+0+1 | +0+0+0 | +0+0-1 |
| 1.001011111: | +2.-1-1+0 | +0-1+1 | +0-1+0 | +0-1-2 | +0-2+1 | +0-2-1 | +0-2-2 | -1+1+1 | -1+1-1 |

Part 4
1.001100000000(1)-1.001111111111(1)

| 1.001100000: | +2.-1-1+0 | -1+1-2 | -1+0+0 | -1+0-1 | -1+0-2 | -1-1+0 | -1-1-1 | -1-2+1 | -1-2+0 |
| 1.001100001: | +2.-1-1+0 | -1-2-2 | -2+1+1 | -2+1+0 | -2+1-2 | -2+0-1 | -2+0-2 | -2-1+1 |
| 1.001100010: | +2.-1-1-1 | +2-1-1 | +2-1-2 | +2-2+0 | +2-2-1 | +2-2-2 | +1+1+0 | +1+1-1 | +1+0+1 |
| 1.001100011: | +2.-1-1-1 | +1+0+0 | +1+0-1 | +1-1+1 | +1-1+0 | +1-1-2 | +1-2+1 | +1-2+0 | +1-2-2 |
| 1.001100100: | +2.-1-1-1 | +0+1+1 | +0+1-1 | +0+1-2 | +0+0+1 | +0+0-1 | +0+0-2 | +0-1+0 | +0-1-1 |
| 1.001100101: | +2.-1-1-1 | +0-1-2 | +0-2+1 | +0-2-1 | -1+1+1 | -1+1-1 | -1+1-1 | -1+0+1 | -1+0-1 |
| 1.001100110: | +2.-1-1-1 | -1+0-2 | -1-1+1 | -1-1+0 | -1-1-2 | -1-2+1 | -1-2-1 | -1-2-2 | -2+1+1 |
| 1.001100111: | +2.-1-1-1 | -2+1-1 | -2+1-2 | -2+0+1 | -2+0-1 | -2+0-2 | -2-1+0 | -2-1-1 | -2-1-2 |
| 1.001101000: | +2.-1-1-2 | +2-2+0 | +2-2-1 | +1+1+1 | +1+1+0 | +1+1-1 | +1+0+1 | +1+0+0 | +1+0-1 |
| 1.001101001: | +2.-1-1-2 | +1-1+1 | +1-1+0 | +1-1-2 | +1-2+1 | +1-2+0 | +1-2-2 | +0+1+1 | +0+1+0 |
| 1.001101010: | +2.-1-1-2 | +0+1-2 | +0+0+1 | +0+0-1 | +0+0-2 | +0-1+1 | +0-1-1 | +0-2+1 | +0-2+1 |
| 1.001101011: | +2.-1-1-2 | +0-2-1 | +0-2-2 | -1+1+1 | -1+1-1 | -1+1-2 | -1+0+0 | -1+0-1 | -1+0-2 |
| 1.001101100: | +2.-1-1-2 | -1-1+0 | -1-1-1 | -1-1-2 | -1-2+0 | -1-2-1 | -1-2-2 | -2+1+0 | -2+1-1 |
| 1.001101101: | +2.-1-1-2 | -2+0+1 | -2+0+0 | -2+0-1 | -2-1+1 | -2-1+0 | -2-1-1 | -2-2+1 | -2-2+0 |
| 1.001101110: | +2.-1-2+1 | +2-2-1 | +1+1+1 | +1+1+0 | +1+1-1 | +1+0+1 | +1+0+0 | +1+0-2 | +1-1+1 |
| 1.001101111: | +2.-1-2+1 | +1-1+0 | +1-1-2 | +1-2+1 | +1-2+0 | +1-2-2 | +0+1+1 | +0+1+0 | +0+1-2 |
| 1.001110000: | +2.-1-2+1 | +0+0+1 | +0+0+0 | +0+0-2 | +0-1+1 | +0-1+0 | +0-1-2 | +0-2+1 | +0-2+0 |
| 1.001110001: | +2.-1-2+1 | +0-2-2 | -1+1+1 | -1+1+0 | -1+1-2 | -1+0+1 | -1+0+0 | -1+0-2 | -1-1+1 |
| 1.001110010: | +2.-1-2+1 | -1-1-1 | -1-1-2 | -1-2+1 | -1-2-1 | -1-2-2 | -2+1+1 | -2+1-1 | -2+1-2 |
| 1.001110011: | +2.-1-2+1 | -2+0+1 | -2+0-1 | -2+0-2 | -2-1+1 | -2-1-1 | -2-1-2 | -2-2+1 | -2-2-1 |
| 1.001110100: | +2.-1-2+0 | +2-2-2 | +1+1+1 | +1+1-1 | +1+1-2 | +1+0+1 | +1+0+0 | +1+0-2 | +1-1+1 |
| 1.001110101: | +2.-1-2+0 | +1-1+0 | +1-1-2 | +1-2+1 | +1-2+0 | +1-2-2 | +0+1+1 | +0+1+0 | +0+1-2 |
| 1.001110110: | +2.-1-2+0 | +0+0+1 | +0+0+0 | +0+0-2 | +0-1+1 | +0-1+0 | +0-1-2 | +0-2+1 | +0-2+0 |
| 1.001110111: | +2.-1-2+0 | +0-2-2 | -1+1+1 | -1+1+0 | -1+1-2 | -1+0+1 | -1+0+0 | -1+0-1 | -1-1+1 |
| 1.001111000: | +2.-1-2+0 | -1+1+0 | -1-1-1 | -1-2+1 | -1-2+0 | -1-2-1 | -2+1+1 | -2+1+0 | -2+1-1 |
| 1.001111001: | +2.-1-2+0 | -2+0+1 | -2+0+0 | -2+0-1 | -2-1+1 | -2-1+0 | -2-1-1 | -2-1-2 | -2-2+1 |
| 1.001111010: | +2.-1-2-1 | +2-2-1 | +2-2-2 | +1+1+1 | +1+1-1 | +1+1-2 | +1+0+0 | +1+0-1 | +1+0-2 |
| 1.001111011: | +2.-1-2-1 | +1-1+1 | +1-1-1 | +1-1-2 | +1-2+1 | +1-2-1 | +1-2-2 | +0+1+1 | +0+1-1 |
| 1.001111100: | +2.-1-2-1 | +0+1-2 | +0+0+1 | +0+0+0 | +0+0-2 | +0-1+1 | +0-1+0 | +0-1-2 | +0-2+1 |
| 1.001111101: | +2.-1-2-1 | +0-2+0 | +0-2-1 | -1+1+1 | -1+1+0 | -1+1-1 | -1+0+1 | -1+0+0 | -1+0-1 |
| 1.001111110: | +2.-1-2-1 | -1+0-2 | -1-1+0 | -1-1-1 | -1-1-2 | -1-2+0 | -1-2-1 | -1-2-2 | -2+1+0 |
| 1.001111111: | +2.-1-2-1 | -2+1-1 | -2+1-2 | -2+0+1 | -2+0-1 | -2+0-2 | -2-1+1 | -2-1+0 | -2-1-2 |

APPENDIX TWO-continued

|  | 000 | 001 | 010 | 011 | 100 | 101 | 110 | 111 |
|---|---|---|---|---|---|---|---|---|

Part 5
1.010000000000(1)-1.010011111111(1)

| | | | | | | | | |
|---|---|---|---|---|---|---|---|---|
| 1.010000000: | +2.-1-2-2 | +2-2+1 | +2-2+0 | +2-2-2 | +1+1+1 | +1+1+0 | +1+1-1 | +1+0+1 | +1+0+0 |
| 1.010000001: | +2.-1-2-2 | +1+0-1 | +1-1+1 | +1-1+0 | +1-1-1 | +1-1-2 | +1-2+0 | +1-2-1 | +1-2-2 |
| 1.010000010: | +2.-1-2-2 | +0+1+1 | +0+1-1 | +0+1-2 | +0+0+1 | +0+0-1 | +0+0-2 | +0-1+1 | +0-1+0 |
| 1.010000011: | +2.-1-2-2 | +0-1-2 | +0-2+1 | +0-2+0 | +0-2-1 | -1+1+1 | -1+1+0 | -1+1-1 | -1+1-2 |
| 1.010000100: | +2.-1-2-2 | -1+0+0 | -1+0-1 | -1+0-2 | -1-1+0 | -1-1-1 | -1-1-2 | -1-2+1 | -1-2-1 |
| 1.010000101: | +2.-1-2-2 | -1-2-2 | -2+1+1 | -2+1+0 | -2+1-2 | -2+0+1 | -2+0+0 | -2+0-1 | -2-1+1 |
| 1.010000110: | +2.-2+1+1 | +2-1+0 | +2-1-1 | +2-1-2 | +2-2+0 | +2-2+1 | +2-2-2 | +1+1+1 | +1+1-1 |
| 1.010000111: | +2.-2+1+1 | +1+1-2 | +1+0+1 | +1+0+0 | +1+0-2 | +1-1+1 | +1-1+0 | +1-1-1 | +1-2+1 |
| 1.010001000: | +2.-2+1+1 | +1-2+0 | +1-2-1 | +1-2-2 | +0+1+0 | +0+1-1 | +0+1-2 | +0+0+1 | +0+0-1 |
| 1.010001001: | +2.-2+1+1 | +0+0-2 | +0-1+1 | +0-1+0 | +0-1-2 | +0-2+1 | +0-2+0 | +0-2-1 | -1+1+1 |
| 1.010001010: | +2.-2+1+1 | -1+1+0 | -1+1-1 | -1+1-2 | -1+0+0 | -1+0-1 | -1+0-2 | -1-1+1 | -1-1-1 |
| 1.010001011: | +2.-2+1+1 | -1-1-2 | -1-2+1 | -1-2+0 | -1-2-1 | -2+1+1 | -2+1+0 | -2+1-1 | -2+1-2 |
| 1.010001100: | +2.-2+1+1 | -2+0+0 | -2+0-1 | -2+0-2 | -2-1+1 | -2-1-1 | -2-1-2 | -2-2+1 | -2-2+0 |
| 1.010001101: | +2.-2+1+0 | +2-2-1 | +1+1+1 | +1+1+0 | +1+1-1 | +1+1-2 | +1+0+0 | +1+0-1 | +1+0-2 |
| 1.010001110: | +2.-2+1+0 | +1-1+1 | +1-1-1 | +1-1-2 | +1-2+1 | +1-2+0 | +1-2-1 | +0+1+1 | +0+1+0 |
| 1.010001111: | +2.-2+1+0 | +0+1-1 | +0+1-2 | +0+0+0 | +0+0-1 | +0+0-2 | +0-1+1 | +0-1+0 | +0-1-2 |
| 1.010010000: | +2.-2+1+0 | +0-2+1 | +0-2+0 | +0-2-1 | -1+1+1 | -1+1+0 | -1+1-1 | -1+1-2 | -1+0+1 |
| 1.010010001: | +2.-2+1+0 | -1+0-1 | -1+0-2 | -1-1+1 | -1-1+0 | -1-1-1 | -1-2+1 | -1-2+0 | -1-2-1 |
| 1.010010010: | +2.-2+1+0 | -1-2-2 | -2+1+1 | -2+1-1 | -2+1-2 | -2+0+1 | -2+0+0 | -2+0-2 | -2-1+1 |
| 1.010010011: | +2.-2+1-1 | +2-1+0 | +2-1-1 | +2-1-2 | +2-2+0 | +2-2-1 | +2-2-2 | +1+1+1 | +1+1+0 |
| 1.010010100: | +2.-2+1-1 | +1+1-2 | +1+0+1 | +1+0+0 | +1+0-1 | +1+0-2 | +1-1+0 | +1-1-1 | +1-1-2 |
| 1.010010101: | +2.-2+1-1 | +1-2+1 | +1-2+0 | +1-2-2 | +0+1+1 | +0+1+0 | +0+1-1 | +0+1-2 | +0+0+0 |
| 1.010010110: | +2.-2+1-1 | +0+0-1 | +0+0-2 | +0-1+1 | +0-1+0 | +0-1-2 | +0-2+1 | +0-2+0 | +0-2-1 |
| 1.010010111: | +2.-2+1-1 | +0-2-2 | -1+1+1 | -1+1-1 | -1+1-2 | -1+0+1 | -1+0+0 | -1+0-1 | -1-1+1 |
| 1.010011000: | +2.-2+1-1 | -1-1+0 | -1-1-1 | -1-1-2 | -1-2+1 | -1-2-1 | -1-2-2 | -2+1+1 | -2+1+0 |
| 1.010011001: | +2.-2+1-1 | -2+1-1 | -2+0+1 | -2+0+0 | -2+0-1 | -2+0-2 | -2-1+1 | -2-1+0 | -2-1-2 |
| 1.010011010: | +2.-2+1-2 | +2-2+1 | +2-2+0 | +2-2-1 | +2-2-2 | +1+1+0 | +1+1-1 | +1+1-2 | +1+0+1 |
| 1.010011011: | +2.-2+1-2 | +1+0+0 | +1+0-1 | -1+1-1 | +1-1+0 | +1-1-1 | -1-1-2 | +1-2+1 | +1-2-2 |
| 1.010011100: | +2.-2+1-2 | +1-2-2 | +0+1+1 | +0+1+0 | +0+1-1 | +0+1-2 | +0+0+0 | +0+0-1 | +0+0-2 |
| 1.010011101: | +2.-2+1-2 | +0-1+1 | +0-1+0 | +0-1-1 | +0-2+1 | +0-2+0 | +0-2-1 | +0-2-2 | -1+1+1 |
| 1.010011110: | +2.-2+1-2 | -1+1+0 | -1+1-2 | -1+0+1 | -1+0+0 | -1+0-1 | -1+0-2 | -1-1+1 | -1-1-1 |
| 1.010011111: | +2.-2+1-2 | -1-1-2 | -1-2+1 | -1-2+0 | -1-2-1 | -1-2-2 | -2+1+0 | -2+1-1 | -2+1-2 |

Part 6
1.010100000000(1)-1.010111111111(1)

| | | | | | | | | |
|---|---|---|---|---|---|---|---|---|
| 1.010100000: | +2.-2+1-2 | -2+0+1 | -2+0+0 | -2+0-1 | -2-1+1 | -2-1+0 | -2-1-1 | -2-1-2 | -2-2+1 |
| 1.010100001: | +2.-2+0+1 | +2-2+0 | +2-2-1 | +1+1+1 | +1+1+0 | +1+1-1 | +1+1-2 | +1+0+1 | +1+0+0 |
| 1.010100010: | +2.-2+0+1 | +1+0-2 | +1-1+1 | +1-1+0 | +1-1-1 | +1-1-2 | +1-2+1 | +1-2+0 | +1-2-2 |
| 1.010100011: | +2.-2+0+1 | +0+1+1 | +0+1+0 | +0+1-1 | +0+1-2 | +0+0+1 | +0+0-1 | +0+0-2 | +0-1+1 |
| 1.010100100: | +2.-2+0+1 | +0-1+0 | +0-1-1 | +0-1-2 | +0-2+1 | +0-2-1 | +0-2-2 | -1+1+1 | -1+1+0 |
| 1.010100101: | +2.-2+0+1 | -1+1-1 | -1+1-2 | -1+0+1 | -1+0-1 | -1+0-2 | -1-1+1 | -1-1+0 | -1-1-1 |
| 1.010100110: | +2.-2+0+1 | -1-1-2 | -1-2+1 | -1-2-1 | -1-2-2 | -2+1+1 | -2+1+0 | -2+1-1 | -2+1-2 |
| 1.010100111: | +2.-2+0+1 | -2+0+1 | -2+0-1 | -2+0-2 | -2-1+1 | -2-1+0 | -2-1-1 | -2-1-2 | -2-2+1 |
| 1.010101000: | +2.-2+0+0 | +2-2+0 | +2-2-2 | +1+1+1 | +1+1+0 | +1+1-1 | +1+1-2 | +1+0+1 | +1+0+0 |
| 1.010101001: | +2.-2+0+0 | +1+0-2 | +1-1+1 | +1-1+0 | +1-1-1 | +1-1-2 | +1-2+1 | +1-2+0 | +1-2-1 |
| 1.010101010: | +2.-2+0+0 | +0+1+1 | +0+1+0 | +0+1-1 | +0+1-2 | +0+0+1 | +0+0+0 | +0+0-1 | +0+0-2 |
| 1.010101011: | +2.-2+0+0 | +0-1+0 | +0-1-1 | +0-1-2 | +0-2+1 | +0-2+0 | +0-2-1 | +0-2-2 | -1+1+1 |
| 1.010101100: | +2.-2+0+0 | -1+1-1 | -1+1-2 | -1+0+1 | -1+0+0 | -1+0-1 | -1+0-2 | -1-1+1 | -1-1+0 |
| 1.010101101: | +2.-2+0+0 | -1-1-1 | -1-2+1 | -1-2-1 | -1-2-1 | -1-2-2 | -2+1+1 | -2+1+1 | -2+1-1 |
| 1.010101110: | +2.-2+0+0 | -2+1-2 | -2+0+0 | -2+0-1 | -2+0-2 | -2-1+1 | -2-1+0 | -2-1-1 | -2-1-2 |
| 1.010101111: | +2.-2+0-1 | +2-2+1 | +2-2+0 | +2-2-2 | +1+1+1 | +1+1+0 | +1+1-1 | +1+1-2 | +1+0+0 |
| 1.010110000: | +2.-2+0-1 | +1+0+0 | +1+0-1 | +1+0-2 | +1-1+0 | +1-1-1 | +1-1-2 | +1-2+1 | +1-2+0 |
| 1.010110001: | +2.-2+0-1 | +1-2-1 | +1-2-2 | +0+1+1 | +0+1+0 | +0+1-1 | +0+0+1 | +0+0+0 | +0+0-1 |
| 1.010110010: | +2.-2+0-1 | +0+0-2 | +0-1+1 | +0-1+0 | +0-1-1 | +0-1-2 | +0-2+1 | +0-2+0 | +0-2-2 |
| 1.010110011: | +2.-2+0-1 | -1+1+1 | -1+1+0 | -1+1-1 | -1+1-2 | -1+0+1 | -1+0+0 | -1+0-1 | -1+0-2 |
| 1.010110100: | +2.-2+0-1 | -1+1+1 | -1-1-1 | -1-1-2 | -1-2+1 | -1-2+0 | -1-2-1 | -1-2-2 | -2+1+1 |
| 1.010110101: | +2.-2+0-1 | -2+1+0 | -2+1-1 | -2+1-2 | -2+0+1 | -2+0-1 | -2+0-2 | -2-1+1 | -2-1+0 |
| 1.010110110: | +2.-2+0-2 | +2-1-1 | +2-1-2 | +2-2+1 | +2-2+0 | +2-2-1 | +2-2-2 | +1+1+1 | +1+1+0 |
| 1.010110111: | +2.-2+0-2 | +1+1-2 | +1+0+1 | +1+0+0 | +1+0-1 | +1+0-2 | +1-1+1 | +1-1+0 | +1-1-1 |
| 1.010111000: | +2.-2+0-2 | +1-1-2 | +1-2+1 | +1-2+0 | +1-2-1 | +0+1+1 | +0+1+0 | +0+1-1 | +0+1-2 |
| 1.010111001: | +2.-2+0-2 | +0+0+1 | +0+0+0 | +0+0-1 | +0-1+1 | +0-1+0 | +0-1-1 | +0-1-2 | +0-2-2 |
| 1.010111010: | +2.-2+0-2 | +0-2+0 | +0-2-1 | +0-2-2 | -1+1+1 | -1+1+0 | -1+1-1 | -1+1-2 | -1+0+1 |
| 1.010111011: | +2.-2+0-2 | -1+0+0 | -1+0-1 | -1+0-2 | -1-1+1 | -1-1+0 | -1-1-1 | -1-2+1 | -1-2+0 |
| 1.010111100: | +2.-2+0-2 | -1-2-1 | -1-2-2 | -2+1+1 | -2+1+0 | -2+1-1 | -2+1-2 | -2+0+1 | -2+0+0 |
| 1.010111101: | +2.-2+0-2 | -2+0-1 | -2+0-2 | -2-1+1 | -2-1+0 | -2-1-1 | -2-2+1 | -2-2+0 | -2-2-1 |
| 1.010111110: | +2.-2-1+1 | +2-2-2 | +1+1+1 | +1+1+0 | +1+1-1 | +1+1-2 | +1+0+1 | +1+0+0 | +1+0-1 |
| 1.010111111: | +2.-2-1+1 | +1+0-2 | +1-1+1 | +1-1+0 | +1-1-1 | +1-1-2 | +1-2+1 | +1-2-1 | +1-2-2 |

Part 7
1.011000000000(1)-1.011011111111(1)

| | | | | | | | | |
|---|---|---|---|---|---|---|---|---|
| 1.011000000: | +2.-2-1+1 | +0+1+1 | +0+1+0 | +0+1-1 | +0+1-2 | +0+0+1 | +0+0+0 | +0+0-1 | +0+0-2 |
| 1.011000001: | +2.-2-1+1 | +0-1+1 | +0-1+0 | +0-1-1 | +0-1-2 | +0-2+1 | +0-2+0 | +0-2-1 | -1+1+1 |
| 1.011000010: | +2.-2-1+1 | -1+1+0 | -1+1-1 | -1+1-2 | -1+0+1 | -1+0+0 | -1+0-1 | -1+0-2 | -1-1+1 |
| 1.011000011: | +2.-2-1+1 | -1-1+0 | -1-1-1 | -1-1-2 | -1-2+1 | -1-2+0 | -1-2-1 | -1-2-2 | -2+1+1 |

APPENDIX TWO-continued

|  |  | 000 | 001 | 010 | 011 | 100 | 101 | 110 | 111 |
|---|---|---|---|---|---|---|---|---|---|
| 1.011000100: | +2.-2-1+1 | -2+1+0 | -2+1-1 | -2+1-2 | -2+0+0 | -2+0-1 | -2+0-2 | -2-1+1 | -2-1+0 |
| 1.011000101: | +2.-2-1+0 | +2-1-1 | +2-1-2 | +2-2+1 | +2-2+0 | +2-2-1 | +2-2-2 | +1+1+1 | +1+1+0 |
| 1.011000110: | +2.-2-1+0 | +1+1-1 | +1+1-2 | +1+0+1 | +1+0+0 | +1+0-1 | +1+0-2 | +1-1+1 | +1-1+0 |
| 1.011000111: | +2.-2-1+0 | +1-1-1 | +1-1-2 | +1-2+1 | +1-2+0 | +1-2-2 | +0+1+1 | +0+1+0 | +0+1-1 |
| 1.011001000: | +2.-2-1+0 | +0+1-2 | +0+0+1 | +0+0+0 | +0+0-1 | +0+0-2 | +0-1+1 | +0-1+0 | +0-1-1 |
| 1.011001001: | +2.-2-1+0 | +0-1-2 | +0-2+1 | +0-2+0 | +0-2-1 | +0-2-2 | -1+1+1 | -1+1+0 | -1+1-1 |
| 1.011001010: | +2.-2-1+0 | -1+1-2 | -1+0+1 | -1+0+0 | -1+0-1 | -1+0-2 | -1-1+1 | -1-1+0 | -1-1-1 |
| 1.011001011: | +2.-2-1+0 | -1-1-2 | -1-2+1 | -1-2+0 | -1-2-1 | -1-2-2 | -2+1+1 | -2+1+0 | -2+1-2 |
| 1.011001100: | +2.-2-1+0 | -2+0+1 | -2+0+0 | -2+0-1 | -2+0-2 | -2-1+1 | -2-1+0 | -2-1-1 | -2-1-2 |
| 1.011001101: | +2.-2-1-1 | +2-2+1 | +2-2+0 | +2-2-1 | +2-2-2 | +1+1+1 | +1+1+0 | +1+1-1 | +1+1-2 |
| 1.011001110: | +2.-2-1-1 | +1+0+1 | +1+0+0 | +1+0-1 | +1+0-2 | +1-1+1 | +1-1+0 | +1-1-1 | +1-1-2 |
| 1.011001111: | +2.-2-1-1 | +1-2+1 | +1-2+0 | +1-2-1 | +1-2-2 | +0+1+1 | +0+1+0 | +0+1-1 | +0+1-2 |
| 1.011010000: | +2.-2-1-1 | +0+0+1 | +0+0+0 | +0+0-1 | +0+0-2 | +0-1+1 | +0-1+0 | +0-1-1 | +0-1-2 |
| 1.011010001: | +2.-2-1-1 | +0-2+1 | +0-2+0 | +0-2-1 | +0-2-2 | -1+1+1 | -1+1+0 | -1+1-1 | -1+1-2 |
| 1.011010010: | +2.-2-1-1 | -1+0+1 | -1+0+0 | -1+0-1 | -1+0-2 | -1-1+1 | -1-1+0 | -1-1-1 | -1-1-2 |
| 1.011010011: | +2.-2-1-1 | -1-2+1 | -1-2+0 | -1-2-1 | -1-2-2 | -2+1+1 | -2+1+0 | -2+1-1 | -2+1-2 |
| 1.011010100: | +2.-2-1-1 | -2+0+1 | -2+0+0 | -2+0-1 | -2+0-2 | -2-1+1 | -2-1+0 | -2-1-1 | -2-1-2 |
| 1.011010101: | +2.-2-1-2 | +2-2+1 | +2-2+0 | +2-2-1 | +2-2-2 | +1+1+1 | +1+1+0 | +1+1-1 | +1+1-2 |
| 1.011010110: | +2.-2-1-2 | +1+0+1 | +1+0+0 | +1+0-1 | +1+0-2 | +1-1+1 | +1-1+0 | +1-1-1 | +1-1-2 |
| 1.011010111: | +2.-2-1-2 | +1-2+1 | +1-2+0 | +1-2-1 | +1-2-2 | +0+1+1 | +0+1+0 | +0+1-1 | +0+1-2 |
| 1.011011000: | +2.-2-1-2 | +0+0+1 | +0+0+0 | +0+0-1 | +0+0-2 | +0-1+1 | +0-1+0 | +0-1-1 | +0-1-2 |
| 1.011011001: | +2.-2-1-2 | +0-2+1 | +0-2+0 | +0-2-1 | +0-2-2 | -1+1+1 | -1+1+0 | -1+1-1 | -1+1-2 |
| 1.011011010: | +2.-2-1-2 | -1+0+1 | -1+0+0 | -1+0-1 | -1+0-2 | -1-1+1 | -1-1+0 | -1-1-1 | -1-1-2 |
| 1.011011011: | +2.-2-1-2 | -1-2+1 | -1-2+0 | -1-2-1 | -1-2-2 | -2+1+1 | -2+1+0 | -2+1-1 | -2+1-2 |
| 1.011011100: | +2.-2-1-2 | -2+0+1 | -2+0+0 | -2+0-1 | -2+0-1 | -2+0-2 | -2-1+1 | -2-1+0 | -2-1-1 |
| 1.011011101: | +2.-2-2+1 | +2-1-2 | +2-2+1 | +2-2+0 | +2-2-1 | +2-2-2 | +1+1+1 | +1+1+0 | +1+1-1 |
| 1.011011110: | +2.-2-2+1 | +1+1-2 | +1+0+1 | +1+0+0 | +1+0-1 | +1+0-2 | +1-1+1 | +1-1+0 | +1-1-1 |
| 1.011011111: | +2.-2-2+1 | +1-1-2 | +1-1+2+1 | +1-2+0 | +1-2-1 | +1-2-2 | +0+1+1 | +0+1+0 | +0+1-1 |

Part 8
1.011100000000(1)-1.011111111111(1)

| 1.011100000: | +2.-2-2+1 | +0+1-2 | +0+0+1 | +0+0+0 | +0+0-1 | +0+0-2 | +0-1+1 | +0-1+0 | +0-1+0 |
|---|---|---|---|---|---|---|---|---|---|
| 1.011100001: | +2.-2-2+1 | +0-1-1 | +0-1-2 | +0-2+1 | +0-2+0 | +0-2-1 | +0-2-2 | -1+1+1 | -1+1+0 |
| 1.011100010: | +2.-2-2+1 | -1+1-1 | -1+1-2 | -1+0+1 | -1+0+0 | -1+0-1 | -1+0-2 | -1-1+1 | -1-1+0 |
| 1.011100011: | +2.-2-2+1 | -1-1-1 | -1-1-2 | -1-2+1 | -1-2+0 | -1-2-1 | -1-2-2 | -2+1+1 | -2+1+0 |
| 1.011100100: | +2.-2-2+1 | -2+1-1 | -2+1-1 | -2+1-2 | -2+0+1 | -2+0+0 | -2+0-1 | -2+0-2 | -2-1+1 |
| 1.011100101: | +2.-2-2+0 | +2-1+0 | +2-1-1 | +2-1-2 | +2-2+1 | +2-2+0 | +2-2-1 | +2-2-2 | +1+1+1 |
| 1.011100110: | +2.-2-2+0 | +1+1+0 | +1+1-1 | +1+1-2 | +1+0+1 | +1+0+0 | +1+0-1 | +1+0-1 | +1+0-2 |
| 1.011100111: | +2.-2-2+0 | +1-1+1 | +1-1+0 | +1-1-1 | +1-1-2 | +1-2+1 | +1-2+0 | +1-2-1 | +1-2-2 |
| 1.011101000: | +2.-2-2+0 | +0+1+1 | +0+1+0 | +0+1-1 | +0+1-2 | +0+0+1 | +0+0+0 | +0+0-1 | +0+0-2 |
| 1.011101001: | +2.-2-2+0 | +0-1+1 | +0-1+1 | +0-1+0 | +0-1-1 | +0-1-2 | +0-2+1 | +0-2+0 | +0-2-1 |
| 1.011101010: | +2.-2-2+0 | +0-2-2 | -1+1+1 | -1+1+0 | -1+1-1 | -1+1-2 | -1+0+1 | -1+0+0 | -1+0-1 |
| 1.011101011: | +2.-2-2+0 | -1+0-2 | -1-1+1 | -1-1+1 | -1-1+0 | -1-1-1 | -1-1-2 | -1-2+1 | -1-2+0 |
| 1.011101100: | +2.-2-2+0 | -1-2-1 | -1-2-2 | -2+1+1 | -2+1+0 | -2+1-1 | -2+1-2 | -2+0+1 | -2+0+0 |
| 1.011101101: | +2.-2-2+0 | -2+0-1 | -2+0-2 | -2+0-2 | -2-1+1 | -2-1+0 | -2-1-1 | -2-1-2 | -2-2+1 |
| 1.011101110: | +2.-2-2-1 | +2-2+0 | +2-2-1 | +2-2-2 | +1+1+1 | +1+1+0 | +1+1-1 | +1+1-2 | +1+0+1 |
| 1.011101111: | +2.-2-2-1 | +1+0+0 | +1+0-1 | +1+0-2 | +1-1+1 | +1-1+0 | +1-1-1 | +1-1-1 | +1-1-2 |
| 1.011110000: | +2.-2-2-1 | +1-2+1 | +1-2+0 | +1-2-1 | +1-2-2 | +0+1+1 | +0+1+0 | +0+1+0 | +0+1-1 |
| 1.011110001: | +2.-2-2-1 | +0+1-2 | +0+0+1 | +0+0+0 | +0+0-1 | +0+0-2 | +0-1+1 | +0-1+0 | +0-1-1 |
| 1.011110010: | +2.-2-2-1 | +0-1-2 | +0-2+1 | +0-2+0 | +0-2+0 | +0-2-1 | +0-2-2 | -1+1+1 | -1+1+0 |
| 1.011110011: | +2.-2-2-1 | -1+1-1 | -1+1-2 | -1+0+1 | -1+0+0 | -1+0-1 | -1+0-2 | -1-1+1 | -1-1+0 |
| 1.011110100: | +2.-2-2-1 | -1-1+0 | -1-1-1 | -1-1-2 | -1-2+1 | -1-2+0 | -1-2-1 | -1-2-2 | -2+1+1 |
| 1.011110101: | +2.-2-2-1 | -2+1+0 | -2+1-1 | -2+1-2 | -2+0+1 | -2+0+0 | -2+0-1 | -2+0-1 | -2+0-2 |
| 1.011110110: | +2.-2-2-1 | -2-1+1 | -2-1+0 | -2-1-1 | -2-1-2 | -2-2+1 | -2-2+0 | -2-2-1 | -2-2-1 |
| 1.011110111: | +2.-2-2-2 | +2-2-2 | +1+1+1 | +1+1+0 | +1+1-1 | +1+1-2 | +1+0+1 | +1+0+0 | +1+0-1 |
| 1.011111000: | +2.-2-2-2 | +1+0-2 | +1-1+1 | +1-1+1 | +1-1+0 | +1-1-1 | +1-1-2 | +1-2+1 | +1-2+0 |
| 1.011111001: | +2.-2-2-2 | +1-2-1 | +1-2-2 | +0+1+1 | +0+1+0 | +0+1-1 | +0+1-2 | +0+0+1 | +0+0+1 |
| 1.011111010: | +2.-2-2-2 | +0+0+0 | +0+0-1 | +0+0-2 | +0-1+1 | +0-1+0 | +0-1-1 | +0-1-2 | +0-1-2 |
| 1.011111011: | +2.-2-2-2 | +0-2+1 | +0-2+0 | +0-2-1 | +0-2-2 | -1+1+1 | -1+1+0 | -1+1-1 | -1+1-2 |
| 1.011111100: | +2.-2-2-2 | -1+0+1 | -1+0+1 | -1+0+0 | -1+0-1 | -1+0-2 | -1-1+1 | -1-1+0 | -1-1-1 |
| 1.011111101: | +2.-2-2-2 | -1-1-2 | -1-2+1 | -1-2+1 | -1-2+0 | -1-2-1 | -1-2-2 | -2+1+1 | -2+1+0 |
| 1.011111110: | +2.-2-2-2 | -2+1-1 | -2+1-2 | -2+0+1 | -2+0+0 | -2+0+0 | -2+0-1 | -2+0-2 | -2-1+1 |
| 1.011111111: | +2.-2-2-2 | -2-1+0 | -2-1-1 | -2-1-2 | -2-2+1 | -2-2+0 | -2-2+0 | -2-2-1 | -2-2-2 |

Part 9
1.100000000000(1)-1.100011111111(1)

| 1.100000000: | +1.+1+1+1 | +1+1+1 | +1+1+0 | +1+1-1 | +1+1-2 | +1+0+1 | +1+0+0 | +1+0+0 | +1+0-1 |
|---|---|---|---|---|---|---|---|---|---|
| 1.100000001: | +1.+1+1+1 | +1+0-2 | +1-1+1 | +1-1+0 | +1-1-1 | +1-1-2 | +1-2+1 | +1-2+0 | +1-2+0 |
| 1.100000010: | +1.+1+1+1 | +1-2-1 | +1-2-2 | +0+1+1 | +0+1+0 | +0+1-1 | +0+1-2 | +0+0+1 | +0+0+1 |
| 1.100000011: | +1.+1+1+1 | +0+0+0 | +0+0-1 | +0+0-2 | +0-1+1 | +0-1+0 | +0-1-1 | +0-1-2 | +0-2+1 |
| 1.100000100: | +1.+1+1+1 | +0-2+1 | +0-2+0 | +0-2-1 | +0-2-2 | -1+1+1 | -1+1+0 | -1+1-1 | -1+1-2 |
| 1.100000101: | +1.+1+1+1 | -1+0+1 | -1+0+1 | -1+0+0 | -1+0-1 | -1+0-2 | -1-1+1 | -1-1+0 | -1-1-1 |
| 1.100000110: | +1.+1+1+1 | -1-1-1 | -1-1-2 | -1-2+1 | -1-2+0 | -1-2-1 | -1-2-2 | -2+1+1 | -2+1+0 |
| 1.100000111: | +1.+1+1+1 | -2+1+0 | -2+1-1 | -2+1-2 | -2+0+1 | -2+0+0 | -2+0-1 | -2+0-2 | -2-1+1 |
| 1.100001000: | +1.+1+1+1 | -2-1+1 | -2-1+0 | -2-1-1 | -2-1-2 | -2-2+1 | -2-2+0 | -2-2-1 | -2-2-1 |
| 1.100001001: | +1.+1+1+0 | +2-2-2 | +1+1+1 | +1+1+0 | +1+1-1 | +1+1-2 | +1+0+1 | +1+0+0 | +1+0+0 |
| 1.100001010: | +1.+1+1+0 | +1+0-1 | +1+0-2 | +1-1+1 | +1-1+0 | +1-1-1 | +1-1-2 | +1-2+1 | +1-2+1 |

APPENDIX TWO-continued

|  | 000 | 001 | 010 | 011 | 100 | 101 | 110 | 111 |
|---|---|---|---|---|---|---|---|---|
| 1.100001011: | +1.+1+1+0 | +1−2+0 | +1−2−1 | +1−2−2 | +0+1+1 | +0+1+0 | +0+1−1 | +0+1−2 |
| 1.100001100: | +1.+1+1+0 | +0+0+1 | +0+0+0 | +0+0−1 | +0+0−2 | +0−1+1 | +0−1+1 | +0−1−1 |
| 1.100001101: | +1.+1+1+0 | +0−1−2 | +0−2+1 | +0−2+0 | +0−2−1 | +0−2−1 | +0−2−2 | −1+1+1 | −1+1+0 |
| 1.100001110: | +1.+1+1+0 | −1+1−1 | −1+1−2 | −1+0+1 | −1+0+1 | −1+0+0 | −1+0−1 | −1+0−2 | −1−1+1 |
| 1.100001111: | +1.+1+1+0 | −1−1+0 | −1−1−1 | −1−1−1 | −1−1−2 | −1−2+1 | −1−2+0 | −1−2−1 | −1−2−2 |
| 1.100010000: | +1.+1+1+0 | −2+1+1 | −2+1+1 | −2+1+0 | −2+1−1 | −2+1−2 | −2+0+1 | −2+0+0 | −2+0−1 |
| 1.100010001: | +1.+1+1+0 | −2+0−1 | −2+0−2 | −2−1+1 | −2−1+0 | −2−1−1 | −2−1−2 | −2−1−2 | −2−2+1 |
| 1.100010010: | +1.+1+1−1 | +2−2+0 | +2−2−1 | +2−2−2 | +1+1+1 | +1+1+0 | +1+1+0 | +1+1−1 | +1+1−2 |
| 1.100010011: | +1.+1+1−1 | +1+0+1 | +1+0+0 | +1+0−1 | +1+0−1 | +1+0−2 | +1−1+1 | +1−1+0 | +1−1−1 |
| 1.100010100: | +1.+1+1−1 | +1−1−2 | +1−2+1 | +1−2+1 | +1−2+0 | +1−2−1 | +1−2−2 | +0+1+1 | +0+1+0 |
| 1.100010101: | +1.+1+1−1 | +0+1+0 | +0+1−1 | +0+1−2 | +0+0+1 | +0+0+0 | +0+0−1 | +0+0−1 | +0+0−2 |
| 1.100010110: | +1.+1+1−1 | +0−1+1 | +0−1+0 | +0−1−1 | +0−1−2 | +0−2+1 | +0−2+1 | +0−2+0 | +0−2−1 |
| 1.100010111: | +1.+1+1−1 | +0−2−2 | −1+1+1 | −1+1+0 | −1+1+0 | −1+1−1 | −1+1−2 | −1+0+1 | −1+0+0 |
| 1.100011000: | +1.+1+1−1 | −1+0−1 | −1+0−1 | −1+0−2 | −1−1+1 | −1−1+0 | −1−1−1 | −1−1−1 | −1−1−2 |
| 1.100011001: | +1.+1+1−1 | −1−2+1 | −1−2+0 | −1−2−1 | −1−2−2 | −2+1+1 | −2+1+1 | −2+1+0 | −2+1−1 |
| 1.100011010: | +1.+1+1−1 | −2+1−2 | −2+0+1 | −2+0+0 | −2+0+0 | −2+0−1 | −2+0−2 | −2−1+1 | −2−1+0 |
| 1.100011011: | +1.+1+1−1 | −2−1−1 | −2−1−1 | −2−1−2 | −2−2+1 | −2−2+0 | −2−2−1 | −2−2−2 | −2−2−2 |
| 1.100011100: | +1.+1+1−2 | +1+1+1 | +1+1+0 | +1+1−2 | +1+1−2 | +1+1−2 | +1+0+1 | +1+0+0 | +1+0−1 |
| 1.100011101: | +1.+1+1−2 | +1+0−2 | +1−1+1 | +1−1+1 | +1−1+0 | +1−1−1 | +1−1−2 | +1−2+1 | +1−2+0 |
| 1.100011110: | +1.+1+1−2 | +1−2+0 | +1−2−1 | +1−2−2 | +0+1+1 | +0+1+0 | +0+1−1 | +0+1−1 | +0+1−2 |
| 1.100011111: | +1.+1+1−2 | +0+0+1 | +0+0+0 | +0+0−1 | +0+0−1 | +0+0−2 | +0−1+1 | +0−1+0 | +0−1−1 |

Part 10
1.100100000000(1)-1.100111111111(1)

| 1.100100000: | +1.+1+1−2 | +0−1−2 | +0−1−2 | +0−2+1 | +0−2+0 | +0−2−1 | +0−2−2 | +0−2−2 | −1+1+1 |
| 1.100100001: | +1.+1+1−2 | −1+1+0 | −1+1−1 | −1+1−2 | −1+0+1 | −1+0+1 | −1+0+0 | −1+0−1 | −1+0−2 |
| 1.100100010: | +1.+1+1−2 | −1−1+1 | −1−1+1 | −1−1+0 | −1−1−1 | −1−1−1 | −1−1−2 | −1−2+1 | −1−2+0 |
| 1.100100011: | +1.+1+1−2 | −1−2−1 | −1−2−2 | −2+1+1 | −2+1+0 | −2+1+0 | −2+1−1 | −2+1−2 | −2+0+1 |
| 1.100100100: | +1.+1+1−2 | −2+0+0 | −2+0+0 | −2+0−1 | −2+0−2 | −2−1+1 | −2−1+0 | −2−1+0 | −2−1−1 |
| 1.100100101: | +1.+1+0+1 | +2−1−2 | +2−2+1 | +2−2+0 | +2−2−1 | +2−2−1 | +2−2−2 | +1+1+1 | +1+1+0 |
| 1.100100110: | +1.+1+0+1 | +1+1−1 | +1+1−1 | +1+1−2 | +1+1−2 | +1+0+1 | +1+0+0 | +1+0−1 | +1+0−2 |
| 1.100100111: | +1.+1+0+1 | +1−1+1 | +1−1+0 | +1−1−1 | +1−1−1 | +1−1−2 | +1−2+1 | +1−2+0 | +1−2−1 |
| 1.100101000: | +1.+1+0+1 | +1−2−1 | +1−2−2 | +0+1+1 | +0+1+0 | +0+1−1 | +0+1−1 | +0+1−2 | +0+0+1 |
| 1.100101001: | +1.+1+0+1 | +0+0+0 | +0+0−1 | +0+0−1 | +0+0−2 | +0−1+1 | +0−1+0 | +0−1−1 | +0−1−1 |
| 1.100101010: | +1.+1+0+1 | +0−1−2 | +0−2+1 | +0−2+1 | +0−2+0 | +0−2−1 | +0−2−2 | −1+1+1 | −1+1+0 |
| 1.100101011: | +1.+1+0+1 | −1+1−1 | −1+1−1 | −1+1−2 | −1+0+1 | −1+0+0 | −1+0−1 | −1+0−1 | −1+0−2 |
| 1.100101100: | +1.+1+0+1 | −1−1+1 | −1−1+0 | −1−1−1 | −1−1−1 | −1−1−2 | −1−2+1 | −1−2+0 | −1−2−1 |
| 1.100101101: | +1.+1+0+1 | −1−2−1 | −1−2−2 | −2+1+1 | −2+1+0 | −2+1−1 | −2+1−1 | −2+1−2 | −2+0+1 |
| 1.100101110: | +1.+1+0+1 | −2+0+0 | −2+0+0 | −2+0−1 | −2+0−2 | −2−1+1 | −2−1+0 | −2−1+0 | −2−1−1 |
| 1.100101111: | +1.+1+0+0 | +2−1−2 | +2−2+1 | +2−2+0 | +2−2+0 | +2−2−1 | +2−2−2 | +1+1+1 | +1+1+0 |
| 1.100110000: | +1.+1+0+0 | +1+1+0 | +1+1−1 | +1+1−2 | +1+0+1 | +1+0+1 | +1+0+0 | +1+0−1 | +1+0−2 |
| 1.100110001: | +1.+1+0+0 | +1−1+1 | +1−1+1 | +1−1+0 | +1−1−1 | +1−1−2 | +1−2+1 | +1−2+1 | +1−2+0 |
| 1.100110010: | +1.+1+0+0 | +1−2−1 | +1−2−2 | +1−2−2 | +0+1+1 | +0+1+0 | +0+1−1 | +0+1−1 | +0+1−2 |
| 1.100110011: | +1.+1+0+0 | +0+0+1 | +0+0+0 | +0+0−1 | +0+0−1 | +0+0−2 | +0−1+1 | +0−1+0 | +0−1−1 |
| 1.100110100: | +1.+1+0+0 | +0−1−1 | +0−1−2 | +0−2+1 | +0−2+0 | +0−2−1 | +0−2−1 | +0−2−2 | −1+1+1 |
| 1.100110101: | +1.+1+0+0 | −1+1+0 | −1+1+0 | −1+1−1 | −1+1−2 | −1+0+1 | −1+0+1 | −1+0+0 | −1+0−1 |
| 1.100110110: | +1.+1+0+0 | −1+0−2 | −1−1+1 | −1−1+1 | −1−1+0 | −1−1−1 | −1−1−1 | −1−1−2 | −1−1−2+1 |
| 1.100110111: | +1.+1+0+0 | −1−2+0 | −1−2−1 | −1−2−2 | −1−2−2 | −2+1+1 | −2+1+1 | −2+1+0 | −2+1−1 |
| 1.100111000: | +1.+1+0+0 | −2+1−2 | −2+0+1 | −2+0+0 | −2+0−1 | −2+0−1 | −2+0−2 | −2−1+1 | −2−1+0 |
| 1.100111001: | +1.+1+0+0 | −2−1+0 | −2−1−1 | −2−1−2 | −2−2+1 | −2−2+1 | −2−2+0 | −2−2−1 | −2−2−2 |
| 1.100111010: | +1.+1+0−1 | +1+1+1 | +1+1+1 | +1+1+0 | +1+1−1 | +1+1−2 | +1+1−2 | +1+0+1 | +1+0+0 |
| 1.100111011: | +1.+1+0−1 | +1+0−1 | +1+0−1 | +1+0−2 | +1−1+1 | +1−1+0 | +1−1−1 | +1−1−1 | +1−1−2 |
| 1.100111100: | +1.+1+0−1 | +1−2+1 | +1−2+0 | +1−2+0 | +1−2−1 | +1−2−2 | +0+1+1 | +0+1+1 | +0+1+0 |
| 1.100111101: | +1.+1+0−1 | +0+1−1 | +0+1−2 | +0+1−2 | +0+0+1 | +0+0+0 | +0+0−1 | +0+0−1 | +0+0−2 |
| 1.100111110: | +1.+1+0−1 | +0−1+1 | +0−1+0 | +0−1−1 | +0−1−1 | −0−1−2 | +0−2+1 | +0−2+0 | +0−2+0 |
| 1.100111111: | +1.+1+0−1 | +0−2−1 | +0−2−2 | −1+1+1 | −1+1+0 | −1+1−1 | −1+1−1 | −1+1−2 |

Part 11
1.101000000000(1)-1.101011111111(1)

| 1.101000000: | +1.+1+0−1 | −1+0+1 | −1+0+0 | −1+0−1 | −1+0−1 | −1+0−2 | −1−1+1 | −1−1+0 | −1−1+0 |
| 1.101000001: | +1.+1+0−1 | −1−1−1 | −1−1−2 | −1−2+1 | −1−2+1 | −1−2+0 | −1−2−1 | −1−2−2 | −1−2−2 |
| 1.101000010: | +1.+1+0−1 | −2+1+1 | −2+1+0 | −2+1−1 | −2+1−1 | −2+1−2 | −2+0+1 | −2+0+0 | −2+0−1 |
| 1.101000011: | +1.+1+0−1 | −2+0−1 | −2+0−2 | −2−1+1 | −2−1+0 | −2−1+0 | −2−1−1 | −2−1−2 | −2−2+1 |
| 1.101000100: | +1.+1+0−2 | +2−2+1 | +2−2+0 | +2−2−1 | +2−2−2 | +2−2−2 | +1+1+1 | +1+1+1 | +1+1−1 |
| 1.101000101: | +1.+1+0−2 | +1+1−1 | +1+1−2 | +1+0+1 | +1+0+0 | +1+0+0 | +1+0−1 | +1+0−2 | +1+0−2 |
| 1.101000110: | +1.+1+0−2 | +1−1+1 | +1−1+0 | +1−1−1 | +1−1−1 | +1−1−2 | +1−2+1 | +1−2+0 | +1−2+0 |
| 1.101000111: | +1.+1+0−2 | +1−2−1 | +1−2−2 | +0+1+1 | +0+1+1 | +0+1+0 | +0+1−1 | +0+1−2 | +0+1−2 |
| 1.101001000: | +1.+1+0−2 | +0+0+1 | +0+0+0 | +0+0−1 | +0+0−2 | +0−1+1 | +0−1+0 | +0−1−1 | +0−1−1 |
| 1.101001001: | +1.+1+0−2 | +0−1−1 | +0−1−2 | +0−2+1 | +0−2+1 | +0−2+0 | +0−2−1 | +0−2−2 | +0−2−2 |
| 1.101001010: | +1.+1+0−2 | −1+1+1 | −1+1+0 | −1+1+0 | −1+1−1 | −1+1−2 | −1+0+1 | −1+0+1 | −1+0+0 |
| 1.101001011: | +1.+1+0−2 | −1+0−1 | −1+0−2 | −1+0−2 | −1−1+1 | −1−1+0 | −1−1−1 | −1−1−1 | −1−1−2 |
| 1.101001100: | +1.+1+0−2 | −1−2+1 | −1−2+0 | −1−2−1 | −1−2−2 | −1−2−2 | −2+1+1 | −2+1+1 | −2+1+0 |
| 1.101001101: | +1.+1+0−2 | −2+1−1 | −2+1−2 | −2+1−2 | −2+0+1 | −2+0+1 | −2+0+0 | −2+0−1 | −2+0−2 |
| 1.101001110: | +1.+1+0−2 | −2−1+1 | −2−1+1 | −2−1+0 | −2−1−1 | −2−1−1 | −2−1−2 | −2−2+1 | −2−2+0 |
| 1.101001111: | +1.+1−1+1 | +2−2+0 | +2−2−1 | +2−2−2 | +1+1+1 | +1+1+1 | +1+1+0 | +1+1−1 | +1+1−2 |
| 1.101010000: | +1.+1−1+1 | +1+1−2 | +1+0+1 | +1+0+0 | +1+0+0 | +1+0−1 | +1+0−2 | +1−1+1 | +1−1+1 |
| 1.101010001: | +1.+1−1+1 | +1−1+0 | +1−1−1 | +1−1−1 | +1−1−2 | +1−1−2 | +1−2+1 | +1−2+0 | +1−2−1 |

APPENDIX TWO-continued

|  | | 000 | 001 | 010 | 011 | 100 | 101 | 110 | 111 |
|---|---|---|---|---|---|---|---|---|---|
| 1.101010010: | +1.+1−1+1 | +1−2−2 | +0+1+1 | +0+1+1 | +0+1+0 | +0+1−1 | +0+1−2 | +0+1−2 | +0+0+1 |
| 1.101010011: | +1.+1−1+1 | +0+0+0 | +0+0+0 | +0+0−1 | +0+0−2 | +0−1+1 | +0−1+0 | +0+0+0 | +0−1−1 |
| 1.101010100: | +1.+1−1+1 | +0−1−1 | +0−1−2 | +0−2+1 | +0−2+0 | +0−2+0 | +0−2−1 | +0−2−2 | −1+1+1 |
| 1.101010101: | +1.+1−1+1 | −1+1+1 | −1+1+0 | −1+1−1 | −1+1−1 | −1+1−2 | −1+0+1 | −1+0+0 | −1+0+0 |
| 1.101010110: | +1.+1−1+1 | −1+0−1 | −1+0−2 | −1+0−2 | −1−1+1 | −1−1+0 | −1−1−1 | −1−1−1 | −1−1−2 |
| 1.101010111: | +1.+1−1+1 | −1−2+1 | −1−2+1 | −1−2+0 | −1−2−1 | −1−2−2 | −1−2−2 | −2+1+1 | −2+1+0 |
| 1.101011000: | +1.+1−1+1 | −2+1+0 | −2+1−1 | −2+1−2 | −2+0+1 | −2+0+1 | −2+0+0 | −2+0−1 | −2+0−1 |
| 1.101011001: | +1.+1−1+1 | −2+0−2 | −2+1+1 | −2+1+0 | −2+1+0 | −2+1−1 | −2+1−2 | −2−1−2 | −2−2+1 |
| 1.101011010: | +1.+1−1+0 | +2−2+0 | +2−2−1 | +2−2−1 | +2−2−2 | +1+1+1 | +1+1+1 | +1+1+0 | +1+1−1 |
| 1.101011011: | +1.+1−1+0 | +1+1−2 | +1+1−2 | +1+0+1 | +1+0+0 | +1+0+0 | +1+0−1 | +1+0−2 | +1−1+1 |
| 1.101011100: | +1.+1−1+0 | +1−1+1 | +1−1+0 | +1−1−1 | +1−1−1 | +1−1−2 | +1−2+1 | +1−2+0 | +1−2+0 |
| 1.101011101: | +1.+1−1+0 | +1−2−1 | +1−2−2 | +1−2−2 | +0+1+1 | +0+1+0 | +0+1+0 | +0+1−1 | +0+1−2 |
| 1.101011110: | +1.+1−1+0 | +0+0+1 | +0+0+1 | +0+0+0 | +0+0−1 | +0+0−1 | +0+0−2 | +0−1+1 | +0−1+0 |
| 1.101011111: | +1.+1−1+0 | +0−1+0 | +0−1−1 | +0−1−2 | +0−1−2 | +0−2+1 | +0−2+0 | +0−2+0 | +0−2−1 |

Part 12
1.101100000000(1)-1.101111111111(1)

| 1.101100000: | +1.+1−1+0 | +0−2−2 | −1+1+1 | −1+1+1 | −1+1+0 | −1+1−1 | −1−1+1 | −1+1−2 | −1+0+1 |
| 1.101100001: | +1.+1−1+0 | −1+0+1 | −1+0+0 | −1+0−1 | −1+0−2 | −1+0−2 | −1−1+1 | −1−1+0 | −1−1+0 |
| 1.101100010: | +1.+1−1+0 | −1−1−1 | −1−1−2 | −1−1−2 | −1−2+1 | −1−2+0 | −1−2−1 | −1−2−1 | −1−2−2 |
| 1.101100011: | +1.+1−1+0 | −2+1+1 | −2+1+1 | −2+1+0 | −2+1−1 | −2+1−1 | −2+1−2 | −2+0+1 | −2+0+0 |
| 1.101100100: | +1.+1−1+0 | −2+0+0 | −2+0−1 | −2+0−2 | −2+0−2 | −2−1+1 | −2−1+1 | −2−1+0 | −2−1−1 |
| 1.101100101: | +1.+1−1−1 | +2−1−2 | +2−1−2 | +2−2+1 | +2−2+0 | +2−2−1 | +2−2−1 | +2−2−2 | +1+1+1 |
| 1.101100110: | +1.+1−1−1 | +1+1+1 | +1+1+0 | +1+1−1 | +1+1−1 | +1+1−2 | +1+0+1 | +1+0+1 | +1+0+0 |
| 1.101100111: | +1.+1−1−1 | +1+0−1 | +1+0−2 | +1+0−2 | +1−1+1 | +1−1+0 | +1−1+0 | +1−1−1 | +1−1−2 |
| 1.101101000: | +1.+1−1−1 | +1−1−2 | +1−2+1 | +1−2+0 | +1−2+0 | +1−2−1 | +1−2−2 | +1−2−2 | +0+1+1 |
| 1.101101001: | +1.+1−1−1 | +0+1+0 | +0+1−1 | +0+1−1 | +0+1−2 | +0+0+1 | +0+0+1 | +0+0+0 | +0+0−1 |
| 1.101101010: | +1.+1−1−1 | +0+0−1 | +0+0−2 | +0−1+1 | +0−1+1 | +0−1+0 | +0−1−1 | +0−1−1 | +0−1−2 |
| 1.101101011: | +1.+1−1−1 | +0−2+1 | +0−2+0 | +0−2+0 | +0−2−1 | +0−2−2 | +0−2−2 | −1+1+1 | −1+1+0 |
| 1.101101100: | +1.+1−1−1 | −1+1+0 | −1+1−1 | −1+1−2 | −1+1−2 | −1+0+1 | −1+0+0 | −1+0+0 | −1+0−1 |
| 1.101101101: | +1.+1−1−1 | −1+0−2 | −1+0−2 | −1−1+1 | −1−1+0 | −1−1+0 | −1−1−1 | −1−1−1 | −1−1−2 |
| 1.101101110: | +1.+1−1−1 | −1−2+1 | −1−2+0 | −1−2−1 | −1−2−1 | −1−2−2 | −2+1+1 | −2+1+1 | −2+1+0 |
| 1.101101111: | +1.+1−1−1 | −2+1−1 | −2+1−1 | −2+1−2 | −2+0+1 | −2+0+1 | −2+0+0 | −2+0−1 | −2+0−1 |
| 1.101110000: | +1.+1−1−1 | −2+0−2 | −2−1+1 | −2−1+1 | −2−1+0 | −2−1−1 | −2−1−1 | −2−1−2 | −2−2+1 |
| 1.101110001: | +1.+1−1−2 | +2−2+1 | +2−2+0 | +2−2−1 | +2−2−2 | +2−2−2 | +1+1+1 | +1+1+1 | +1+1+0 |
| 1.101110010: | +1.+1−1−2 | +1+1−1 | +1+1−2 | +1+1−2 | +1+0+1 | +1+0+0 | +1+0+0 | +1+0−1 | +1+0−2 |
| 1.101110011: | +1.+1−1−2 | +1+0−2 | +1−1+1 | +1−1+0 | +1−1+0 | +1−1−1 | +1−1−2 | +1−1−2 | +1−2+1 |
| 1.101110100: | +1.+1−1−2 | +1−2+0 | +1−2+0 | +1−2−1 | +1−2−2 | +1−2−2 | +0+1+1 | +0+1+0 | +0+1+0 |
| 1.101110101: | +1.+1−1−2 | +0+1−1 | +0+1−2 | +0+0+1 | +0+0+0 | +0+0+0 | +0+0−1 | +0+0−2 | +0+0−2 |
| 1.101110110: | +1.+1−1−2 | +0+0−2 | +0−1+1 | +0−1+0 | +0−1+0 | +0−1−1 | +0−1−2 | +0−1−2 | +0−2+1 |
| 1.101110111: | +1.+1−1−2 | +0−2+0 | +0−2+0 | +0−2−1 | +0−2−2 | +0−2−2 | −1+1+1 | −1+1+0 | −1+1+0 |
| 1.101111000: | +1.+1−1−2 | −1+1−1 | −1+1−2 | −1+1−2 | −1+0+1 | −1+0+0 | −1+0+0 | −1+0−1 | −1+0−2 |
| 1.101111001: | +1.+1−1−2 | −1+0−2 | −1−1+1 | −1−1+1 | −1−1+0 | −1−1−1 | −1−1−2 | −1−1−2 | −1−2+1 |
| 1.101111010: | +1.+1−1−2 | −1−2+0 | −1−2+0 | −1−2−1 | −1−2−2 | −1−2−2 | −2+1+1 | −2+1+0 | −2+1+0 |
| 1.101111011: | +1.+1−1−2 | −2+1−1 | −2+1−1 | −2+1−2 | −2+0+1 | −2+0+0 | −2+0+0 | −2+0−1 | −2+0−2 |
| 1.101111100: | +1.+1−1−2 | −2+0−2 | −2−1+1 | −2−1+0 | −2−1+0 | −2−1−1 | −2−1−1 | −2−1−2 | −2−2+1 |
| 1.101111101: | +1.+1−2+1 | +2−2+1 | +2−2+0 | +2−2−1 | +2−2−1 | +2−2−2 | +1+1+1 | +1+1+1 | +1+1+0 |
| 1.101111110: | +1.+1−2+1 | +1+1−1 | +1+1−1 | +1+1−2 | +1+1−2 | +1+0+1 | +1+0+0 | +1+0−1 | +1+0−1 |
| 1.101111111: | +1.+1−2+1 | +1+0−2 | +1−1+1 | +1−1+1 | +1−1+0 | +1−1−1 | +1−1−1 | +1−1−2 | +1−2+1 |

Part 13
1.110000000000(1)-1.110011111111(1)

| 1.110000000: | +1.+1−2+1 | +1−2+1 | +1−2+0 | +1−2+0 | +1−2−1 | +1−2−2 | +1−2−2 | +0+1+1 | +0+1+0 |
| 1.110000001: | +1.+1−2+1 | +0+1+0 | +0+1−1 | +0+1−2 | +0+1−2 | +0+0+1 | +0+0+0 | +0+0+0 | +0+0−1 |
| 1.110000010: | +1.+1−2+1 | +0+0−2 | +0+0−2 | +0−1+1 | +0−1+0 | +0−1+0 | +0−1−1 | +0−1−2 | +0−1−2 |
| 1.110000011: | +1.+1−2+1 | +0−2+1 | +0−2+1 | +0−2+0 | +0−2+0 | +0−2−1 | +0−2−2 | −1+1+1 | −1+1+1 |
| 1.110000100: | +1.+1−2+1 | −1+1+0 | −1+1−1 | −1+1−1 | −1+1−2 | −1+0+1 | −1+0+1 | −1+0+0 | −1+0−1 |
| 1.110000101: | +1.+1−2+1 | −1+0−1 | −1+0−2 | −1+0−2 | −1−1+1 | −1−1+0 | −1−1+0 | −1−1−1 | −1−1−2 |
| 1.110000110: | +1.+1−2+1 | −1−1−2 | −1−2+1 | −1−2+0 | −1−2+0 | −1−2−1 | −1−2−2 | −1−2−2 | −2+1+1 |
| 1.110000111: | +1.+1−2+1 | −2+1+1 | −2+1+0 | −2+1−1 | −2+1−1 | −2+1−2 | −2+0+1 | −2+0+1 | −2+0+0 |
| 1.110001000: | +1.+1−2+1 | −2+0−1 | −2+0−1 | −2+0−2 | −2−1+1 | −2−1+1 | −2−1+0 | −2−1+0 | −2−1−1 |
| 1.110001001: | +1.+1−2+1 | −2−1−2 | −2−1−2 | −2−2+1 | −2−2+0 | −2−2+0 | −2−2−1 | −2−2−2 | −2−2−2 |
| 1.110001010: | +1.+1−2+0 | +1+1+1 | +1+1+1 | +1+1+0 | +1+1−1 | +1+1−1 | +1+1−2 | +1+0+1 | +1+0+1 |
| 1.110001011: | +1.+1−2+0 | +1+0+0 | +1+0−1 | +1+0−1 | +1+0−2 | +1−1+1 | +1−1+0 | +1−1+0 | +1−1−1 |
| 1.110001100: | +1.+1−2+0 | +1−1−1 | +1−1−2 | +1−1−2 | +1−2+1 | +1−2+0 | +1−2+0 | +1−2−1 | +1−2−1 |
| 1.110001101: | +1.+1−2+0 | +1−2−2 | +0+1+1 | +0+1+1 | +0+1+0 | +0+1−1 | +0+1−1 | +0+1−2 | +0+0+1 |
| 1.110001110: | +1.+1−2+0 | +0+0+1 | +0+0+0 | +0+0+0 | +0+0−1 | +0+0−2 | +0+0−2 | +0−1+1 | +0−1+0 |
| 1.110001111: | +1.+1−2+0 | +0−1+0 | +0−1−1 | +0−1−1 | +0−1−2 | +0−2+1 | +0−2+1 | +0−2+0 | +0−2−1 |
| 1.110010000: | +1.+1−2+0 | +0−2−1 | +0−2−2 | −1+1+1 | −1+1+1 | −1+1+0 | −1+1+0 | −1+1−1 | −1+1−2 |
| 1.110010001: | +1.+1−2+0 | −1+1−2 | −1+0+1 | −1+0+0 | −1+0+0 | −1+0−1 | −1+0−1 | −1+0−2 | −1−1+1 |
| 1.110010010: | +1.+1−2+0 | −1−1+1 | −1−1+0 | −1−1−1 | −1−1−1 | −1−1−2 | −1−1−2 | −1−2+1 | −1−2+0 |
| 1.110010011: | +1.+1−2+0 | −1−2+0 | −1−2−1 | −1−2−2 | −1−2−2 | −2+1+1 | −2+1+1 | −2+1+0 | −2+1−1 |
| 1.110010100: | +1.+1−2+0 | −2+1−1 | −2+1−2 | −2+0+1 | −2+0+1 | −2+0+0 | −2+0+0 | −2+0−1 | −2+0−2 |
| 1.110010101: | +1.+1−2+0 | −2+0−2 | −2−1+1 | −2−1+0 | −2−1+0 | −2−1−1 | −2−1−1 | −2−1−2 | −2−2+1 |
| 1.110010110: | +1.+1−2−1 | +2−2+1 | +2−2+0 | +2−2−1 | +2−2−1 | +2−2−2 | +2−2−2 | +1+1+1 | +1+1+0 |
| 1.110010111: | +1.+1−2−1 | +1+1+0 | +1+1−1 | +1+1−2 | +1+1−2 | +1+0+1 | +1+0+1 | +1+0+0 | +1+0−1 |
| 1.110011000: | +1.+1−2−1 | +1+0−1 | +1+0−2 | +1−1+1 | +1−1+1 | +1−1+0 | +1−1+0 | +1−1−1 | +1−1−2 |

APPENDIX TWO-continued

|  | 000 | 001 | 010 | 011 | 100 | 101 | 110 | 111 |
|---|---|---|---|---|---|---|---|---|
| 1.110011001: | +1.+1−2−1 | +1−1−2 | +1−2+1 | +1−2+1 | +1−2+0 | +1−2−1 | +1−2−1 | +1−2−2 | +0+1+1 |
| 1.110011010: | +1.+1−2−1 | +0+1+1 | +0+1+0 | +0+1+0 | +0+1−1 | +0+1−2 | +0+1−2 | +0+0+1 | +0+0+1 |
| 1.110011011: | +1.+1−2−1 | +0+0+0 | +0+0−1 | +0+0−1 | +0+0−2 | +0−1+1 | +0−1+1 | +0−1+0 | +0−1+0 |
| 1.110011100: | +1.+1−2−1 | +0−1−1 | +0−1−2 | +0−1−2 | +0−2+1 | +0−2+1 | +0−2+0 | +0−2−1 | +0−2−1 |
| 1.110011101: | +1.+1−2−1 | +0−2−2 | −1+1+1 | −1+1+1 | −1+1+0 | −1+1+0 | −1+1−1 | −1+1−2 | −1+1−2 |
| 1.110011110: | +1.+1−2−1 | −1+0+1 | −1+0+1 | −1+0+0 | −1+0−1 | −1+0−1 | −1+0−2 | −1+0−2 | −1−1+1 |
| 1.110011111: | +1.+1−2−1 | −1−1+0 | −1−1+0 | −1−1−1 | −1−1−1 | −1−1−2 | −1−2+1 | −1−2+1 | −1−2+0 |

Part 14
1.110100000000(1)−1.110111111111(1)

| 1.110100000: | +1.+1−2−1 | −1−2−1 | −1−2−1 | −1−2−2 | −1−2−2 | −2+1+1 | −2+1+1 | −2+1+0 | −2+1−1 |
| 1.110100001: | +1.+1−2−1 | −2+1−1 | −2+1−2 | −2+0+1 | −2+0+1 | −2+0+0 | −2+0+0 | −2+0−1 | −2+0−2 |
| 1.110100010: | +1.+1−2−1 | −2+0−2 | −2−1+1 | −2−1+0 | −2−1+0 | −2−1−1 | −2−2−1 | −2−1−2 | −2−2+1 |
| 1.110100011: | +1.+1−2−2 | +2−2+1 | +2−2+0 | +2−2+0 | +2−2−1 | +2−2−2 | +2−2−2 | +1+1+1 | +1+1+1 |
| 1.110100100: | +1.+1−2−2 | +1+1+0 | +1+1−1 | +1+1−1 | +1+1−2 | +1+1−2 | +1+0+1 | +1+0+0 | +1+0+0 |
| 1.110100101: | +1.+1−2−2 | +1+0−1 | +1+0−1 | +1+0−2 | +1−1+1 | +1−1+1 | +1−1+0 | +1−1+0 | +1−1−1 |
| 1.110100110: | +1.+1−2−2 | +1−1−2 | +1−1−2 | +1−2+1 | +1−2+1 | +1−2+0 | +1−2−1 | +1−2−1 | +1−2−2 |
| 1.110100111: | +1.+1−2−2 | +1−2−2 | +0+1+1 | +0+1+0 | +0+1+0 | +0+1−1 | +0+1−1 | +0+1−2 | +0+0+1 |
| 1.110101000: | +1.+1−2−2 | +0+0+1 | +0+0+0 | +0+0+0 | +0+0−1 | +0+0−2 | +0+0−2 | +0−1+1 | +0−1+0 |
| 1.110101001: | +1.+1−2−2 | +0−1+0 | +0−1−1 | +0−1−1 | +0−1−2 | +0−1−2 | +0−2+1 | +0−2+0 | +0−2+0 |
| 1.110101010: | +1.+1−2−2 | +0−2−1 | +0−2−1 | +0−2−2 | −1+1+1 | −1+1+1 | −1+1+0 | −1+1+0 | −1+1−1 |
| 1.110101011: | +1.+1−2−2 | −1+1−2 | −1+1−2 | −1+0+1 | −1+0+1 | −1+0+0 | −1+0+0 | −1+0−1 | −1+0−2 |
| 1.110101100: | +1.+1−2−2 | −1+0−2 | −1−1+1 | −1−1+1 | −1−1+0 | −1−1−1 | −1−1−1 | −1−1−2 | −1−1−2 |
| 1.110101101: | +1.+1−2−2 | −1−2+1 | −1−2+0 | −1−2+0 | −1−2−1 | −1−2−1 | −1−2−2 | −2+1+1 | −2+1+1 |
| 1.110101110: | +1.+1−2−2 | −2+1+0 | −2+1+0 | −2+1−1 | −2+1−2 | −2+1−2 | −2+0+1 | −2+0+1 | −2+0+0 |
| 1.110101111: | +1.+1−2−2 | −2+0+0 | −2+0−1 | −2+0−2 | −2+0−2 | −2−1+1 | −2−1+1 | −2−1+0 | −2−1−1 |
| 1.110110000: | +1.+1−2−2 | −2−1−1 | −2−1−2 | −2−1−2 | −2−2+1 | −2−2+0 | −2−2+0 | −2−2−1 | −2−2−1 |
| 1.110110001: | +1.+0+1+1 | +2−2−2 | +2−2−2 | +1+1+1 | +1+1+0 | +1+1+0 | +1+1−1 | +1+1−1 | +1+1−2 |
| 1.110110010: | +1.+0+1+1 | +1+0+1 | +1+0+1 | +1+0+0 | +1+0+0 | +1+0−1 | +1+0−1 | +1+0−2 | +1−1+1 |
| 1.110110011: | +1.+0+1+1 | +1−1+1 | +1−1+0 | +1−1+0 | +1−1−1 | +1−1−2 | +1−1−2 | +1−2+1 | +1−2+1 |
| 1.110110100: | +1.+0+1+1 | +1−2+0 | +1−2−1 | +1−2−1 | +1−2−2 | +1−2−2 | +0+1+1 | +0+1+1 | +0+1+0 |
| 1.110110101: | +1.+0+1+1 | +0+1−1 | +0+1−1 | +0+1−2 | +0+1−2 | +0+0+1 | +0+0+1 | +0+0+0 | +0+0−1 |
| 1.110110110: | +1.+0+1+1 | +0+0−1 | +0+0−2 | +0+0−2 | +0−1+1 | +0−1+0 | +0−1+0 | +0−1−1 | +0−1−1 |
| 1.110110111: | +1.+0+1+1 | +0−1−2 | +0−1−2 | +0−2+1 | +0−2+0 | +0−2+0 | +0−2−1 | +0−2−1 | +0−2−2 |
| 1.110111000: | +1.+0+1+1 | −1+1+1 | −1+1+1 | −1+1+0 | −1+1+0 | −1+1−1 | −1+1−1 | −1+1−2 | −1+0+1 |
| 1.110111001: | +1.+0+1+1 | −1+0+1 | −1+0+0 | −1+0+0 | −1+0−1 | −1+0−1 | −1+0−2 | −1−1+1 | −1−1+1 |
| 1.110111010: | +1.+0+1+1 | −1−1+0 | −1−1+0 | −1−1−1 | −1−1−1 | −1−1−2 | −1−2+1 | −1−2+1 | −1−2+0 |
| 1.110111011: | +1.+0+1+1 | −1−2+0 | −1−2−1 | −1−2−1 | −1−2−2 | −2+1+1 | −2+1+1 | −2+1+0 | −2+1+0 |
| 1.110111100: | +1.+0+1+1 | −2+1−1 | −2+1−2 | −2+1−2 | −2+0+1 | −2+0+1 | −2+0+0 | −2+0+0 | −2+0−1 |
| 1.110111101: | +1.+0+1+1 | −2+0−2 | −2+0−2 | −2−1+1 | −2−1+1 | −2−1+0 | −2−1+0 | −2−1−1 | −2−1−2 |
| 1.110111110: | +1.+0+1+1 | −2−1−2 | −2−2+1 | −2−2+1 | −2−2+0 | −2−2+0 | −2−2−1 | −2−2−2 | −2−2−2 |
| 1.110111111: | +1.+0+1+0 | +1+1+1 | +1+1+1 | +1+1+0 | +1+1+0 | +1+1−1 | +1+1−2 | +1+1−2 | +1+0+1 |

Part 15
1.111000000000(1)−1.111011111111(1)

| 1.111000000: | +1.+0+1+0 | +1+0+1 | +1+0+0 | +1+0+0 | +1+0−1 | +1+0−1 | +1+0−2 | +1−1+1 | +1−1+1 |
| 1.111000001: | +1.+0+1+0 | +1−1+0 | +1−1+0 | +1−1−1 | +1−1−1 | +1−1−2 | +1−2+1 | +1−2+1 | +1−2+0 |
| 1.111000010: | +1.+0+1+0 | +1−2+0 | +1−2−1 | +1−2−1 | +1−2−2 | +0+1+1 | +0+1+1 | +0+1+0 | +0+1+0 |
| 1.111000011: | +1.+0+1+0 | +0+1−1 | +0+1−1 | +0+1−2 | +0+0+1 | +0+0+1 | +0+0+0 | +0+0+0 | +0+0−1 |
| 1.111000100: | +1.+0+1+0 | +0+0−1 | +0+0−2 | +0+0−2 | +0−1+1 | +0−1+0 | +0−1+0 | +0−1−1 | +0−1−1 |
| 1.111000101: | +1.+0+1+0 | +0−1−2 | +0−1−2 | +0−2+1 | +0−2+0 | +0−2+0 | +0−2−1 | +0−2−1 | +0−2−2 |
| 1.111000110: | +1.+0+1+0 | +0−2−2 | −1+1+1 | −1+1+1 | −1+1+0 | −1+1+0 | −1+1−1 | −1+1−1 | −1+1−2 |
| 1.111000111: | +1.+0+1+0 | −1+0+1 | −1+0+1 | −1+0+0 | −1+0−1 | −1+0−1 | −1+0−2 | −1+0−2 | −1−1+1 |
| 1.111001000: | +1.+0+1+0 | −1−1+1 | −1−1+0 | −1−1+0 | −1−1−1 | −1−1−2 | −1−1−2 | −1−2+1 | −1−2+1 |
| 1.111001001: | +1.+0+1+0 | −1−2+0 | −1−2+0 | −1−2−1 | −1−2−1 | −1−2−2 | −2+1+1 | −2+1+1 | −2+1+0 |
| 1.111001010: | +1.+0+1+0 | −2+1+0 | −2+1−1 | −2+1−1 | −2+1−2 | −2+1−2 | −2+0+1 | −2+0+0 | −2+0+0 |
| 1.111001011: | +1.+0+1+0 | −2+0−1 | −2+0−1 | −2+0−2 | −2+0−2 | −2−1+1 | −2−1+1 | −2−1+0 | −2−1−1 |
| 1.111001100: | +1.+0+1+0 | −2−1−1 | −2−1−2 | −2−1−2 | −2−2+1 | −2−2+1 | −2−2+0 | −2−2+0 | −2−2−1 |
| 1.111001101: | +1.+0+1−1 | +2−2−2 | +2−2−2 | +1+1+1 | +1+1+1 | +1+1+0 | +1+1+0 | +1+1−1 | +1+1−1 |
| 1.111001110: | +1.+0+1−1 | +1+1−2 | +1+0+1 | +1+0+1 | +1+0+0 | +1+0−1 | +1+0−1 | +1+0−1 | +1+0−1 |
| 1.111001111: | +1.+0+1−1 | +1+0−2 | +1−1+1 | +1−1+0 | +1−1+0 | +1−1−1 | +1−1−1 | +1−1−2 | +1−1−2 |
| 1.111010000: | +1.+0+1−1 | +1−2+1 | +1−2+1 | +1−2+0 | +1−2+0 | +1−2−1 | +1−2−2 | +1−2−2 | +0+1+1 |
| 1.111010001: | +1.+0+1−1 | +0+1+1 | +0+1+0 | +0+1+0 | +0+1−1 | +0+1−1 | +0+1−2 | +0+0+1 | +0+0+1 |
| 1.111010010: | +1.+0+1−1 | +0+0+0 | +0+0+0 | +0+0−1 | +0+0−1 | +0+0−2 | +0+0−2 | +0−1+1 | +0−1+1 |
| 1.111010011: | +1.+0+1−1 | +0−1+0 | +0−1−1 | +0−1−1 | +0−1−2 | +0−1−2 | +0−2+1 | +0−2+1 | +0−2+0 |
| 1.111010100: | +1.+0+1−1 | +0−2+0 | +0−2−1 | +0−2−1 | +0−2−2 | −1+1+1 | −1+1+1 | −1+1+0 | −1+1+0 |
| 1.111010101: | +1.+0+1−1 | −1+1−1 | −1+1−1 | −1+1−2 | −1+1−2 | −1+0+1 | −1+0+1 | −1+0+0 | −1+0−1 |
| 1.111010110: | +1.+0+1−1 | −1+0−1 | −1+0−2 | −1+0−2 | −1−1+1 | −1−1+1 | −1−1+0 | −1−1+0 | −1−1−1 |
| 1.111010111: | +1.+0+1−1 | −1−1−1 | −1−1−2 | −1−2+1 | −1−2+1 | −1−2+0 | −1−2+0 | −1−2−1 | −1−2−1 |
| 1.111011000: | +1.+0+1−1 | −1−2−2 | −1−2−2 | −2+1+1 | −2+1+1 | −2+1+0 | −2+1+0 | −2+1−1 | −2+1−2 |
| 1.111011001: | +1.+0+1−1 | −2+1−2 | −2+0+1 | −2+0+1 | −2+0+0 | −2+0+0 | −2+0−1 | −2+0−1 | −2+0−2 |
| 1.111011010: | +1.+0+1−1 | −2+0−2 | −2−1+1 | −2−1+1 | −2−1+0 | −2−1+0 | −2−1−1 | −2−1−2 | −2−1−2 |
| 1.111011011: | +1.+0+1−1 | −2−2+1 | −2−2+1 | −2−2+0 | −2−2+0 | −2−2−1 | −2−2−1 | −2−2−2 | −2−2−2 |
| 1.111011100: | +1.+0+1−2 | +1+1+1 | +1+1+0 | +1+1+0 | +1+1−1 | +1+1−1 | +1+1−2 | +1+1−2 | +1+0+1 |
| 1.111011101: | +1.+0+1−2 | +1+0+1 | +1+0+0 | +1+0+0 | +1+0−1 | +1+0−1 | +1+0−2 | +1−1+1 | +1−1+1 |
| 1.111011110: | +1.+0+1−2 | +1−1+0 | +1−1+0 | +1−1−1 | +1−1−1 | +1−1−2 | +1−1−2 | +1−2+1 | +1−2+1 |
| 1.111011111: | +1.+0+1−2 | +1−2+0 | +1−2+0 | +1−2−1 | +1−2−1 | +1−2−2 | +0+1+1 | +0+1+1 | +0+1+0 |

APPENDIX TWO-continued

|  | 000 | 001 | 010 | 011 | 100 | 101 | 110 | 111 |
|---|---|---|---|---|---|---|---|---|

Part 16
1.111100000000(1)-1.111111111111(1)

| | | | | | | | | |
|---|---|---|---|---|---|---|---|---|
| 1.111100000: | +1.+0+1−2 | +0+1+0 | +0+1−1 | +0+1−1 | +0+1−2 | +0+1−2 | +0+0+1 | +0+0+1 | +0+0+0 |
| 1.111100001: | +1.+0+1−2 | +0+0+0 | +0+0−1 | +0+0−1 | +0+0−2 | +0−1+1 | +0−1+1 | +0−1+0 | +0−1+0 |
| 1.111100010: | +1.+0+1−2 | +0−1−1 | +0−1−1 | +0−1−2 | +0−1−2 | +0−2+1 | +0−2+1 | +0−2+0 | +0−2+0 |
| 1.111100011: | +1.+0+1−2 | +0−2−1 | +0−2−1 | +0−2−2 | +0−2−2 | −1+1+1 | −1+1+1 | −1+1+0 | −1+1−1 |
| 1.111100100: | +1.+0+1−2 | −1+1−1 | −1+1−2 | −1+1−2 | −1+0+1 | −1+0+1 | −1+0+0 | −1+0+0 | −1+0−1 |
| 1.111100101: | +1.+0+1−2 | −1+0−1 | −1+0−2 | −1+0−2 | −1−1+1 | −1−1+1 | −1−1+0 | −1−1−1 | −1−1−1 |
| 1.111100110: | +1.+0+1−2 | −1−1−2 | −1−1−2 | −1−1−2 | −1−2+1 | −1−2+0 | −1−2+0 | −1−2−1 | −1−2−1 |
| 1.111100111: | +1.+0+1−2 | −1−2−2 | −1−2−2 | −2+1+1 | −2+1+1 | −2+1+0 | −2+1+0 | −2+1−1 | −2+1−1 |
| 1.111101000: | +1.+0+1−2 | −2+1−2 | −2+1−2 | −2+0+1 | −2+0+0 | −2+0+0 | −2+0−1 | −2+0−1 | −2+0−2 |
| 1.111101001: | +1.+0+1−2 | −2+0−2 | −2−1+1 | −2−1+1 | −2−1+0 | −2−1+0 | −2−1−1 | −2−1−1 | −2−1−2 |
| 1.111101010: | +1.+0+1−2 | −2−1−2 | −2−2+1 | −2−2+1 | −2−2+0 | −2−2+0 | −2−2−1 | −2−2−1 | −2−2−2 |
| 1.111101011: | +1.+0+0+1 | +1+1+1 | +1+1+1 | +1+1+0 | +1+1+0 | +1+1−1 | +1+1−1 | +1+1−2 | +1+1−2 |
| 1.111101100: | +1.+0+0+1 | +1+0+1 | +1+0+1 | +1+0+0 | +1+0+0 | +1+0−1 | +1+0−1 | +1+0−2 | +1+0−2 |
| 1.111101101: | +1.+0+0+1 | +1−1+1 | +1−1+1 | +1−1+0 | +1−1+0 | +1−1−1 | +1−1−1 | +1−1−2 | +1−1−2 |
| 1.111101110: | +1.+0+0+1 | +1−2+1 | +1−2+1 | +1−2+0 | +1−2+1 | +1−2+1 | +1−2−2 | +1−2−2 | +0+1+1 |
| 1.111101111: | +1.+0+0+1 | +0+1+1 | +0+1+0 | +0+1+0 | +0+1−1 | +0+1−1 | +0+1−2 | +0+1−2 | +0+0+1 |
| 1.111110000: | +1.+0+0+1 | +0+0+1 | +0+0+0 | +0+0+0 | +0+0−1 | +0+0−1 | +0+0−2 | +0+0−2 | +0−1+1 |
| 1.111110001: | +1.+0+0+1 | +0−1+1 | +0−1+0 | +0−1+0 | +0−1−1 | +0−1−1 | +0−1−2 | +0−1−2 | +0−2+1 |
| 1.111110010: | +1.+0+0+1 | +0−2+1 | +0−2+0 | +0−2−1 | +0−2−1 | +0−2−2 | +0−2−2 | −1+1+1 | −1+1+1 |
| 1.111110011: | +1.+0+0+1 | −1+1+0 | −1+1+0 | −1+1−1 | −1+1−1 | −1+1−2 | −1+1−2 | −1+0+1 | −1+0+1 |
| 1.111110100: | +1.+0+0+1 | −1+0+0 | −1+0+0 | −1+0−1 | −1+0−1 | −1+0−2 | −1+0−2 | −1−1+1 | −1−1+1 |
| 1.111110101: | +1.+0+0+1 | −1−1+0 | −1−1+0 | −1−1−1 | −1−1−1 | −1−1−2 | −1−1−2 | −1−2+1 | −1−2+1 |
| 1.111110110: | +1.+0+0+1 | −1−2+0 | −1−2+0 | −1−2−1 | −1−2−1 | −1−2−2 | −1−2−2 | −2+1+1 | −2+1+1 |
| 1.111110111: | +1.+0+0+1 | −2+1+0 | −2+1+0 | −2+1−1 | −2+1−1 | −2+1−2 | −2+1−2 | −2+0+1 | −2+0+1 |
| 1.111111000: | +1.+0+0+1 | −2+0+0 | −2+0−1 | −2+0−1 | −2+0−2 | −2+0−2 | −2−1+1 | −2−1+1 | −2−1+0 |
| 1.111111001: | +1.+0+0+1 | −2−1+0 | −2−1−1 | −2−1−1 | −2−1−2 | −2−1−2 | −2−2+1 | −2−2+1 | −2−2+0 |
| 1.111111010: | +1.+0+0+0 | +2−2+0 | +2−2−1 | +2−2−1 | +2−2−2 | +2−2−2 | +1+1+1 | +1+1+1 | +1+1+0 |
| 1.111111011: | +1.+0+0+0 | +1+1+0 | +1+1−1 | +1+1−1 | +1+1−2 | +1+1−2 | +1+0+1 | +1+0+1 | +1+0+0 |
| 1.111111100: | +1.+0+0+0 | +1+0+0 | +1+0−1 | +1+0+0 | +1+0−2 | +1+0−2 | +1−1+1 | +1−1+1 | +1−1+0 |
| 1.111111101: | +1.+0+0+0 | +1−1+0 | +1−1−1 | +1−1−1 | +1−1−2 | +1−1−2 | +1−2+1 | +1−2+1 | +1−2+0 |
| 1.111111110: | +1.+0+0+0 | +1−2+0 | +1−2−1 | +1−2−1 | +1−2−2 | +1−2−2 | +0+1+1 | +0+1+1 | +0+1+0 |
| 1.111111111: | +1.+0+0+0 | +0+1+0 | +0+1−1 | +0+1−1 | +0+1−2 | +0+1−2 | +0+0+1 | +0+0+1 | +0+0+0 |

APPENDIX THREE

There are no Parts 1-14.

|  | 000 | 001 | 010 | 011 | 100 | 101 | 110 | 111 |
|---|---|---|---|---|---|---|---|---|

Part 15 [Alternate Version]
1.111000000000(1)-1.111011111111(1)

| | | | | | | | | |
|---|---|---|---|---|---|---|---|---|
| 1.111000000: | +1.+0+1+0+1 | +0+1 | +0+0 | +0+0 | +0−1 | +0−1 | +0−2 | −1+1 | −1+1 |
| 1.111000001: | +1.+0+1+0+1 | −1+0 | −1+0 | −1−1 | −1−1 | −1−2 | −2+1 | −2+1 | −2+0 |
| 1.111000010: | +1.+0+1+0+0 | +2+0 | +2−1 | +2−1 | +2−2 | +1+1 | +1+1 | +1+0 | +1+0 |
| 1.111000011: | +1.+0+1+0+0 | +1−1 | +1−1 | +1−2 | +0+1 | +0+1 | +0+0 | +0+0 | +0−1 |
| 1.111000100: | +1.+0+1+0+0 | +0−1 | +0−2 | +0−2 | −1+1 | −1+0 | −1+0 | −1−1 | −1−1 |
| 1.111000101: | +1.+0+1+0+0 | −1−2 | −1−2 | −2+1 | −2+0 | −2+0 | −2−1 | −2−1 | −2−2 |
| 1.111000110: | +1.+0+1+0−1 | +2−2 | +1+1 | +1+1 | +1+0 | +1−1 | +1−1 | +1−2 | +1−2 |
| 1.111000111: | +1.+0+1+0−1 | +0+1 | +0+1 | +0+0 | +0−1 | +0−1 | +0−2 | +0−2 | −1+1 |
| 1.111001000: | +1.+0+1+0−1 | −1+1 | −1+0 | −1+0 | −1−1 | −1−2 | −1−2 | −2+1 | −2+1 |
| 1.111001001: | +1.+0+1+0−2 | +2+0 | +2+0 | +2−1 | +2−1 | +2−2 | +1+1 | +1+1 | +1+0 |
| 1.111001010: | +1.+0+1+0−2 | +1+0 | +1−1 | +1−1 | +1−2 | +1−2 | +0+1 | +0+0 | +0+0 |
| 1.111001011: | +1.+0+1+0−2 | +0−1 | +0−1 | +0−2 | +0−2 | −1+1 | −1+1 | −1+0 | −1−1 |
| 1.111001100: | +1.+0+1+0−2 | −1−1 | −1−2 | −1−2 | −2+1 | −2+1 | −2+0 | −2+0 | −2−1 |
| 1.111001101: | +1.+0+1−1+1 | +2−2 | +2−2 | +1+1 | +1+1 | +1+0 | +1+0 | +1−1 | +1−1 |
| 1.111001110: | +1.+0+1−1+1 | +1−2 | +0+1 | +0+1 | +0+0 | +0+0 | +0−1 | +0−1 | +0−2 |
| 1.111001111: | +1.+0+1−1+1 | +0−2 | −1+1 | −1+0 | −1+0 | −1−1 | −1−1 | −1−2 | −1−2 |
| 1.111010000: | +1.+0+1−1+0 | +2+1 | +2+1 | +2+0 | +2+0 | +2−1 | +2−2 | +2−2 | +1+1 |
| 1.111010001: | +1.+0+1−1+0 | +1+1 | +1+0 | +1+0 | +1−1 | +1−1 | +1−2 | +0+1 | +0+1 |
| 1.111010010: | +1.+0+1−1+0 | +0+0 | +0+0 | +0−1 | +0−1 | +0−2 | +0−2 | −1+1 | −1+1 |
| 1.111010011: | +1.+0+1−1+0 | −1+0 | −1−1 | −1−1 | −1−2 | −1−2 | −2+1 | −2+1 | −2+0 |
| 1.111010100: | +1.+0+1−1−1 | +2+0 | +2−1 | +2−1 | +2−2 | +1+1 | +1+1 | +1+0 | +1+0 |
| 1.111010101: | +1.+0+1−1−1 | +1−1 | +1−1 | +1−2 | +1−2 | +0+1 | +0+1 | +0+0 | +0−1 |
| 1.111010110: | +1.+0+1−1−1 | +0−1 | +0−2 | +0−2 | −1+1 | −1+1 | −1+0 | −1+0 | −1−1 |
| 1.111010111: | +1.+0+1−1−1 | −1−1 | −1−2 | −2+1 | −2+1 | −2+0 | −2+0 | −2−1 | −2−1 |
| 1.111011000: | +1.+0+1−1−2 | +2−2 | +2−2 | +1+1 | +1+1 | +1+0 | +1+0 | +1−1 | +1−2 |
| 1.111011001: | +1.+0+1−1−2 | +1−2 | +0+1 | +0+1 | +0+0 | +0+0 | +0−1 | +0−1 | +0−2 |
| 1.111011010: | +1.+0+1−1−2 | +0−2 | −1+1 | −1+1 | −1+0 | −1−1 | −1−1 | −1−2 | −1−2 |
| 1.111011011: | +1.+0+1−1−2 | −2+1 | −2+1 | −2+0 | −2+0 | −2−1 | −2−1 | −2−2 | −2−2 |
| 1.111011100: | +1.+0+1−2+1 | +1+1 | +1+0 | +1+0 | +1−1 | +1−1 | +1−2 | +1−2 | +0+1 |

APPENDIX THREE-continued

There are no Parts 1-14.

|  |  | 000 | 001 | 010 | 011 | 100 | 101 | 110 | 111 |
|---|---|---|---|---|---|---|---|---|---|
| 1.111011101: | +1.+0+1−2+1 | +0+1 | +0+0 | +0+0 | +0−1 | +0−1 | +0−2 | −1+1 | −1+1 |
| 1.111011110: | +1.+0+1−2+1 | −1+0 | −1+0 | −1−1 | −1−1 | −1−2 | −1−2 | −2+1 | −2+1 |
| 1.111011111: | +1.+0+1−2+0 | +2+0 | +2+0 | +2−1 | +2−1 | +2−2 | +1+1 | +1+1 | +1+0 |

Part 16 [Alternate Version]
1.111100000000(1)-1.111111111111(1)

|  |  | 000 | 001 | 010 | 011 | 100 | 101 | 110 | 111 |
|---|---|---|---|---|---|---|---|---|---|
| 1.111100000: | +1.+0+1−2+0 | +1+0 | +1−1 | +1−1 | +1−2 | +1−2 | +0+1 | +0+1 | +0+0 |
| 1.111100001: | +1.+0+1−2+0 | +0+0 | +0−1 | +0−1 | +0−2 | −1+1 | −1+1 | −1+0 | −1+0 |
| 1.111100010: | +1.+0+1−2+0 | −1−1 | −1−1 | −1−2 | −1−2 | −2+1 | −2+1 | −2+0 | −2+0 |
| 1.111100011: | +1.+0+1−2−1 | +2−1 | +2−1 | +2−2 | +2−2 | +1+1 | +1+0 | +1+0 | +1−1 |
| 1.111100100: | +1.+0+1−2−1 | +1−1 | +1−2 | +1−2 | +0+1 | +0+1 | +0+0 | +0+0 | +0−1 |
| 1.111100101: | +1.+0+1−2−1 | +0−1 | +0−2 | +0−2 | −1+1 | −1+1 | −1+0 | −1−1 | −1−1 |
| 1.111100110: | +1.+0+1−2−1 | −1−2 | −1−2 | −2+1 | −2+1 | −2+0 | −2+0 | −2−1 | −2−1 |
| 1.111100111: | +1.+0+1−2−2 | +2−2 | +2−2 | +1+1 | +1+1 | +1+0 | +1+0 | +1−1 | +1−1 |
| 1.111101000: | +1.+0+1−2−2 | +1−2 | +1−2 | +0+1 | +0+0 | +0+0 | +0−1 | +0−1 | +0−2 |
| 1.111101001: | +1.+0+1−2−2 | +0−2 | −1+1 | −1+1 | −1+0 | −1+0 | −1−1 | −1−1 | −1−2 |
| 1.111101010: | +1.+0+1−2−2 | −1−2 | −2+1 | −2+1 | −2+0 | −2+0 | −2−1 | −2−1 | −2−2 |
| 1.111101011: | +1.+0+0+1+1 | +1+1 | +1+1 | +1+0 | +1+0 | +1−1 | +1−1 | +1−2 | +1−2 |
| 1.111101100: | +1.+0+0+1+1 | +0+1 | +0+1 | +0+0 | +0+0 | +0−1 | +0−1 | +0−2 | +0−2 |
| 1.111101101: | +1.+0+0+1+1 | −1+1 | −1+1 | −1+0 | −1+0 | −1−1 | −1−1 | −1−2 | −1−2 |
| 1.111101110: | +1.+0+0+1+0 | +2+1 | +2+1 | +2+0 | +2−1 | +2−1 | +2−2 | +2−2 | +1+1 |
| 1.111101111: | +1.+0+0+1+0 | +1+1 | +1+0 | +1+0 | +1−1 | +1−1 | +1−2 | +1−2 | +0+1 |
| 1.111110000: | +1.+0+0+1+0 | +0+1 | +0+0 | +0+0 | +0−1 | +0−1 | +0−2 | +0−2 | −1+1 |
| 1.111110001: | +1.+0+0+1+0 | −1+1 | −1+0 | −1+0 | −1−1 | −1−1 | −1−2 | −1−2 | −2+1 |
| 1.111110010: | +1.+0+0+1−1 | +2+1 | +2+0 | +2−1 | +2−1 | +2−2 | +2−2 | +1+1 | +1+1 |
| 1.111110011: | +1.+0+0+1−1 | +1+0 | +1+0 | +1−1 | +1−1 | +1−2 | +1−2 | +0+1 | +0+1 |
| 1.111110100: | +1.+0+0+1−1 | +0+0 | +0+0 | +0−1 | +0−1 | +0−2 | +0−2 | −1+1 | −1+1 |
| 1.111110101: | +1.+0+0+1−1 | −1+0 | −1+0 | −1−1 | −1−1 | −1−2 | −1−2 | −2+1 | −2+1 |
| 1.111110110: | +1.+0+0+1−2 | +2+0 | +2+0 | +2−1 | +2−1 | +2−2 | +2−2 | +1+1 | +1+1 |
| 1.111110111: | +1.+0+0+1−2 | +1+0 | +1+0 | +1−1 | +1−1 | +1−2 | +1−2 | +0+1 | +0+1 |
| 1.111111000: | +1.+0+0+1−2 | +0+0 | +0−1 | +0−1 | +0−2 | +0−2 | −1+1 | −1+1 | −1+0 |
| 1.111111001: | +1.+0+0+1−2 | −1+0 | −1−1 | −1−1 | −1−2 | −1−2 | −2+1 | −2+1 | −2+0 |
| 1.111111010: | +1.+0+0+0+1 | +2+0 | +2−1 | +2−1 | +2−2 | +2−2 | +1+1 | +1+1 | +1+0 |
| 1.111111011: | +1.+0+0+0+1 | +1+0 | +1−1 | +1−1 | +1−2 | +1−2 | +0+1 | +0+1 | +0+0 |
| 1.111111100: | +1.+0+0+0+1 | +0+0 | +0−1 | +0−1 | +0−2 | +0−2 | −1+1 | −1+1 | −1+0 |
| 1.111111101: | +1.+0+0+0+1 | +1+0 | −1−1 | −1−1 | −1−2 | −1−2 | −2+1 | −2+1 | −2+0 |
| 1.111111110: | +1.+0+0+0+0 | +2+0 | +2−1 | +2−1 | +2−2 | +2−2 | +1+1 | +1+1 | +1+0 |
| 1.111111111: | +1.+0+0+0+0 | +1+0 | +1−1 | +1−1 | +1−2 | +1−2 | +0+1 | +0+1 | +0+0 |

What is claimed is:

1. A system comprising:
  a lookup table unit comprising a lookup table, wherein said lookup table unit is operable to index said lookup table using a first portion of input bits of an input numeric value to select a high order digits part of an output numeric value and a plurality of low order digits parts of said output numeric value; and
  a multiplexer coupled to said lookup table unit, wherein said multiplexer is operable to receive said plurality of low order digits parts of said output numeric value from said lookup table unit, and is further operable to receive a second portion of said input bits of said input numeric value to select a low order digits part of said output numeric value from said plurality of low order digit parts.

2. The system of claim 1, wherein said output numeric value comprises a concatenation of said selected high order digits part from said lookup table unit and said selected low order digits part from said multiplexer.

3. The system of claim 1, wherein each leading low order digit in said plurality of low order digits parts selected by said lookup table unit has at most two successive values within said plurality of low order digits parts.

4. The system of claim 1, wherein a value of a leading low order digit in one of said plurality of low order digits parts selected by said lookup table unit differs at most by one unit of value from a value of a leading low order digit in a low order digits part that is adjacent to said one of said plurality of low order digits parts across a boundary between two lines of said lookup table.

5. The system of claim 1, wherein said lookup table comprises a plurality of table entries having a radix two format.

6. The system of claim 1, wherein said lookup table comprises a plurality of table entries having a radix four format.

7. The system of claim 1, wherein said lookup table comprises a plurality of table entries having a radix eight format.

8. The system of claim 1, further comprising:
  a multiplier encoder coupled to an output of said lookup table unit and coupled to an output of said multiplexer, said multiplier encoder capable of recoding said outputs into a format compatible for use by a partial product generator of a Booth radix four multiplier.

9. A system comprising:
  a first lookup table unit comprising a first lookup table, wherein said first lookup table unit is operable to index said first lookup table using a first portion of input bits of an input numeric value to select a first high order digits part of a first output numeric value and a first plurality of low order digits parts of said first output numeric value;
  a first multiplexer coupled to said first lookup table unit, wherein said first multiplexer is operable to receive said first plurality of low order digits parts of said first output numeric value from said first lookup table unit, and further is operable to select a first low order digits part of said output numeric value from said first plurality of low order digit parts using a second portion of said input bits of said input numeric value;

a second lookup table unit comprising a second lookup table, wherein said second lookup table unit is operable to index said second lookup table using said first portion of said input bits of said input numeric value to select a second high order digits part of a second output numeric value and a second plurality of low order digits parts of said second output numeric value; and a second multiplexer coupled to said second lookup table unit, wherein said second multiplexer is operable to receive said second plurality of low order digits parts of said second output numeric value from said second lookup table unit, and is further operable to select a second low order digits part of said second output numeric value from said second plurality of low order digit parts using said second portion of said input bits of said input numeric value.

10. The system of claim 1, further comprising:

a read only memory activation unit coupled to said first and second lookup table units, said read only memory activation unit capable of activating one of said first and second lookup table units in response to receiving two leading bits of said input numeric value; and a third multiplexer coupled to the output of said first and second lookup table units and coupled to the output of said first and second multiplexers, said third multiplexer operable to output one of said first output numeric value and said second output numeric value in response to receiving an activation signal from said read only memory activation unit.

11. A computer-implemented method for looking up an output numeric value comprising:

providing a lookup table comprising a first portion comprising a plurality of high order digits parts of said output numeric value and a second portion comprising a plurality of low order digits parts of said output numeric value;

indexing said lookup table using a first portion of input bits of an input numeric value to select a high order digits part of said output numeric value and a plurality of low order digits parts of said output numeric value;

selecting a low order digits part of said output numeric value from said plurality of low order digits parts using a second portion of said input bits of said input numeric value;

concatenating said selected high order digits part and said selected low order digit parts to form said output numeric value;

storing said output numeric value at a latch of an arithmetic logic unit of a computer; and using said output numeric value in at least one arithmetic operation at the arithmetic logic unit.

12. The method of claim 11, wherein each leading low order digit in said plurality of low order digits parts has at most two successive values within said plurality of low order digits parts.

13. The method of claim 11, wherein a value of a leading low order digit in one of said plurality of low order digits parts differs at most by one unit of value from a value of a leading low order digit in a low order digits part that is adjacent to said one of said plurality of low order digits parts across a boundary between two lines of said lookup table.

14. The method of claim 11, wherein said output numeric value comprises one digit within a value range and all other digits of said output numeric value are within a non-value range.

15. The method of claim 11, wherein said one digit within said value range occurs as a leading digit of said low order part of said output numeric value.

16. The method of claim 11, wherein said lookup table comprises a plurality of table entries having at least one of a radix two format, a radix four format or a radix eight format.

* * * * *

UNITED STATES PATENT AND TRADEMARK OFFICE
CERTIFICATE OF CORRECTION

| | | |
|---|---|---|
| PATENT NO. | : 7,543,008 B1 | Page 1 of 1 |
| APPLICATION NO. | : 11/115616 | |
| DATED | : June 2, 2009 | |
| INVENTOR(S) | : Matula et al. | |

It is certified that error appears in the above-identified patent and that said Letters Patent is hereby corrected as shown below:

Column 35, Line 19, please change "claim 1" to --claim 9--

Signed and Sealed this
Twenty-first Day of February, 2012

David J. Kappos
*Director of the United States Patent and Trademark Office*